US00RE37992E

(19) United States
(12) Reissued Patent
Saito et al.

(10) Patent Number: US RE37,992 E
(45) Date of Reissued Patent: Feb. 18, 2003

(54) MAGNETORESISTIVE HEAD USING EXCHANGE ANISOTROPIC MAGNETIC FIELD WITH AN ANTIFERROMAGNETIC LAYER

(75) Inventors: Masamichi Saito, Niigata-ken (JP); Toshinori Watanabe, Niigata-ken (JP); Toshihiro Kuriyama, Niigata-ken (JP)

(73) Assignee: Alps Electric Co., Ltd., Tokyo (JP)

(21) Appl. No.: 09/289,357

(22) Filed: Apr. 7, 1999

Related U.S. Patent Documents

Reissue of:
(64) Patent No.: 5,768,067
Issued: Jun. 16, 1998
Appl. No.: 08/718,152
Filed: Sep. 18, 1996

(30) Foreign Application Priority Data

Sep. 19, 1995 (JP) ..... 7-240075
Sep. 19, 1995 (JP) ..... 7-240076

(51) Int. Cl.[7] ..... G11B 5/39
(52) U.S. Cl. ..... 360/327.32; 360/113
(58) Field of Search ..... 360/113, 324.1–324.12, 360/325, 327.1, 327.2–327.33

(56) References Cited

U.S. PATENT DOCUMENTS 4,103,315 A 7/1978 Hempstead et al.
4,663,685 A * 5/1987 Tsang ..... 360/113

(List continued on next page.)

FOREIGN PATENT DOCUMENTS

| | | | |
|---|---|---|---|
| JP | 6-103537 | | 4/1994 |
| JP | 5-43025 | | 11/1994 |
| JP | 5-78919 | | 11/1994 |
| JP | 4-315648 | | 11/1994 |
| JP | 5-053605 | | 11/1994 |
| JP | 5-053612 | | 11/1994 |
| JP | 6-314617 | | 11/1994 |
| JP | 6-325934 | | 11/1994 |
| JP | 7-57223 | * | 4/1995 |
| JP | 6-219144 | | 5/1996 |
| JP | 8-138935 | | 5/1996 |

*Primary Examiner*—A. J. Heinz
(74) *Attorney, Agent, or Firm*—Brinks Hofer Gilson & Lione

(57) ABSTRACT

A magnetoresistive head including a magnetoresistive film formed in a read-track region, and antiferromagnetic and ferromagnetic films are formed on each end of the magnetoresistive film outside of the read-track region such that bias magnetization is applied to the magnetoresistive film by exchange coupling between the antiferromagnetic film and the ferromagnetic film. A nonmagnetic intermediate film is formed between the ferromagnetic film and the magnetoresistive film for preventing ferromagnetic coupling on a contact boundary surface between the ferromagnetic film and the magnetoresistive film. In accordance with another aspect, a magnetoresistive head includes an antiferromagnetic layer formed from an X—Mn alloy, where X is an element selected from the group consisting of Pt, Rh, Ru, Tr, and Pd. An interdiffusion layer is formed between the antiferromagnetic film and a ferromagnetic layer or a pinned magnetic layer by heat treatment.

358 Claims, 25 Drawing Sheets

U.S. PATENT DOCUMENTS 4,809,109 A * 2/1989 Howard ..... 360/113
4,947,541 A 8/1990 Toyoda et al.
5,153,513 A 10/1992 Adachi
5,159,513 A * 10/1992 Dieny ..... 360/113
5,195,004 A 3/1993 Okuda et al.
5,206,590 A 4/1993 Dieny et al.
5,285,339 A * 2/1994 Chen ..... 360/113
5,287,238 A 2/1994 Baumgart et al.
5,315,468 A * 5/1994 Lin ..... 360/113
5,344,669 A * 9/1994 Chen ..... 427/130
5,373,238 A 12/1994 McGuire et al.
5,380,548 A * 1/1995 Lin ..... 427/130
5,500,633 A 3/1996 Saito et al.
5,508,867 A 4/1996 Cain et al.
5,528,440 A 6/1996 Fontana et al.
5,529,814 A * 6/1996 Tan ..... 427/130
5,549,978 A 8/1996 Iwasaki et al.
5,552,949 A 9/1996 Hashimoto et al.
5,574,605 A 11/1996 Baumgart et al.
5,583,725 A 12/1996 Coffey et al.
5,648,884 A 7/1997 Lazzari
5,654,854 A 8/1997 Mallary
5,708,358 A 1/1998 Ravipati
5,756,191 A 5/1998 Hashimoto et al.
5,772,794 A 6/1998 Uno et al.
5,784,225 A 7/1998 Saito et al.
5,843,589 A 12/1998 Hoshiya et al.

* cited by examiner

MAGNETORESISTIVE HEAD USING EXCHANGE ANISOTROPIC MAGNETIC FIELD WITH AN ANTIFERROMAGNETIC LAYER

Matter enclosed in heavy brackets [ ] appears in the original patent but forms no part of this reissue specification; matter printed in italics indicates the additions made by reissue.

BACKGROUND OF THE INVENTION

1. Field of the Invention

In general, the present invention relates to a magnetic read head utilizing a magnetoresistive effect such as an AMR head or a spin-valve head. In particular, the present invention relates to a magnetoresistive head which sustains the linear response characteristic of the magnetoresistive effect, reduces the amount of Barkhausen noise, lessens the effect of problems encountered in the conventional antiferromagnetic film and effectively applies a bias generated by an exchange coupling magnetic field.

2. Description of the Related Art

Magnetic read heads utilizing a magnetoresistive effect of the conventional technology include an AMR (Anisotropic Magnetoresistance) head based on anisotropic magnetoresistive phenomena and a GMR (Giant Magnetoresistance) head based on spin scattering phenomena of conduction electrons. An example of the GMR head disclosed in U.S. Pat. No. 5,159,513 is a spin-valve head exhibiting a high magnetoresistive effect caused by a weak external magnetic field.

FIGS. 9 through 11 are diagrams showing a skeleton configuration of elements composing the AMR head according to the conventional technology. Reference numeral 1 shown in the figures is a soft magnetic film and reference numeral 2 is a nonmagnetic film. Reference numerals 3 and 4 are a magnetoresistive film and an antiferromagnetic film made of an FeMn alloy respectively. Reference numeral 5 is a ferromagnetic film whereas reference numeral 7 denotes a permanent magnetic film (a hard film). Reference numeral 8 is an antiferromagnetic film.

In order to operate a magnetoresistive head, two bias magnetic fields are required for the magnetoresistive film 3 which exhibits a magnetoresistive effect. One of the bias magnetic fields is used to make changes in resistance in the magnetoresistive film respond linearly to a magnetic flux from a magnetic recording medium. This bias magnetic field is applied in a Z direction perpendicular to the surface of the magnetic recording medium as shown in the figures and is called a lateral bias.

Normally called a longitudinal bias, the other bias magnetic field is applied in an X direction parallel to the surface of the magnetic recording medium and the magnetoresistive film 3. The longitudinal bias magnetic field is used for reducing the amount of Barkhausen noise which is generated by formation of a plurality of magnetic domains by the magnetoresistive film 3. In other words, the longitudinal bias magnetic field makes the change in resistance with the magnetic flux from the magnetic recording medium smooth. It is necessary to put the magnetoresistive film 3 in a single-domain state in order to reduce the amount of Barkhausen noise. There are two methods for applying the longitudinal bias for that purpose. According to one of the methods, the permanent magnetic films 7 are located at both the sides of the magnetoresistive film 3 and a leaking magnetic flux from the permanent magnetic films 7 is utilized as is shown in a structure of FIG. 10. According to the other method, on the other hand, an exchange coupling magnetic field developed on each of the contact boundary surfaces of the magnetoresistive film 3 and the antiferromagnetic films 8 is utilized as is shown in a structure of FIG. 11.

It is obvious from the structure shown in FIG. 11 wherein a bias magnetic field is generated from an exchange coupling magnetic field that this method is characterized in that the magnetoresistive film 3 is also created and extended at both ends beyond the region of the read track of the magnetic recording medium. The antiferromagnetic films 8 are created, coming in direct contact with the extended portions of the magnetoresistive film 3 to generate an exchange coupling magnetic field on each of the contact boundary surfaces between the magnetoresistive film 3 and the antiferromagnetic films 8. By pinning the direction of magnetization in the regions at both the ends of the magnetoresistive film 3 in the read-track direction (that is, the X direction shown in the figure), a bias for putting the magnetization of the read-track region of the magnetoresistive film 3 into a single-domain state in the X direction can be obtained.

The structure shown in FIG. 11 has the following problems. One of the problems is that, in spite of the fact that the magnetization in the magnetoresistive film 3 in each of the regions outside the read track is pinned in the X direction by the exchange coupling with the antiferromagnetic film 8, the direction of the magnetization in the magnetoresistive film 3 in the region outside the read track is changed by a magnetic flux from the magnetic recording medium in the Z direction shown in the figure because, normally, the intensity of the exchange coupling magnetic field is of the order in a range of several tens to 200 Oe. As a result, a magnetoresistive effect is observed also in each of the regions at both the ends in which region a magnetoresistive effect should never be observed. This problem gives rise to an inconvenience that the read track width can not be determined.

The other problem is that, since portions the magnetoresistive film in the regions at both the ends outside the read track are contiguous with the portions of the magnetoresistive film inside the read track, noise and irreversibility of the change in magnetization in the magnetoresistive film in the regions at both the ends outside the read track directly affect the change in magnetization of the magnetoresistive film inside the read track, giving rise to generation of Barkhausen noise and irreversibility of the change in magnetization in the magnetoresistive film inside the read track.

It is obvious from the structure shown in FIG. 10 wherein a bias magnetic field is generated by the permanent magnetic film that the permanent magnetic films 7 are located at both ends of the read-track region and that the direction of magnetization of each of the permanent magnetic films 7 is pinned in the read-track direction (that is, the X direction shown in the figure) by magnetic polarization. By applying a magnetic flux leaking from the permanent magnetic film 7 in the X direction into the magnetoresistive film 3, a bias for putting the magnetization of the magnetoresistive film 3 in a single-domain state in the read-track direction can be obtained.

The portions of the soft magnetic film 1, the nonmagnetic film 2 and the magnetoresistive film 3 at both the ends of the read track, which portions are in contact with the permanent magnetic films 7, must each be formed into a taper shape in order to stabilize the contact resistance against a current for detecting a magnetic resistance flowing from the permanent magnetic film 7 at one end to the soft magnetic film, then to the nonmagnetic film 2, then to the magnetoresistive film 3 and finally to the permanent magnetic film 7 at the other end. However, the taper shape gives rise to the following problems in the magnetic characteristics of the permanent magnetic film 7.

One of the problems is that the soft magnetic film 1, the nonmagnetic film 2 and the magnetoresistive film 3 each become an underlayer in the process of manufacturing the permanent magnetic film 7 at the tapered sections. In general, the magnetic characteristics of a permanent magnetic layer are affected very easily by the underlayer thereof. In the case of the structure shown in FIG. 10, the magnetic characteristics of the permanent magnetic film 7 in close proximity to the boundary surface facing the soft magnetic film 1, the nonmagnetic film 2 and the magnetoresistive film 3 are affected by the three underlayers of different types. As a result, it is extremely difficult to obtain stable magnetic characteristics.

The other problem is that, in order to put the magnetization of the magnetoresistive film 3 in a single-domain state in the read-track direction (that is, in the X direction shown in the figure), the permanent magnetic film 7 is polarized so as to orientate a number of magnetic components thereof in the read-track direction. None the less, since the coercive force of the permanent magnetic film 7 is of the order of several hundreds of Oe at the most, the direction of magnetization in the magnetoresistive film 3 can not be prevented from swinging subtly from the read-track direction due to the magnetic flux from the magnetic recording medium. That is to say, when the permanent magnetic film 7 is brought into direct contact with the magnetoresistive film 3, ferromagnetic coupling is developed between the permanent magnetic film 7 and the magnetoresistive film 3. As a result, fluctuations in magnetization occurring in the permanent magnetic film 7 directly affect the direction of magnetization in the magnetoresistive film 3.

If the fluctuation in magnetization occurring in the permanent magnetic film is smooth, the effect of the fluctuation on the magnetoresistive film is also smooth as well, giving rise to no problems. If the fluctuation is not smooth but irreversible instead or if Barkhausen noise is generated, on the other hand, there will be an irreversible effect on the change in response of the magnetoresistive film to the magnetic flux from the magnetic recording medium or there will be noise in the change in response, giving rise to generation of Barkhausen noise in the magnetoresistive film itself.

The structure shown in FIG. 9 is the structure of a conventional magnetoresistive head disclosed in Japanese Published Unexamined Patent Application No. Hei 7-57223 (1995). In this structure, a bias applied to the magnetoresistive film 3 for putting the magnetization of the magnetoresistive film 3 in a single-domain state in the X direction is obtained by applying a magnetic flux of the ferromagnetic layer 5 magnetized in the X direction by exchange coupling with the antiferromagnetic film 4 into the magnetoresistive film 3 and, at the same time, ferromagnetic coupling is developed on the contact boundary surface between the ferromagnetic film 5 and the magnetoresistive film 3.

The following problems are encountered in the structure shown in FIG. 9. The intensity of an exchange coupling magnetic field of the ferromagnetic film 5 experiencing exchange coupling with the antiferromagnetic film 4 is of the order of 50 Oe in the case of an NiFe ferromagnetic film 5 exchange-coupled with an FeMn antiferromagnetic film 4 with the film thickness of the former set at 300 Å. In spite of the magnetization in the X direction by the exchange coupling, the direction of magnetization can not be prevented from fluctuating subtly due to the magnetic flux from the magnetic recording medium.

In the case of the exchange-coupled ferromagnetic film 5 brought into direct contact with the magnetoresistive film 3, ferromagnetic coupling is developed between the ferromagnetic film 5 and the magnetoresistive film 3. Thus, variations in magnetization occurring in the ferromagnetic film 5 directly affect variations in magnetization occurring in the magnetoresistive film 3. There is no guarantee at all that fluctuations in magnetization occurring in the exchange-coupled ferromagnetic film 5 which fluctuations are caused by the magnetic flux from the magnetic recording medium are smooth as is the case with the permanent magnetic film 7 shown in FIG. 10. As a result, noise is generated in variations in response of the magnetoresistive film 3 to the magnetic flux from the magnetic recording medium, giving rise to generation of Barkhausen noise.

In a sandwich structure of a free magnetic layer 9, a nonmagnetic intermediate layer 10 and a pinned magnetic layer 11 shown in FIGS. 12 and 13 for obtaining an optimum operation of a spin-valve head, on the other hand, it is necessary to apply a bias in the read-track direction (that is, in the X direction shown in the figures) to the free magnetic layer 9 in order to put the free magnetic layer 9 in a single-domain state and to magnetize the free magnetic layer 9 in the read-track direction as well as to apply a bias to the pinned magnetic layer 11 in the Z direction which is perpendicular to the direction of magnetization of the free magnetic layer 9 in order to put the pinned magnetic layer 11 in a single-domain state and to magnetize the pinned magnetic layer 11 in the Z direction. In this structure, a magnetic flux generated by the magnetic recording medium in the Z direction shown in the figures does not change the direction of magnetization in the pinned magnetic layer 11, but changes the direction of magnetization in the free magnetic layer 9 in the range $90° \pm \theta$ relative to the direction of magnetization in the pinned magnetic layer 11, allowing a linear response characteristic of the magnetoresistive effect to be obtained.

In order to pin the direction of magnetization in the pinned magnetic layer 11 in the Z direction shown in the figures, a relatively strong bias magnetic field is required. The stronger the bias magnetic field, the better the pinning of the direction of magnetization. A bias magnetic field of at least 100 Oe is required in order to prevent the direction of magnetization from fluctuating due to the magnetic flux from the magnetic recording medium, thus, overcoming an antimagnetic field in the Z direction shown in the figures.

As a method of producing such a bias magnetic field, an exchange anisotropic magnetic field which is developed by bringing an [antimagnetic] *antiferromagnetic* layer 12 into contact with the pinned magnetic layer 11 is normally adopted.

The bias applied to the free magnetic layer 9 is used for assuring the linear response characteristic and for reducing the amount of Barkhausen noise generated by creation of a number of domains. Normally, the same methods as those for generating the longitudinal bias in an AMR head is adopted for generating the bias applied to the free magnetic layer 9. According to this method, permanent magnetic layers 13 are located at both ends of the free magnetic layer 9 and a leaking magnetic flux from each of the permanent magnetic layers 13 is utilized. As an alternative method, an exchange anisotropic magnetic field developed on the contact boundary surface with an antiferromagnetic layer 15 is utilized.

As described above, by utilizing an exchange anisotropic magnetic field developed on a contact boundary surface with the antiferromagnetic layer for generating the longitudinal bias of an AMR head, and the bias of the pinned magnetic layer and the bias of the free magnetic layer of a spin-valve head, a magnetoresistive head can be implemented in which the linear response characteristic can be improved and the amount of Barkhausen noise can be reduced.

The exchange anisotropic magnetic field is a phenomenon caused by an exchange interaction among magnetic momentums on the contact boundary surface between the ferromagnetic film and the antiferromagnetic film. In the case of a ferromagnetic film made of an NiFe alloy, the antiferromagnetic film that generates an exchange anisotropic magnetic field in conjunction with the NiFe film is typically made of an FeMn alloy. However, the corrosion resistance of an FeMn film is very poor, giving rise to a problem that the exchange anisotropic magnetic field degrades substantially because development of corrosion has been under way during the manufacturing process and the operation of the magnetic head in addition to a problem that the magnetic recording medium is damaged. In addition, the temperature of regions in close proximity to the FeMn layer rises to about 120° C. due to heat generated by a detection current during the operation of the magnetic head and the exchange anisotropic magnetic field generated by the FeMn film is sensitive to changes in temperature as is widely known. The intensity of the exchange anisotropic magnetic field all but linearly decreases with the increase in temperature to about 150° C. known as a blocking temperature Tb at which the exchange anisotropic magnetic field disappears. As a result, a stable exchange anisotropic magnetic field can not be obtained.

An NiMn alloy or an NiMnCr alloy which has a face-centered tetragonal structure disclosed in U.S. Pat. No. 5,315,468 is known as an invention for improving the corrosion resistance and the blocking temperature of the FeMn film. Even though the corrosion resistance of the NiMn film is better than that of the FeMn film, it is still not sufficient for practical use. The NiMnCr film is made of NiMn doped with Cr in order to improve the corrosion resistance of the NiMn film. However, the improvement of the corrosion resistance by the Cr doping gives rise to a problem that the intensity of the exchange anisotropic magnetic field and the blocking temperature decrease.

In addition, in order to obtain an exchange anisotropic magnetic field from the NiMn or NiMnCr alloy, it is necessary to create an ordered-structure crystal of the CuAg-I type having a face-centered tetragonal structure on a portion of the antiferromagnetic film and, on the top of that, control of ordered-to-random transition and control of the volume density of ordered and random phases are required as a matter of course. As a result, in order to obtain stable characteristics, the process control and monitoring during the process of manufacturing the magnetic head can not help becoming very complex. There are also manufacturing-process problems in order to obtain the required exchange anisotropic magnetic field that magnetic-field heat treatment must be repeated a plurality of times and that the rate of decrease in temperature is low, taking a long time to decrease the temperature from a high value to a low one. For example, it takes 17 hours to have the temperature decrease from 255° to 45° C. For more information, refer to Appl. Phys. Lett. 65(9), 29 Aug. 1994.

A method for creating a layer made of an Ni—Fe—Mn three-element alloy on an NiFe/FeMn boundary surface through diffusion by heat treatment carried out on an NiFe/FeMn stacked film at the temperature range 260° to 350° C. for 20 to 50 hours is disclosed in U.S. Pat. No. 4,809,109 as an invention for improving the blocking temperature of a film made of an FeMn alloy. The fact that this method is not effective for the improvement of the corrosion resistance, a big problem encountered in the film made of an FeMn alloy, can be understood with ease. On the top of that, the fact that the heat treatment requires a long time ranging from 20 to 50 hours gives rise to a problem in the manufacturing process.

According to publications such as "Magnetic Material Handbook" published by Asakura Shoten, a publisher, Mn-family alloys such as NiMn, PdMn, AuMn, PtMn and RhMn can be used as a ferromagnetic material. None the less, there is no comment with respect to the exchange anisotropic magnetic field on the contact boundary surface with the ferromagnetic film. On the top of that, there is no clear description at all regarding the characteristics of the ferromagnetic film itself and the exchange anisotropic magnetic field in the case of a super-thin film with a thickness of several hundreds of Å.

SUMMARY OF THE INVENTION

It is a first object of the present invention to provide a structure of a magnetoresistive head which structure allows a stable bias magnetic field to be generated in a magnetoresistive film thereof in order to solve the aforementioned problems of the exchange coupling bias in the conventional structure shown in FIG. 11, overcome the aforementioned problems of the permanent magnetic bias in the conventional structure shown in FIG. 10, and eliminate the aforementioned problems of the bias in the structure of FIG. 9 disclosed to the public.

It is a second object of the present invention to provide a magnetoresistive (MR) head having an excellent linear response characteristic and a reduced amount of Barkhausen noise by providing an antiferromagnetic film which has excellent corrosion resistance and can apply a sufficient required exchange anisotropic magnetic field in the case of a super-thin film.

It is a third object of the present invention to provide an MR head having an excellent linear response characteristic and a reduced amount of Barkhausen noise by providing an antiferromagnetic film which has moderate dependence of an exchange anisotropic magnetic field on the temperature and a high blocking temperature.

It is a fourth object of the present invention to provide an MR head having an excellent linear response characteristic and a reduced amount of Barkhausen noise by providing an antiferromagnetic film which allows a heat treatment step for obtaining the characteristics described above to be implemented at a temperature and a rate of decrease in temperature and in a time which temperature, rate of decrease in temperature and time are applicable to a process of manufacturing an ordinary MR head.

The present invention provides a magnetoresistive head in which: ferromagnetic films exhibiting a magnetoresistive effect are used; in a read-track region at the center of the magnetoresistive head, a magnetoresistive film is created; at each of both ends of the magnetoresistive film outside the read-track region, an antiferromagnetic film and the ferromagnetic film experiencing an exchange coupling magnetic field due to direct contact with the antiferromagnetic film are created in such a way that the ferromagnetic film is not brought into direct contact with the magnetoresistive film so as to prevent ferromagnetic coupling from being developed by a contact boundary surface between the magnetoresistive film and the ferromagnetic film; and bias magnetization is applied to the magnetoresistive film by exchange coupling between the ferromagnetic film and the antiferromagnetic film.

In order to prevent the ferromagnetic film from being brought into direct contact with the magnetoresistive film, a film made of Ta is introduced between the ferromagnetic film and the magnetoresistive film as an intermediate layer or the ferromagnetic and antiferromagnetic films are created into a structure wherein the antiferromagnetic film is brought into direct contact with the magnetoresistive film.

in the magnetoresistive head provided by the present invention, a sufficient required bias magnetic field is applied by the antiferromagnetic film in direct contact with the ferromagnetic film exhibiting a magnetoresistive effect in order to make the response of the magnetoresistive effect to a magnetic flux from a magnetic recording medium linear and to reduce the amount of Barkhausen noise. The antiferromagnetic film is made of a PtMn alloy, heat treatment is carried out at temperatures in the range 200° to 350° C. after the ferromagnetic film in direct contact with the PtMn antiferromagnetic film is created; and a predetermined interdiffusion layer is created on the boundary surface between the PtMn antiferromagnetic film and the ferromagnetic film in direct contact with the PtMn antiferromagnetic film in order to generate an exchange anisotropic magnetic field.

The above heat treatment can be implemented at a temperature and a rate of decrease in temperature and in a time which temperature, rate of decrease in temperature and time are equivalent to those used in the process of manufacturing an ordinary magnetoresistive head, thus being a very practical heat-treatment method.

In addition, the corrosion resistance of the PtMn alloy is extremely excellent in comparison with those of the FeMn, NiMn and NiMnCr alloys. On the top of that, no corrosion is observed at all in a variety of solvents and cleansers during the process of manufacturing the magnetoresistive head. By the same token, the operation of the magnetoresistive head in a harsh environment is chemically stable.

In addition, the characterizing features of the antiferromagnetic film made of a PtMn alloy are that the exchange anisotropic magnetic field obtained by creating a predetermined interdiffusion layer on the boundary surface between the ferromagnetic film and the antiferromagnetic film made of an PtMn alloy in direct contact with the ferromagnetic film is very stable thermally in comparison with an exchange anisotropic magnetic field created by an FeMn antiferromagnetic film, and that the bias magnetic field is very stable in the range of the head operating temperature because it is possible to generate an exchange anisotropic magnetic field having a constant intensity in the range from the ambient temperature to 120° C., the operating temperatures of the magnetoresistive head. By the same token, the blocking temperature of the PtMn alloy at which the exchange anisotropic magnetic field disappears is 380° C. which is much higher than 150° C., the blocking temperature of the FeMn alloy. As a result, the exchange anisotropic magnetic field is extremely stable during the process of manufacturing the magnetoresistive head and during the operation of the head.

On the top of that, in the case of the PtMn alloy, since it is possible to generate an exchange anisotropic magnetic field on a boundary surface either above or beneath of the ferromagnetic film in direct contact with the antiferromagnetic film made of an PtMn alloy, the exchange anisotropic magnetic field can be obtained without an underlayer film such as a film made of Ta for making the crystal orientations uniform as is required in order to obtain an exchange anisotropic magnetic field by using a film made of an FeMn alloy. As a result, it is now possible to build a device structure which can not be constructed so far due to restrictions imposed by the method of using the conventional antiferromagnetic film.

DESCRIPTION OF THE PREFERRED EMBODIMENTS

Figure 1:
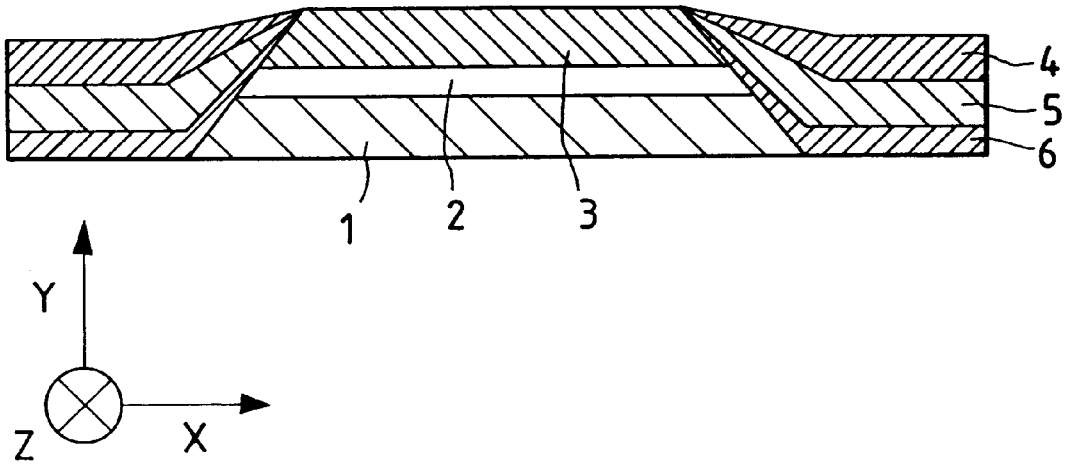
FIG. 1 is a diagram showing a first embodiment of the present invention which embodiment implements a structure wherein Ta film is created as an intermediate film.

FIG. 1 is a diagram showing a magnetoresistive head provided by a first embodiment of the present invention. As shown in the figure, the magnetoresistive head comprises a magnetoresistive film 3, a nonmagnetic film 2, a soft magnetic film 1, antiferromagnetic films 4, ferromagnetic films 5 and intermediate films 6. The magnetoresistive film 3, the nonmagnetic film 2 and the soft magnetic film 1 have taper shapes in contact with the intermediate film 6 on both sides thereof. An exchange coupling magnetic field is used instead of a magnetic field generated by a permanent magnet bias as a longitudinal bias magnetic field of the magnetoresistive film 3. The longitudinal bias magnetic field is applied in parallel to the surface of a magnetic recording medium and the magnetoresistive film 3 in the X direction shown in the figure, putting the magnetization of the read-track region of the magnetoresistive film 3 in a single-domain state in the X direction.

Ta, a nonmagnetic substance, is used as a material for making the intermediate film 6. In addition to Ta, Ti (titanium), Zr (zirconium), Hf (hafnium) and Cr (chromium) are materials which are expected to have the same functions and effects when used for making the intermediate film 6.

FIG. 1 shows a structure wherein an exchange coupling magnetic field generated by exchange coupling of the antiferromagnetic film 4 and the ferromagnetic film 5 is applied to the magnetoresistive film 3. The present invention is characterized in that Ta, a nonmagnetic material, is used for making the intermediate film 6 between the ferromagnetic film 5 and the three films, that is, the magnetoresistive film 3, the nonmagnetic film 2 and the soft magnetic film 1.

Figure 9:
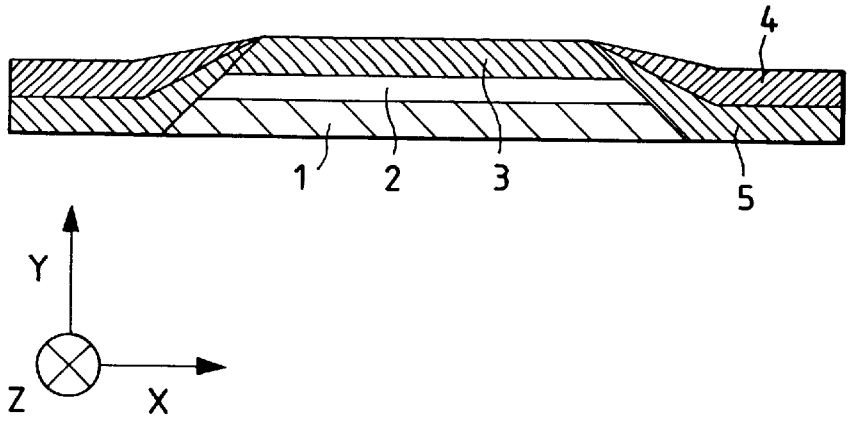
FIG. 9 is a diagram showing a conventional structure for generating an exchange coupling magnetic field.

In the conventional structure shown in FIG. 9, the magnetoresistive film 3 is brought into direct contact with the ferromagnetic film 5 experiencing exchange coupling. At the contact location, ferromagnetic coupling is resulted in, serving as a cause of the Barkhausen noise.

By introducing the Ta film 6 as an intermediate film in accordance with the present invention, it is possible to introduce a function for preventing ferromagnetic coupling from being generated between the magnetoresistive film 3 and the ferromagnetic film 5. In addition, by using the Ta film 6 as an underlayer film of the ferromagnetic film 5 experiencing exchange coupling in the process of stacking a variety of films, an effect of making crystal orientations uniform can be utilized in the creation of the structure so that the lattice constant of the Ta crystal matches the lattice constant of the ferromagnetic film 5. In this way, the intensity of the exchange coupling magnetic field can be further increased. Since the stronger the intensity of the exchange coupling magnetic field of the ferromagnetic film, the more stable the bias applied to the magnetoresistive film, an exchange coupling magnetic field with a strong intensity is desirable as far as the function of the magnetoresistive head is concerned.

Figure 10:
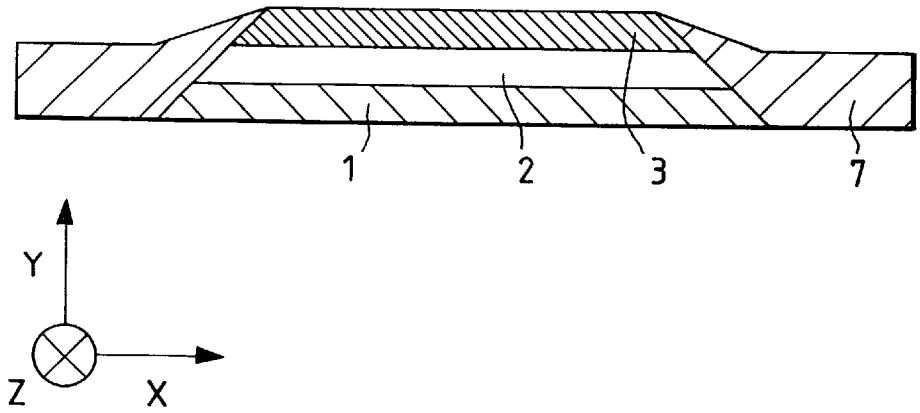
FIG. 10 is a diagram showing a conventional structure for generating a bias magnetic field by using a permanent magnetic film.
Figure 11:
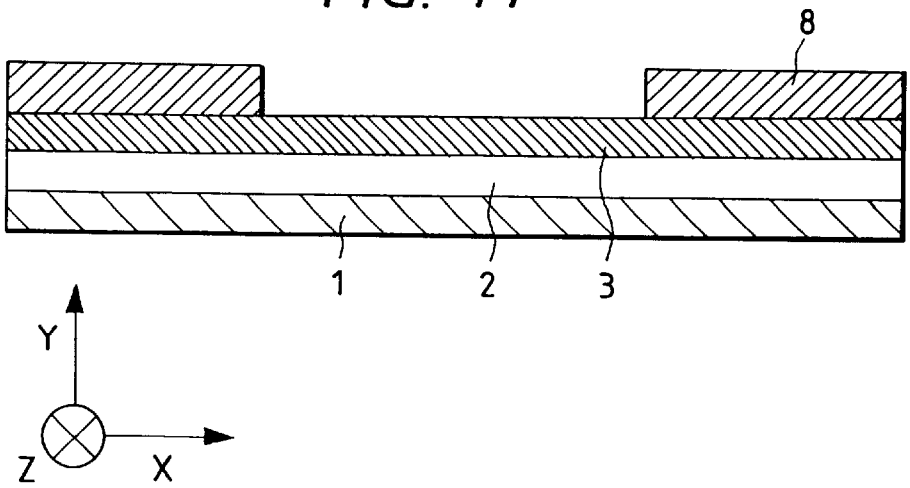
FIG. 11 is a diagram showing a conventional structure for generating an exchange coupling magnetic field.

In addition, since a permanent magnetic bias is not used in the structure shown in FIG. 1, the problem encountered in the conventional structure shown in FIG. 10, that is, that the magnetic characteristic of the permanent magnetic film is unstable at a location in close proximity to the contact boundary surface between the permanent magnetic film and the three films is solved. By the same token, since the magnetization of the ferromagnetic film experiencing exchange coupling is oriented in the read-track direction, the magnetic flux of the ferromagnetic film flows into the magnetoresistive film, making the bias for putting the magnetization of the magnetoresistive film into a single-domain state in the read-track direction stable and easy to apply.

Figure 2:
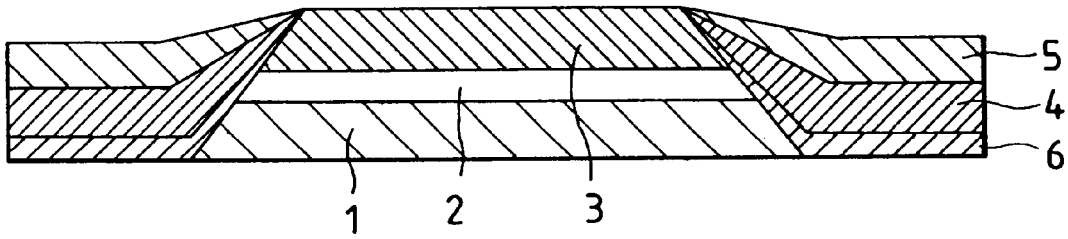
FIG. 2 is a diagram showing a second embodiment of the present invention which embodiment implements a structure wherein Ta film is created as an intermediate film.

A structure shown in FIG. 2 is a second embodiment of the present invention. As shown in the figure, the stacking order of the antiferromagnetic film 4 and the ferromagnetic film 5 on the Ta underlayer film 6 in the structure is opposite to that shown in FIG. 1. Also in this case, the ferromagnetic coupling of the magnetoresistive film 3 and the ferromagnetic film 5 experiencing exchange coupling with the antiferromagnetic film 4 is cut off. The structure is created by taking advantage of an effect of making the crystal orientations uniform so that the lattice constant of the Ta crystal matches the lattice constant of the antiferromagnetic film 4. On the top of that, the exchange coupling becomes stronger, further increasing the intensity of the exchange coupling magnetic field.

Figure 3:
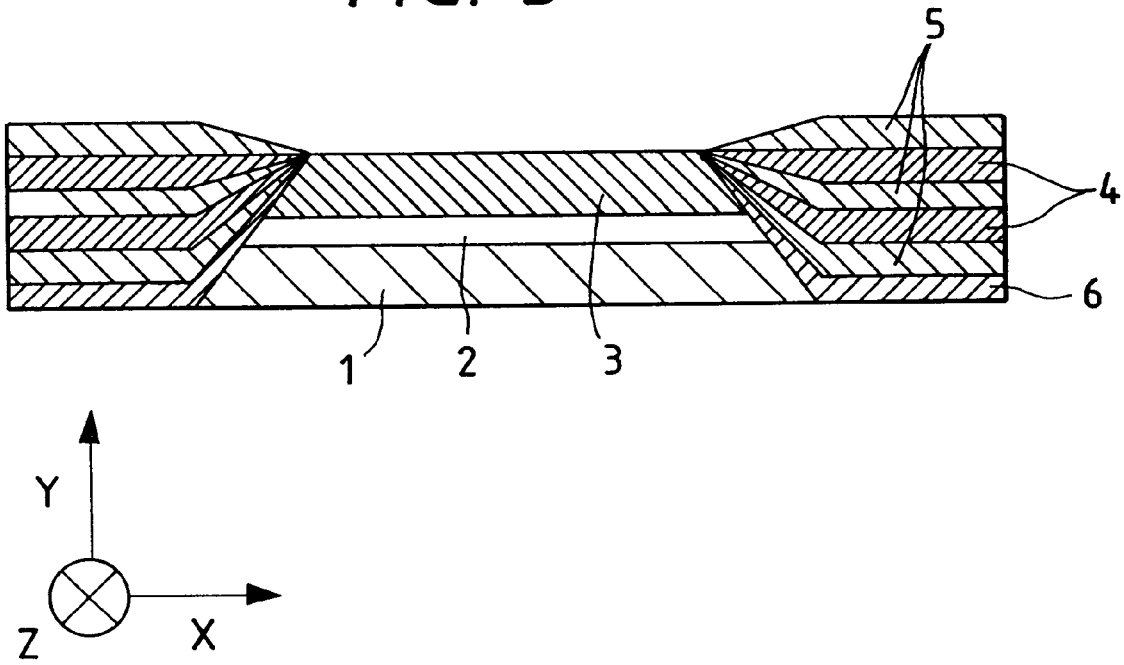
FIG. 3 is a diagram showing a third embodiment of the present invention which embodiment implements a structure wherein Ta film is created as an intermediate film.

A structure shown in FIG. 3 is a third embodiment of the present invention. As shown in the figure, the ferromagnetic film 5 is created on the Ta underlayer film 6 and the antiferromagnetic film 4 is further stacked on the ferromagnetic film 5. In this way, an exchange coupling magnetic field of the ferromagnetic field 5 is developed by the antiferromagnetic film 4. At the same time, the ferromagnetic film 5 and the antiferromagnetic film 4 are stacked on each other alternately to form a multilayer stack. In such a multilayer stack, the intensity of the bias magnetic field generated by all the ferromagnetic films which experience exchange coupling increases, making the bias applied to the magnetoresistive film 3 more stable.

In addition, the intensity of the exchange coupling magnetic field is dependent upon the type of the antiferromagnetic film and inversely proportional to the thickness of the ferromagnetic film without regard to the type of the antiferromagnetic film as is obvious from results of experiments to be described later. For more information, refer to FIG. 5. It is therefore desirable to use a film made of a PtMn alloy, an antiferromagnetic film which can increase the intensity of the exchange coupling magnetic field. In addition, besides PtMn, an alloy film made of IrMn, PdMn, RhMn or RuMn can also be used as well.

By the same token, with the antiferromagnetic films made of the same material, if the ferromagnetic film is split into six layers each having a film thickness of 50 Å to give a total film thickness of 6 layers×50 Å/layer=300 Å for pinning, the pinning of the magnetization of the ferromagnetic films in the X direction will result in an exchange coupling magnetic field with an intensity six times the intensity of an exchange coupling magnetic field obtained by pinning the magnetization of a single-layer ferromagnetic film having a thickness of 300 Å. The multilayer structure is thus a desirable structure for providing a bias magnetic field to the magnetoresistive film.

Figure 4:
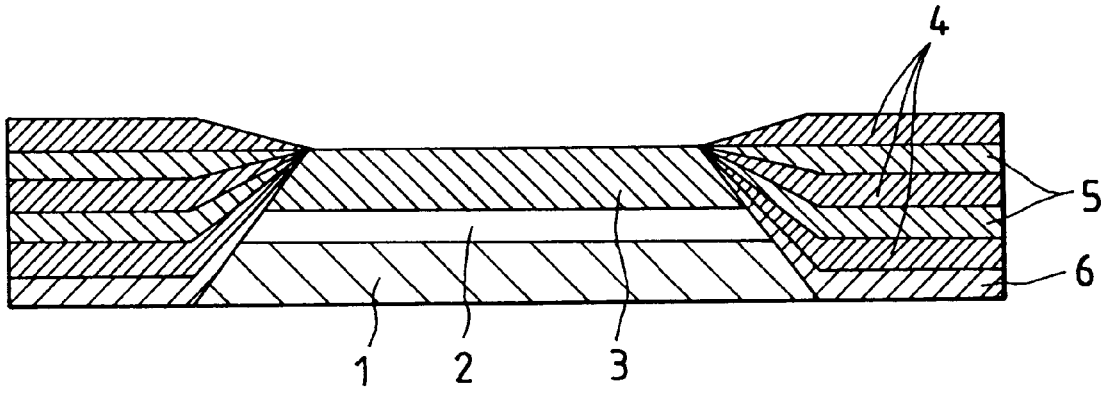
FIG. 4 is a diagram showing a fourth embodiment of the present invention which embodiment implements a structure wherein Ta film is created as an intermediate film.

A structure shown in FIG. 4 is a fourth embodiment of the present invention. As shown in the figure, the antiferromagnetic films 4 and the ferromagnetic films 5 are stacked alternately above the Ta underlayer film 6 in a stacking order different from that used in the structure shown in FIG. 3. Much like the third embodiment shown in FIG. 3, in the structure shown in FIG. 4, the bias magnetic field applied to the magnetoresistive film 3 has a strong intensity and is stable.

In addition, in another embodiment of the present invention which embodiment is not shown in a figure, antiferromagnetic films are brought into direct contact with the upper and lower surfaces of a single-layer ferromagnetic film. In such a structure, the intensity of the exchange coupling magnetic field is twice that obtained by an antiferromagnetic film created only on one side of the ferromagnetic film.

Figure 5:
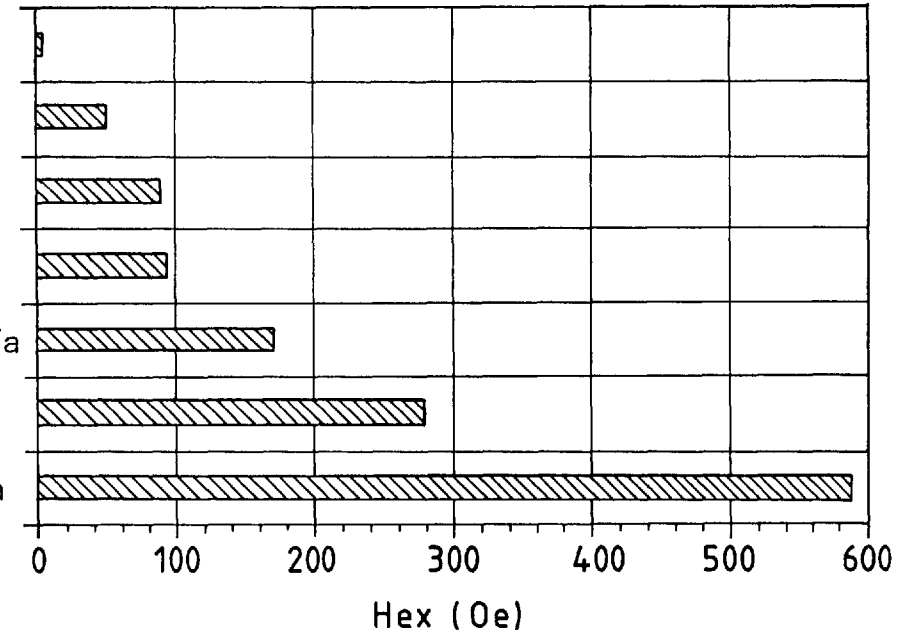
FIG. 5 is typical proven data obtained by experiments which data represents the intensities of bias magnetic fields for a variety of structures using a film made of Ta in accordance with the present invention.

The results of experiments shown in FIG. 5 are intensities of exchange coupling magnetic fields (Hex) for structures each comprising a ferromagnetic film made of an NiFe alloy and an antiferromagnetic film made of either an FeMn or PtMn alloy with or without an underlayer film made of Ta.

In the experiments, the films are created by using the RF (Radio Frequency) conventional sputtering equipment. A silicon wafer including $Al_2O_3$ is used as a substrate with indirect water cooling adopted during the process of creating the films. However, no deliberate heating is carried out. Used targets are a mix of Fe and Mn with an atom ratio of 50% to 50%, a mix of Ni and Fe with an atom ratio of 80% to 20%, Mn and Ta having a diameter of 8 inches. The composition of a film made of a PtMn alloy is created by adjusting Pt pellets having a 100 mm angle placed on the Mn target. The film composition is created by means of an XMA (X-ray microanalyzer) to give a thickness of about 2 $\mu$m. The sputter input power is 100 W and the sputter gas pressure is 1 mTorr. During the process of creating films, a pair of permanent magnets are provided on both the sides of the substrate to apply a magnetic field with an intensity of about 50 Oe to the substrate.

The thickness of the films made of FeMn and PtMn alloys is 300 Å while the thickness of the film made of Ta is 100 Å which are uniform values for all the structures. After the creation of the films, heat treatment at temperatures in the range 250° to 270° C. is carried out while applying a one-directional magnetic field with an intensity of about 1,000 Oe in a vacuum with a degree of vacuum of $5\times10^{-6}$ Torr or below. The intensity of the exchange coupling magnetic fields (Hex) is the intensity obtained after the heat treatment. The film made of a PtMn alloy has a composition ratio of Pt to Mn set at 46/54 in terms of at %. Ta of the uppermost layer is provided for preventing surface oxidation from occurring during the heat treatment.

In the case of an embodiment I shown in FIG. 5, in order to effectively obtain an exchange coupling magnetic field of the NiFe ferromagnetic film exchange-coupled with the FeMn antiferromagnetic film, the Ta underlayer film is created in order to avoid ferromagnetic coupling caused by the NiFe ferromagnetic film. As a result, a magnetic field (Hex) with a strong intensity in comparison with a comparison example is obtained. The structure of the embodiment I proves the effectiveness of the underlayer film made of Ta.

In the case of an embodiment II, the PtMn antiferromagnetic film is used in place of the film made of an FeMn alloy. It is a matter of course that the intensity of the exchange coupling magnetic field (Hex) is stronger than that of the comparison example. The intensity of the exchange coupling magnetic field (Hex) of the embodiment II is even stronger than that of the embodiment I, proving the effectiveness of the film made of a PtMn alloy when used as an antiferromagnetic film.

In the case of an embodiment III, the stacking order of the ferromagnetic film and the antiferromagnetic film on the underlayer film made of Ta is opposite to that of the embodiment II, proving that an equivalent exchange coupling magnetic field (Hex) can be obtained even if the stacking order is reversed.

In the case of an embodiment IV, the NiFe ferromagnetic film is sandwiched by the PtMn antiferromagnetic films, resulting in exchange coupling at two surfaces. As a result, the intensity of the exchange coupling magnetic field (Hex) of the embodiment IV is twice those of the embodiments II and III.

In the case of an embodiment V, the thickness of the NiFe ferromagnetic film is reduced to 50 Å. The structure of the embodiment V proves that a stronger intensity of the exchange coupling magnetic field (Hex) can be obtained.

In the case of an embodiment VI, the structure of the embodiment V is adopted except that the NiFe ferromagnetic film is sandwiched by the PtMn antiferromagnetic films. The structure of the embodiment VI also proves that a stronger intensity of the exchange coupling magnetic field (Hex) can be obtained.

Figure 6:
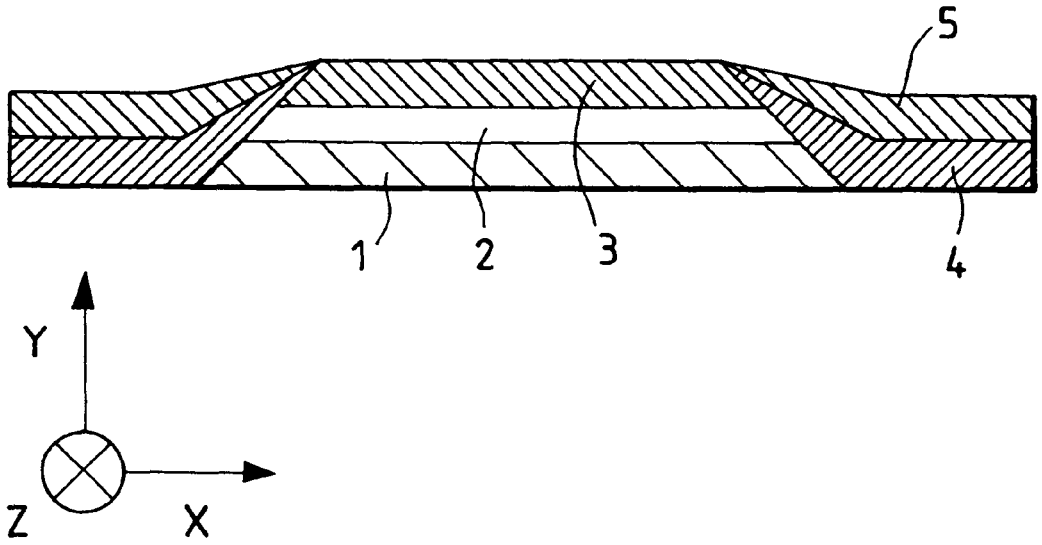
FIG. 6 is a diagram showing a fifth embodiment of the present invention wherein ferromagnetic coupling developed by a magnetoresistive film in conjunction with a ferromagnetic film is cut off.

A structure shown in FIG. 6 is a fifth embodiment of the present invention. In the structure shown in the figure, the ferromagnetic film 5 experiencing exchange coupling is not brought into direct contact with the magnetoresistive film 3. In the structure of the conventional magnetoresistive head shown in FIG. 9, on the other hand, since the ferromagnetic film experiencing exchange coupling is brought into direct contact with the magnetoresistive film, ferromagnetic coupling is resulted in between the ferromagnetic film and the magnetoresistive film, causing a change in magnetization in the ferromagnetic film to directly affect the change in magnetization in the magnetoresistive film. Since there is no guarantee at all the fluctuations in magnetization occurring in the ferromagnetic film caused by a magnetic flux from the magnetic recording medium are smooth, the ferromagnetic coupling causes noise to be generated in the response variation of the magnetoresistive film in response to the magnetic flux from the magnetic recording medium, giving rise to generation of Barkhausen noise.

In the structure shown in FIG. 6, one surface of the antiferromagnetic film 4, that is, the lower surface of the created film, is brought into direct contact with the magnetoresistive film 3. As a result, an exchange coupling magnetic field is generated in both the magnetoresistive film 3 and the ferromagnetic film 5. By adopting such a structure, it is possible to obtain the following effects.

Since the magnetic moment of the antiferromagnetic film itself very hardly moves due to a magnetization ratio of the order of $10^{-5}$, the direction of magnetization in the antiferromagnetic film is virtually not affected at all by the flux generated by the magnetic recording medium. In other words, the direction of magnetization in the antiferromagnetic film can be considered to change only at a rate of change of 0.01 or below. As a result, even if the magnetoresistive film is brought into direct contact with the antiferromagnetic film, the direction of magnetization in the magnetoresistive film can be changed by controlling variations in magnetization direction in the magnetoresistive film only. On the top of that, since an exchange coupling magnetic field for orientating the magnetization in the read-track direction is generated by the antiferromagnetic field at each read-track edge of the magnetoresistive film, a bias for putting the magnetization in the magnetoresistive film into a single-domain state in the read-track direction is easy to apply. In addition, since the magnetization of the ferromagnetic film experiencing exchange coupling is oriented in the read-track direction, the magnetic flux of the ferromagnetic film flows into the magnetoresistive film. As a result, the bias for putting the magnetization of the magnetoresistive film into a single-domain state in the read-track direction is easy to apply.

Figure 7:
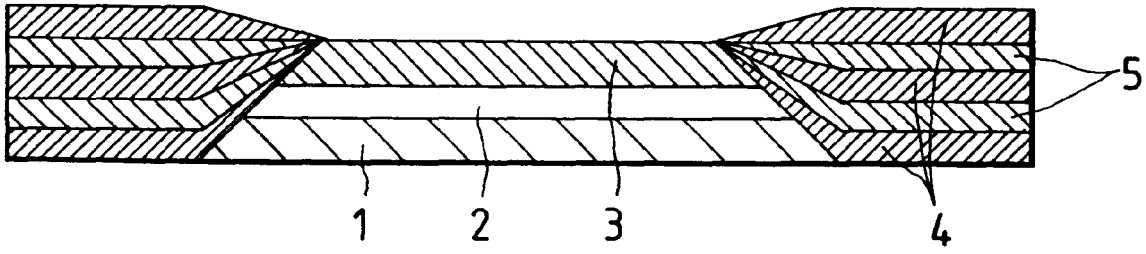
FIG. 7 is a diagram showing a sixth embodiment of the present invention wherein ferromagnetic coupling developed by a magnetoresistive film in conjunction with a ferromagnetic film is cut off.

In a structure shown in FIG. 7, the antiferromagnetic film 4, the ferromagnetic film 5 and the antiferromagnetic film 4 are further stacked on the antiferromagnetic film 4 and the ferromagnetic film 5 of the structure shown in FIG. 6. The intensity of an exchange coupling magnetic field is dependent upon the type of the antiferromagnetic film and inversely proportional to the thickness of the ferromagnetic film without regard to the type of the antiferromagnetic film as is obvious from results of experiments to be described later. For more information, refer to FIG. 8. It is therefore desirable to use a film made of a PtMn alloy, an antiferromagnetic film which can increase the intensity of the exchange coupling magnetic field.

By the same token, with the antiferromagnetic films made of the same material, if the ferromagnetic film is split into six layers each having a film thickness of 50 Å to give a total film thickness of 6 layers×50 Å/layer=300 Å for pinning, the pinning of the magnetization of the ferromagnetic films in the X direction will result in an exchange coupling magnetic field with an intensity six times the intensity of an exchange coupling magnetic field obtained by pinning the magnetization of a single-layer ferromagnetic film having a thickness of 300 Å. The multilayer structure is thus a desirable structure for providing a bias magnetic field to the magnetoresistive film.

Figure 8:
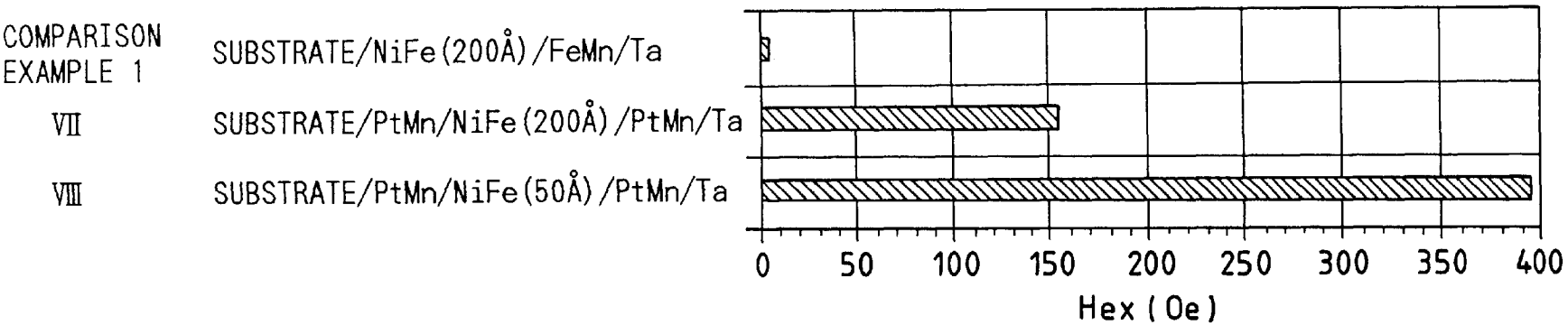
FIG. 8 is typical proven data obtained by experiments which data represents the intensities of bias magnetic fields for a variety of structures wherein ferromagnetic coupling is cut off in accordance with the present invention.

The results of experiments shown in FIG. 8 are intensities of exchange coupling magnetic fields (Hex) for structures each comprising a ferromagnetic film made of an NiFe alloy and an antiferromagnetic film made of either an FeMn or PtMn alloy. The methods of creating films, the substrate, the film thicknesses, the heat treatment and the like are the same as those of the results of experiments shown in FIG. 5.

The comparison example is the same as that of the conventional magnetoresistive head wherein the antiferromagnetic film is made of an FeMn alloy. In the case of an embodiment VII shown in FIG. 8, however, the antiferromagnetic film is made of a PtMn alloy instead of FeMn. In the structure of the embodiment VII, the NiFe ferromagnetic film is sandwiched by the PtMn films. The structure of the embodiment VII proves that a strong intensity of the exchange coupling magnetic field (Hex) can be obtained.

In the case of an embodiment VIII, the thickness of the NiFe ferromagnetic film is reduced to 50 Å when compared with that of the embodiment VII. The structure of the embodiment VIII proves that a stronger intensity of the exchange coupling magnetic field (Hex) can be obtained.

Figure 12:
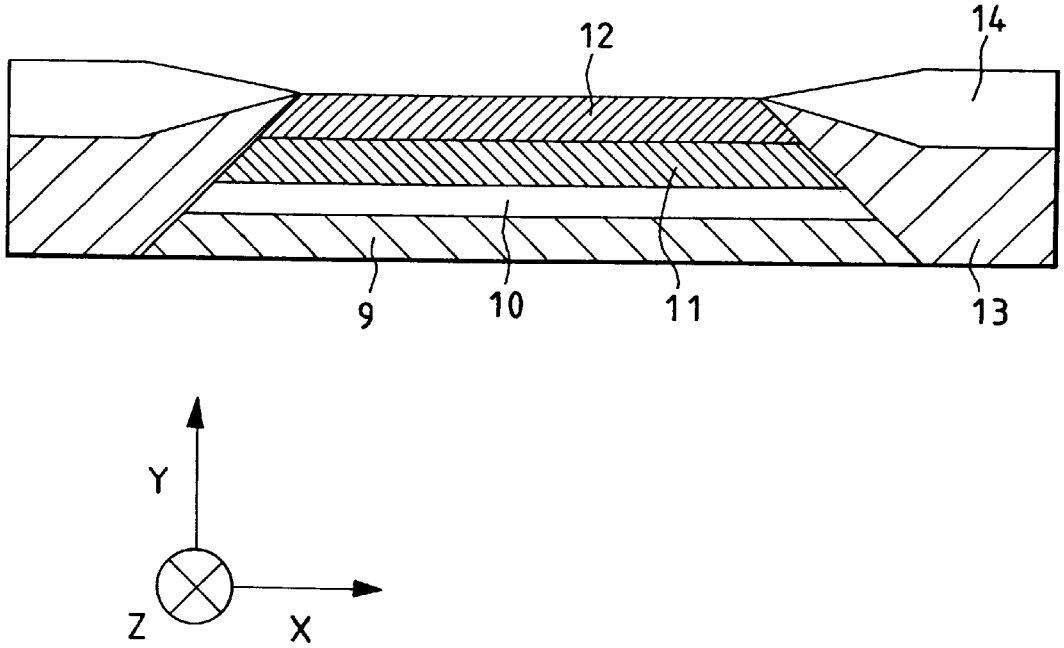
FIG. 12 is a diagram used for explaining a bias magnetic field generated in a spin-valve head.
Figure 13:
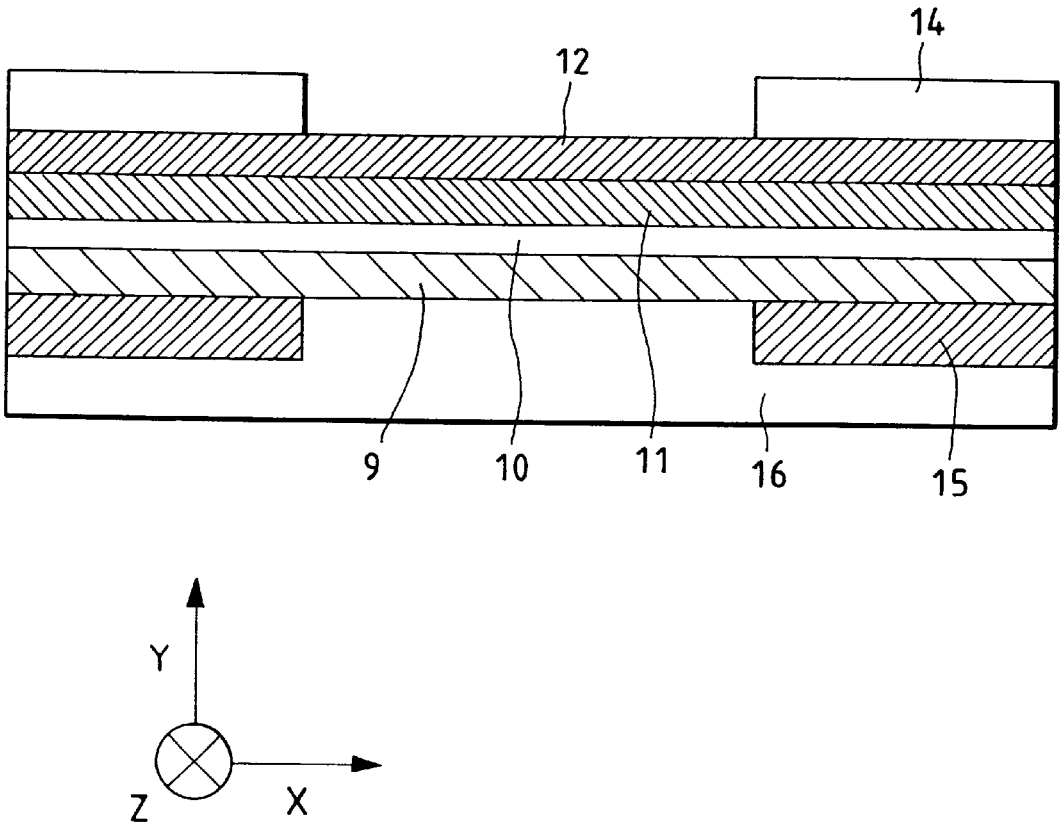
FIG. 13 is a diagram used for explaining a bias magnetic field generated in a spin-valve head.
Figure 14:
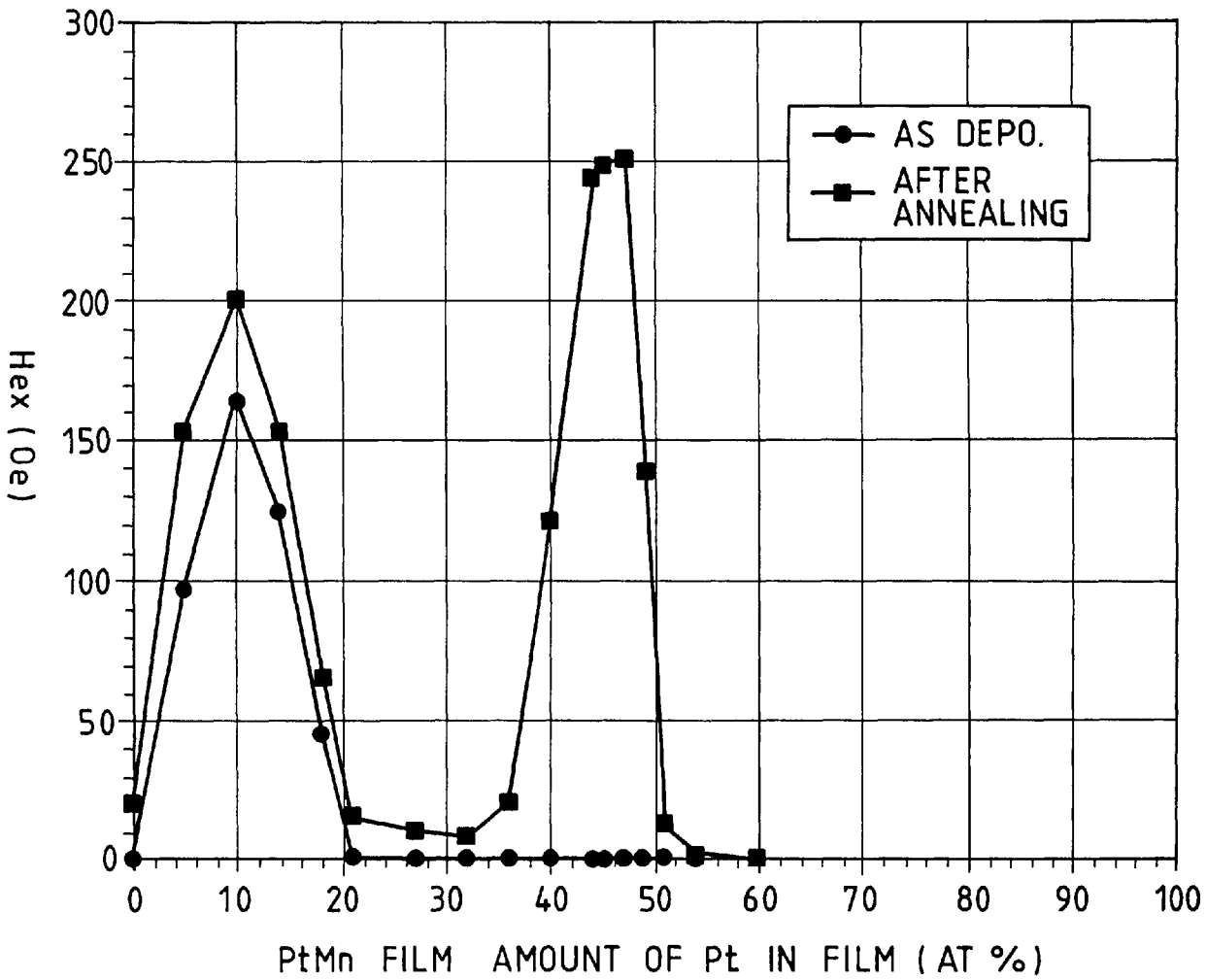
FIG. 14 is a diagram showing a relation between the composition and the intensity of the exchange anisotropic magnetic field of a PtMn film.

Data of more embodiments of the present invention each used for generating an exchange anisotropic magnetic field is shown in FIG. 14 and the subsequent figures. An exchange anisotropic magnetic field obtained by creating an predetermined interdiffusion layer on the boundary surface between a PtMn antiferromagnetic film and a ferromagnetic film in direct contact with the antiferromagnetic film can be used in all of the longitudinal biases of the AMR heads shown in FIGS. 1, 2, 3, 4, 6 and 7, the bias of the pinned magnetic layer 11 of the spin-valve head shown in FIG. 12, the bias of the free magnetic layer 9 and the bias of the pinned magnetic layer 11 shown in FIG. 13.

Films are created by using the RF (Radio Frequency) conventional sputtering equipment. For the substrate, indirect water cooling is adopted. However, no deliberate heating is carried out. Used targets are a mix of Ni and Fe with an atom ratio of 80% to 20%, Co, Ta, Mn and a mix of Ni and Mn with an atom ratio of 47% to 53% having a diameter of 8 inches. The composition of a film made of a PtMn alloy is created by properly adjusting Pt pellets having a 10 mm angle placed on the Mn target. In addition, the composition of an NiMnCr film is created by properly adjusting Cr and Mn pellets having a 10 mm angle placed on the mix of Ni and Mn with an atom ratio of 47% to 53%. The film compositions are created by means of an XMA (X-ray microanalyzer) to give a thickness of about 2 $\mu$m on an Si substrate. A glass substrate is used as a substrate during the measurement of magnetic characteristics and during corrosion-resistance tests. The sputter input power is 100 W and the sputter gas pressure is 1 mTorr in all cases in order to stack films made of the targets sequentially one layer after another on the glass substrate. During the process of creating films, a pair of permanent magnets are provided on both the sides of the glass substrate to apply a one-directional magnetic field with an intensity of about 50 Oe to the glass substrate.

Heat treatment is carried out while applying a one-directional magnetic field with an intensity of about 1,000 Oe in a vacuum with a degree of vacuum of $5\times10^{-6}$ Torr or below. During the heat treatment, the temperature is increased in a predetermined period of time of 3 hours to a predetermined value from which the temperature is decreased to the room temperature in a predetermined period of time of 3 hours. The temperature of the heat treatment is varied over the range 200° to 350° C. The holding time at a predetermined temperature is in the range 4 to 20 hours.

An analysis of the interdiffusion at the boundary surface between the PtMn antiferromagnetic film and the NiFe ferromagnetic film brought into direct contact with the PtMn antiferromagnetic film is carried out using a depth profile of an Auger electron spectroscopy. In addition, an analysis of the film structure is carried out by using X-ray diffraction by means of a Co target. The exchange anisotropic magnetic field is measured from a shift quantity of an M-H loop which is normally carried out.

FIG. 14 is a diagram showing a relation between the composition of the PtMn film and the exchange anisotropic magnetic field of the film obtained in an 'as depo'. state after film creation and after 9-hour heat treatment at 270° C. with the amount of Pt changed from 0 to 60 at %. The film composition comprises glass/Ta with a thickness of 100 Å/NiFe with a thickness of 50 Å/PtMn with a thickness of 200 Å/Ta with a thickness of 100 Å.

The reason why a Ta film is created on the glass substrate is to prevent the component on the glass substrate and the NiFe film from mutually diffusing into each other due to heat treatment. In the 'as depo.'state, an exchange anisotropic magnetic field Hex is generated at the Pt amount in the range 0 to 21 at %. With the Pt amount increased to a value of 21 at % or above, however, an exchange anisotropic magnetic field Hex that can be substantially measured is not generated. None the less, after the heat treatment, an exchange anisotropic magnetic field Hex is generated over the entire composition range 0 to 54 at %. In particular, in a composition with the Pt amount in the range 36 to 54 at %, an exchange anisotropic magnetic field Hex which can not be measured in the 'as depo.' state is generated by the heat treatment with a strong intensity greater than 200 Oe. Also in the case of a composition with the Pt amount in the range 0 to 21 at %, the intensity of the exchange anisotropic magnetic field after the heat treatment increases when compared with the value of the 'as depo.' state.

Figure 15:
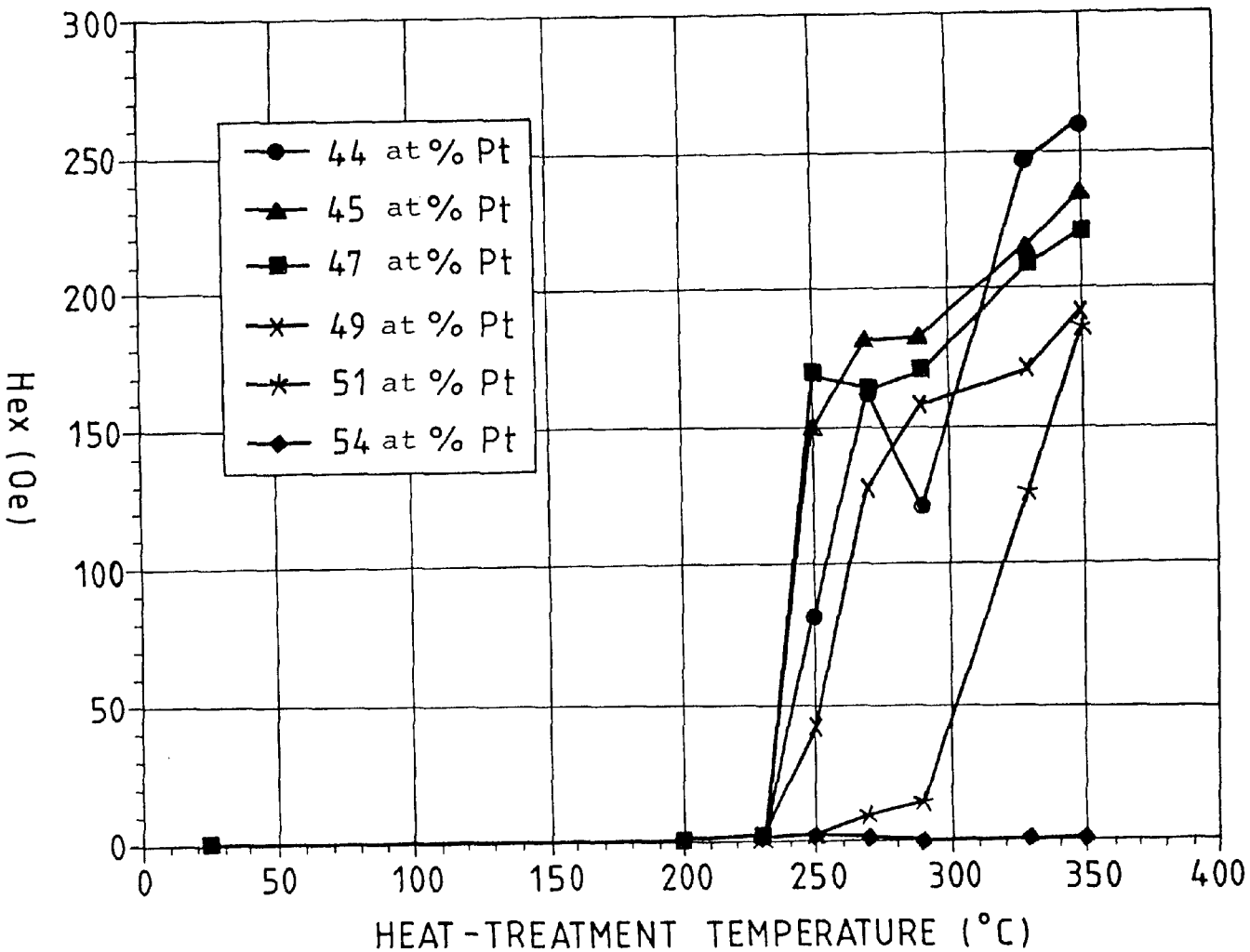
FIG. 15 is a diagram showing a relation between the composition, the heat-treatment temperature and the intensity of the exchange anisotropic magnetic field of a PtMn film.

FIG. 15 is a diagram showing a relation between the heat-treatment temperature and the exchange anisotropic magnetic field of a film made of a PtMn alloy having a Pt amount set in the range 44 to 54 at % with the holding time taken as a parameter. The holding times are 9 hours for the temperatures 200°, 230° and 270° C., 20 hours for the temperature 250° C. and 4 hours for the temperatures 290°, 330° and 350° C. The time to raise the temperature to a heat-treatment temperature and the time to lower the temperature back to the room temperature are each 3 hours. The film composition comprises glass/Ta with a thickness of 100 Å/NiFe with a thickness of 75 Å/PtMn with a thickness of 200 Å/Ta with a thickness of 100 Å. With heat treatment carried out at a temperature below 200° C., a substantial exchange anisotropic magnetic field is not observed. With heat treatment at a temperature of 200° C., however, an exchange anisotropic magnetic field Hex starts to be observed, and with heat treatment at a temperature of 230° C. or above, an exchange anisotropic magnetic field Hex is generated all of a sudden. In particular, in a composition with the Pt amount set in the range 44 to 51 at %, an exchange anisotropic magnetic field Hex is generated by the heat treatment with a strong intensity of 200 Oe or above.

Figure 16:
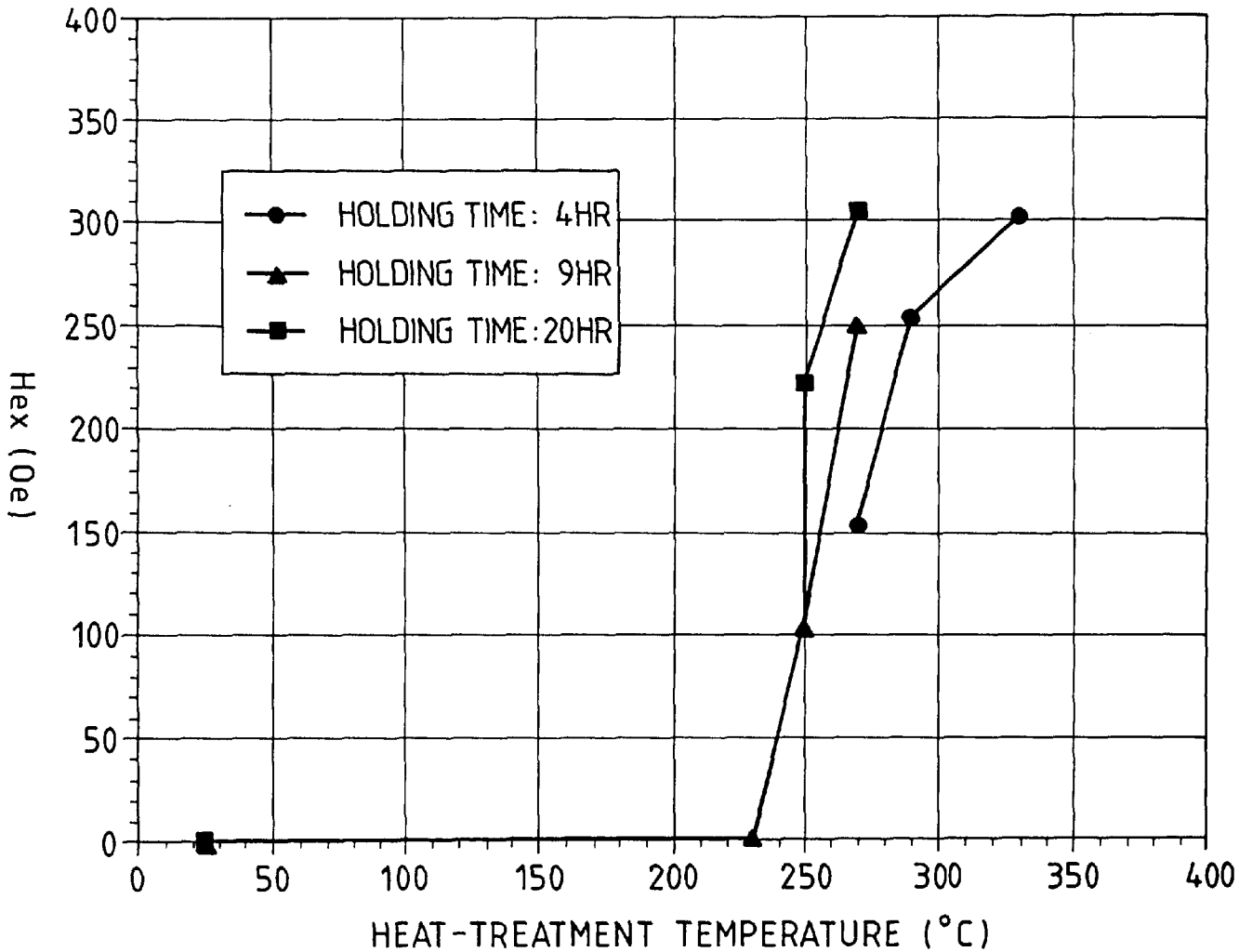
FIG. 16 is a diagram showing a relation between the heat-treatment temperature, the hold time and the intensity of the exchange anisotropic magnetic field of a PtMn film.
Figure 17:
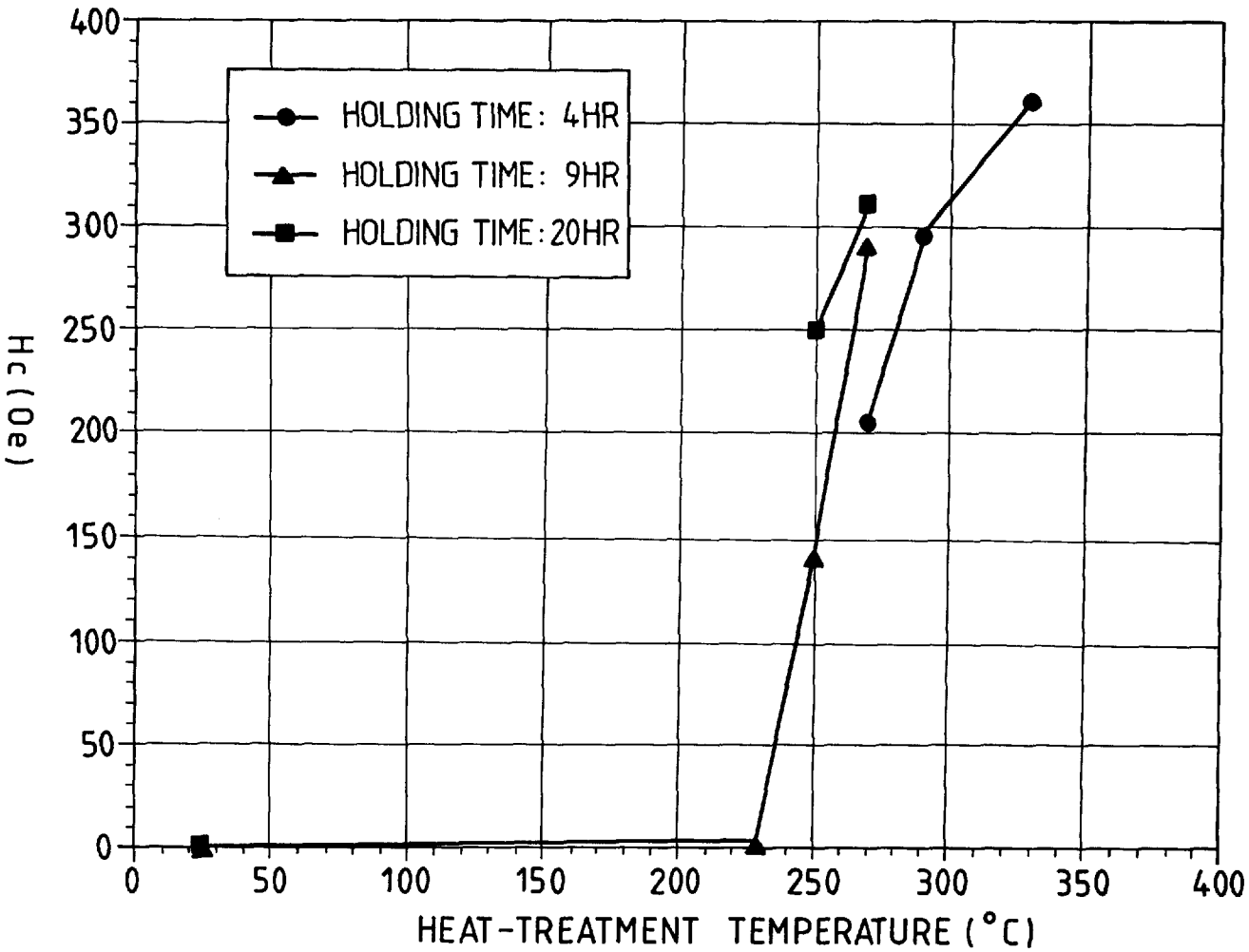
FIG. 17 is a diagram showing a relation between the heat-treatment temperature, the hold time and the coercive force of a PtMn film.

FIG. 16 is a diagram showing the dependence of the exchange anisotropic magnetic field Hex on the heat-treatment temperature and the holding time while FIG. 17 is a diagram showing the dependence of the coercive force on the heat-treatment temperature and the hold time. The film composition comprises glass/Ta with a thickness of 100 Å/NiFe with a thickness of 50 Å/PtMn with a thickness of 200 Å/Ta with a thickness of 100 Å. The PtMn film has a composition ratio of Pt to Mn set at 47/53 in terms of at %. Paying attention to the temperatures 250° and 270° C., it becomes obvious that, the longer the holding time, the stronger the intensity of the exchange anisotropic magnetic field Hex.

As is obvious from comparison of a holding time of 20 hours at the temperature of 250° C. and 9 hours at the temperature of 270° C. with a holding time of 4 hours at the temperature of 290° C., in spite of the fact that, the higher the temperature, the shorter the holding time, the intensity of the exchange anisotropic magnetic field Hex remains the same or the intensity of an exchange anisotropic magnetic field resulting from a high-temperature heat treatment with a short hold time is stronger.

The coercive force Hc exhibits a trend of dependence on the temperature about similar to that of the intensity of the exchange anisotropic magnetic field Hex. The values of the coercive force Hc are about the same as those of the intensity of the exchange anisotropic magnetic field Hex. That is to say, by shifting the center of the M-H loop in the direction of the H axis, the value of the coercive force can be obtained as a value about equal to the amount of shift. When thinking of an exchange anisotropic bias in an AMR or a spin-valve head, a large coercive force and a strong intensity of the exchange anisotropic magnetic field Hex result in a stable bias with a large magnitude proportional to Hc and Hex. It is thus desirable to have both a large coercive force and a strong intensity of the exchange anisotropic magnetic field.

By the way, the exchange anisotropic magnetic field is a phenomenon of physics which is caused by exchange interactions among magnetic atoms on the boundary surface between a ferromagnetic film and an antiferromagnetic film. The fact that, the longer the holding time and the higher the holding-time temperature, the stronger the intensity of the exchange anisotropic magnetic field Hex, causes some physical changes to be developed to the boundary surface between the NiFe film and the PtMn film at which surface the exchange anisotropic magnetic field Hex is generated by heat treatment. The fact that, the longer the holding time and the higher the holding-time temperature, the greater the physical changes is indicated. The mechanism of the physical changes will be described in detail later.

Figure 18:
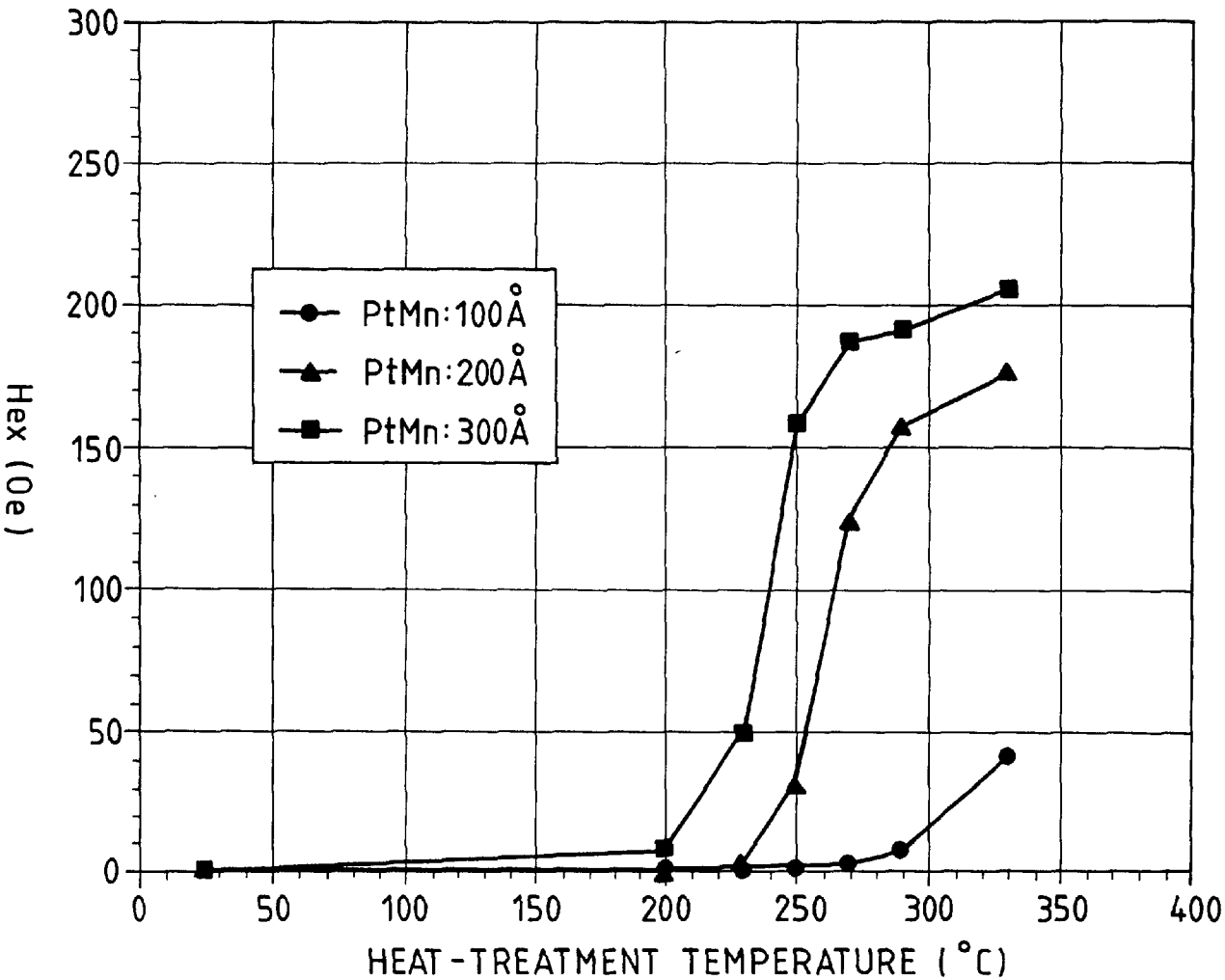
FIG. 18 is a diagram showing a relation between the film thickness, the heat-treatment temperature and the intensity of the exchange anisotropic magnetic field of a PtMn film.

FIG. 18 is a diagram showing a relation between the film thickness, the heat-treatment temperature and the exchange anisotropic magnetic field of a film made of a PtMn alloy which relation is obtained when the film thickness is varied. The holding times are 9 hours for the temperatures 200°, 230° and 250° C. and 4 hours for the temperatures 270°, 290° and 330° C. The time to raise the temperature to a heat-treatment temperature and the time to lower the temperature back to the room temperature are each 3 hours. The film composition comprises glass/Ta with a thickness of 100 Å/NiFe with a thickness of 75 Å/PtMn with a thickness of X Å/Ta with a thickness of 100 Å. The PtMn film has a composition ratio of Pt to Mn set at 49/51 in terms of at %. Observed characterizing features include the fact that the intensity of the exchange anisotropic magnetic field Hex becomes stronger as the thickness of the PtMn film is increased from 100 to 300 Å through 200 Å and a heat-treatment temperature at which the intensity exchange anisotropic magnetic field starts to be observable shifts to a lower value. Results of a more detailed examination of the dependence on the film thickness are shown in FIGS. 19 to 21.

Figure 19:
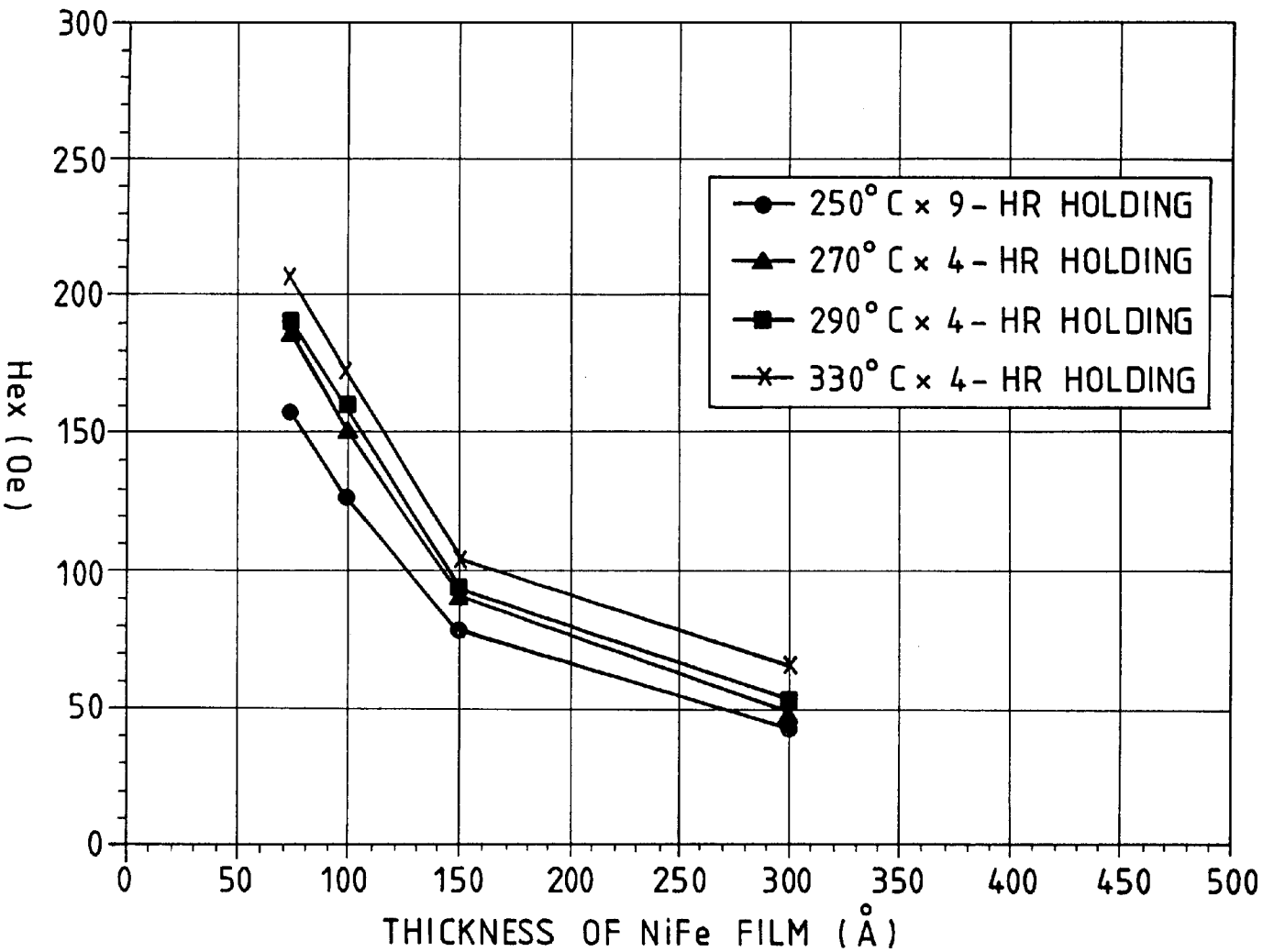
FIG. 19 is a diagram showing a relation between the film thickness, the heat-treatment temperature, the hold time and the intensity of the exchange anisotropic magnetic field of an NiFe film.

The film composition for data shown in FIG. 19 comprises glass/Ta with a thickness of 100 Å/NiFe with a thickness of X Å/PtMn with a thickness of 300 Å/Ta with a thickness of 100 Å. The PtMn film has a composition ratio of Pt to Mn set at 49/51 in terms of at %. The heat-treatment temperature is set at different values: 250°, 270°, 290° and 330° C.

Figure 20:
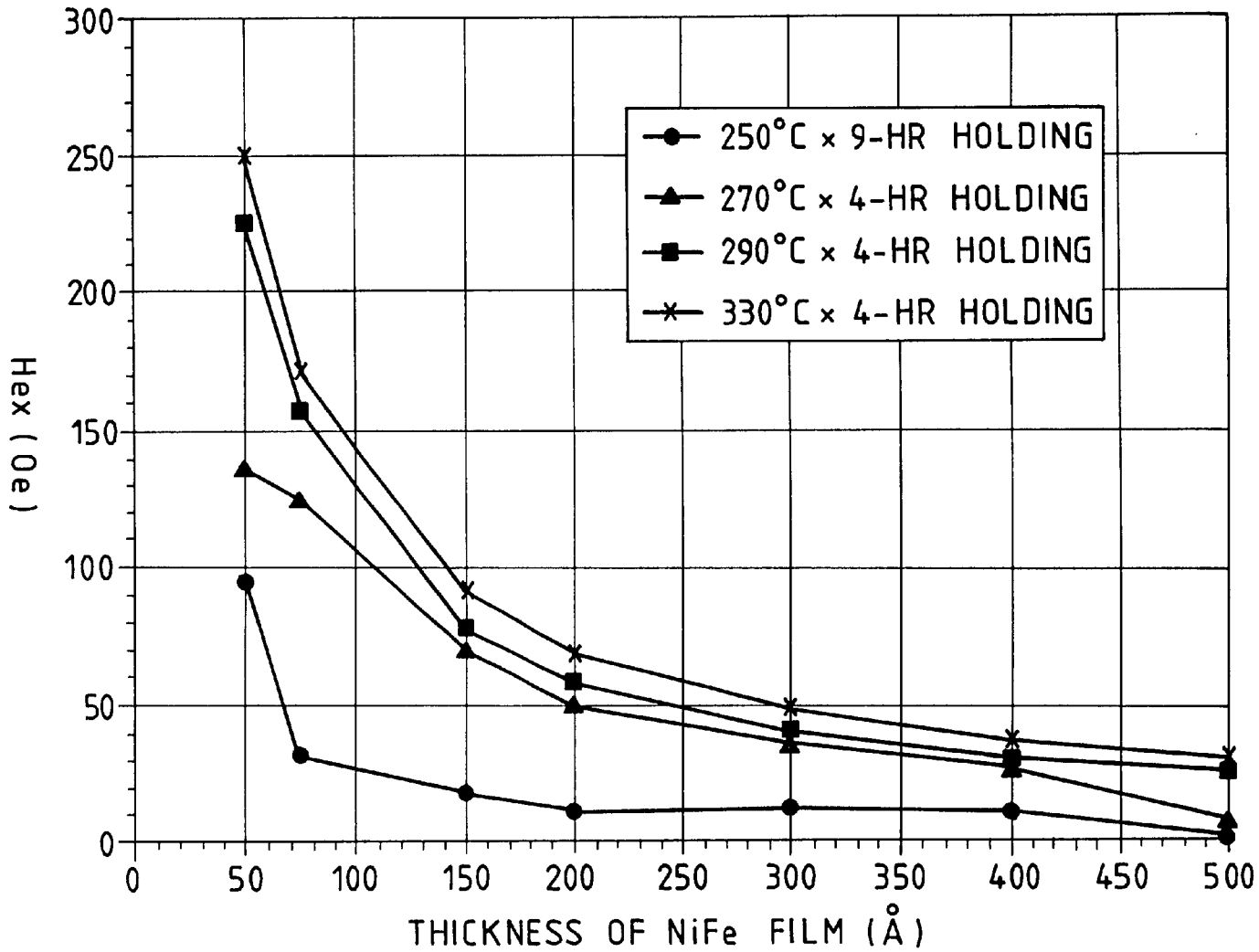
FIG. 20 is a diagram showing a relation between the film thickness, the heat-treatment temperature, the hold time and the intensity of the exchange anisotropic magnetic field of an NiFe film.

The film composition for data shown in FIG. 20 comprises glass/Ta with a thickness of 100 Å/NiFe with a thickness of X Å/PtMn with a thickness of 200 Å/Ta with a thickness of 100 Å. The PtMn film has a composition ratio of Pt to Mn set at 49/51 in terms of at %. The heat treatment is carried out in the same way as the film composition for data shown in FIG. 19.

Figure 21:
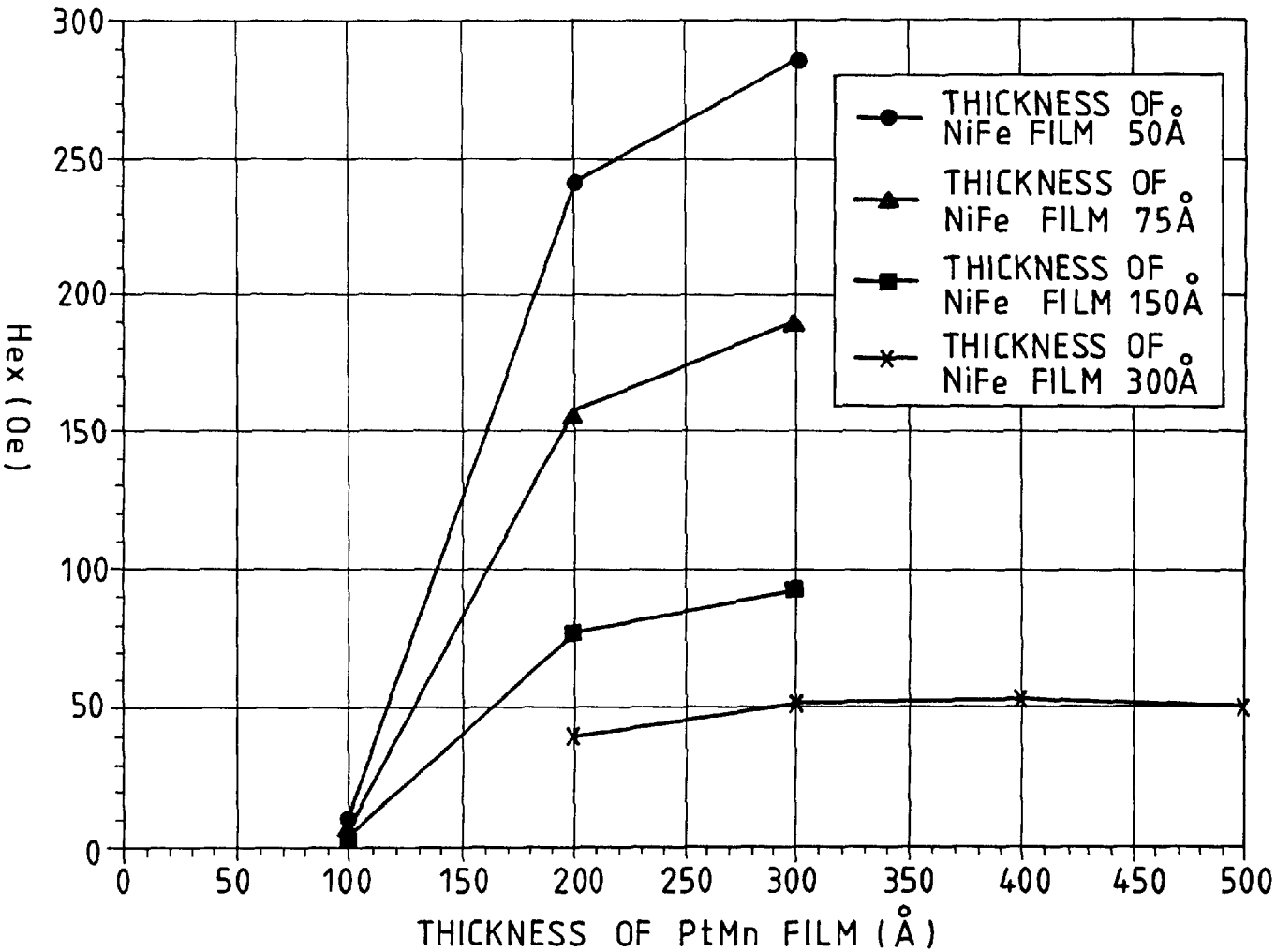
FIG. 21 is a diagram showing a relation between the thickness of a PtMn film, the thickness of an NiMn film, the heat-treatment temperature, the hold time and the intensity of the exchange anisotropic magnetic field.

The film composition for data shown in FIG. 21 comprises glass/Ta with a thickness of 100 Å/NiFe with a thickness of X Å/PtMn with a thickness of X Å/Ta with a thickness of 100 Å. Much like the film compositions for data shown in FIGS. 19 and 20, the PtMn film has a composition ratio of Pt to Mn set at 49/51 in terms of at %. The heat treatment is carried out at a temperature of 290° C. for a holding time of 4 hours. The time to raise the temperature to a heat-treatment temperature and the time to lower the temperature back to the room temperature are each 3 hours for the film compositions for data shown in FIGS. 19, 20 and 21.

As is obvious from the results shown in FIGS. 18 to 21, the smaller the NiFe film thickness and the greater the PtMn film thickness, the stronger the intensity of the exchange anisotropic magnetic field Hex. The dependence of the intensity of the exchange anisotropic magnetic field Hex on the PtMn film thickness is particularly striking in the film-thickness range 100 to 300 Å. In the film-thickness range 300 to 500 Å, on the other hand, the dependence of the intensity of the exchange anisotropic magnetic field Hex on the PtMn film thickness can be hardly observed from FIG. 21. It is thus obvious that a PtMn film thickness of 300 Å is sufficient.

On the other hand, it is obvious that the intensity of the exchange anisotropic magnetic field Hex is all but inversely proportional to the NiFe film thickness. This relation indicates that the amount of exchange coupling energy generated by interactions among magnetic atoms on the boundary surface between the PtMn film and the NiFe film is not dependent on the NiFe film thickness. This relation is the same as the dependence on the NiFe film thickness in the conventional structure comprising a film made of an FeMn alloy and a film made of an NiFe alloy.

Next, results obtained from examination of changes in Hex which occur when the ferromagnetic film is changed from an NiFe alloy to Co are shown. The fact that the magnetoresistive ratio can be increased when Co is used rather than an NiFe alloy as a material for making the pinned magnetic layer of a spin-valve head has already been proven both theoretically and experimentally. Since it is quite within the bounds of possibility that Co is used as a material for making the pinned magnetic layer, a high intensity of the exchange anisotropic magnetic field with Co is desirable.

Figure 22:
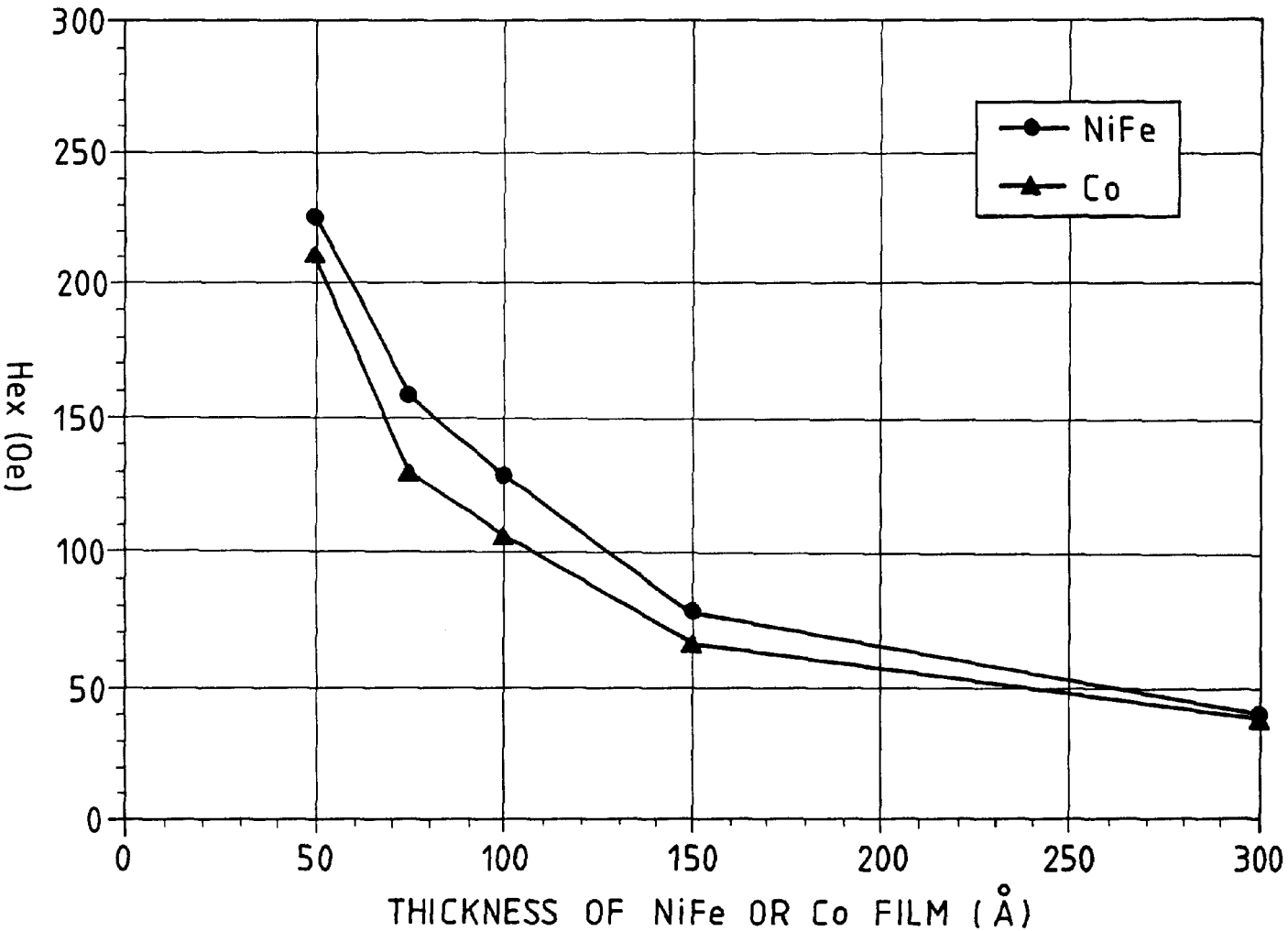
FIG. 22 is a diagram showing comparison of the intensity of the anisotropic magnetic field of an NiFe film with that of a Co film.

The film composition for data shown in FIG. 22 comprises glass/Ta with a thickness of 100 Å/NiFe or Co with a thickness of X Å/PtMn with a thickness of 200 Å/Ta with a thickness of 100 Å. The PtMn film has a composition ratio of Pt to Mn set at 49/51 in terms of at %. The heat treatment is carried out at a temperature of 290° C. for a holding time of 4 hours. The time to raise the temperature to a heat-treatment temperature and the time to lower the temperature back to the room temperature are each 3 hours. Even if the ferromagnetic film is changed to Co, about the same intensity of the exchange anisotropic magnetic field Hex as the NiFe film is obtained. From these results, the fact that the same intensity of the exchange anisotropic magnetic field can be obtained even if an NiFeCo layer, a three-element alloy film, is used as the ferromagnetic film can be inferred with ease.

So far, the dependence of the exchange anisotropic magnetic field of the PtMn film and the ferromagnetic film on the composition of the PtMn film, the heat-treatment temperature, the heat-treatment holding time, the thickness of the PtMn film and the thickness of the ferromagnetic film has been examined in detail. The description indicates that, by carrying out heat treatment at temperatures in the range 200° to 350° C. on a super-thin ferromagnetic film with a thickness in the range 50 to 300 Å which film is in direct contact with a film made of a PtMn alloy, a strong intensity of the exchange anisotropic magnetic field can be obtained.

Described next are embodiments of the present invention for solving the other problems such as the thermal stability of the exchange anisotropic magnetic field and the corrosion resistance of the antiferromagnetic film made of a PtMn alloy in particular embodiments whose corrosion resistance is to be compared with those of films made of NiMn and NiMnCr alloys. Finally, the description is followed by embodiments used for explaining differences and similarities in mechanism between the exchange anisotropic magnetic field generated by the antiferromagnetic films made of NiMn and NiMnCr alloys and the exchange anisotropic magnetic field generated by the antiferromagnetic film made of a PtMn alloy.

Figure 23:
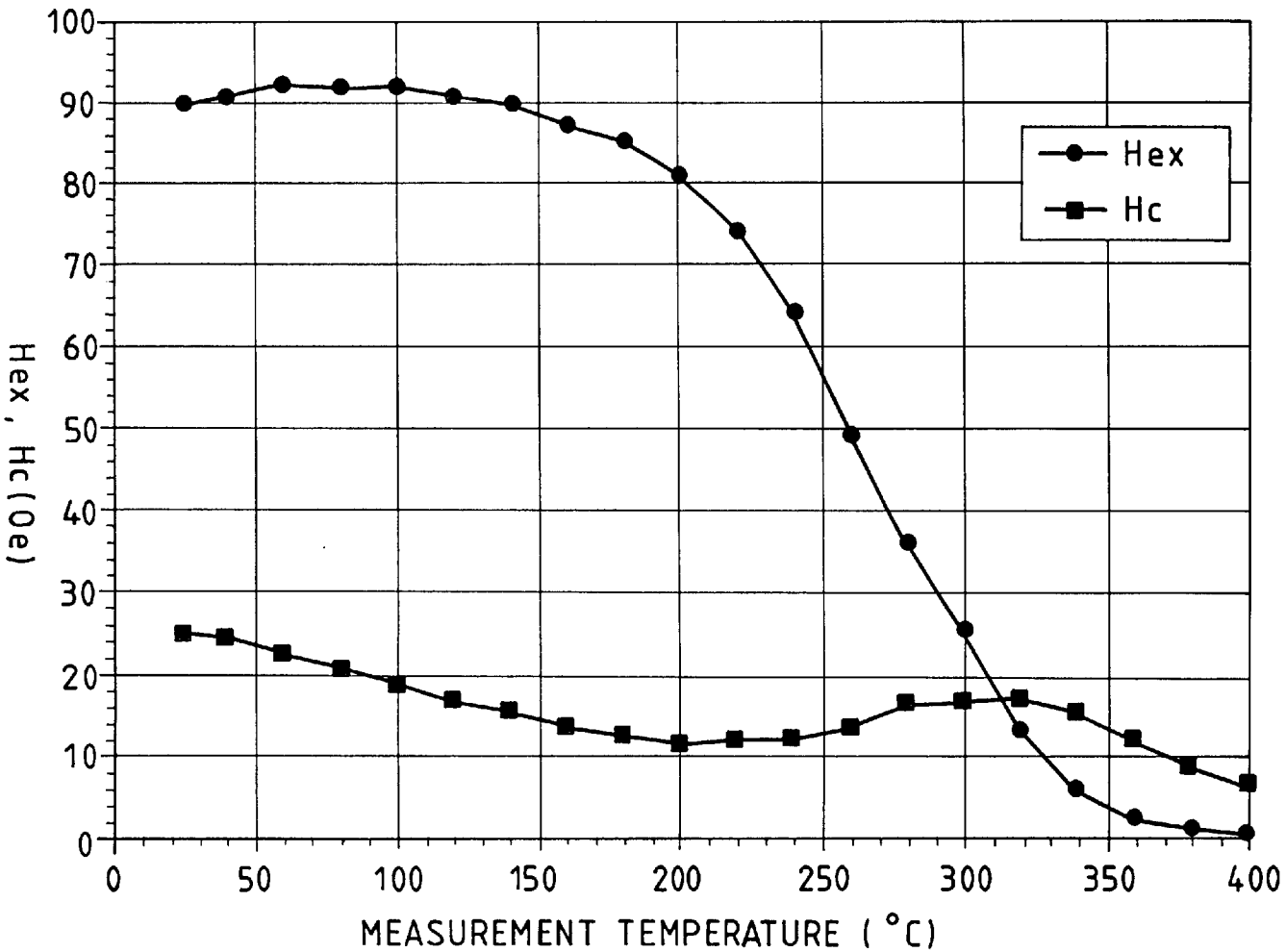
FIG. 23 is a diagram showing a relation between the intensity of the anisotropic magnetic field and the measurement temperature.

FIG. 23 shows results of examination of temperature characteristics of Hex and Hc. The film composition for data shown in FIG. 23 comprises glass/Ta with a thickness of 100 Å/NiFe with a thickness of 200 Å/PtMn with a thickness of 300 Å/Ta with a thickness of 100 Å. The PtMn film has a composition ratio of Pt to Mn set at 46/54 in terms of at %. The heat treatment is carried out at a temperature of 260° C. for a holding time of 20 hours. The time to raise the temperature to a heat-treatment temperature and the time to lower the temperature back to the room temperature are each 3 hours. The measurement is carried out by measuring the M-H curve by means of a VMS (Vibrating Sample Magnetometer) while heating the sample gradually from the room temperature in a vacuum with the degree of vacuum of $5\times10^{-5}$ Torr. The rate of increase in temperature during measurement is 20° C. in 20 minutes.

At the room temperature, a Hex value of 90 Oe is obtained. This Hex value is about 1.5 times the value of Hex given by the conventional FeMn film. The blocking temperature Tb, a temperature at which Hex disappears, is 380° C. which is much higher than 160° C., the blocking temperature Tb of the FeMn film. As is generally known, the temperature of the surroundings of the magnetoresistive film of a magnetic head in an operative state is in a range of the room temperature to about 120° C. In this temperature range, the intensity of the exchange anisotropic magnetic field Hex generated by the PtMn film is all but flat, showing a clear difference from a trend of Hex generated by the FeMn film at a temperature ranging from the room temperature to about 120° C., a trend of decreasing proportionally with the temperature. Large values of Hex and Tb and a flat value of Hex over the operating-temperature range of the magnetoresistive head are very desirable because they give rise to the thermal stability of the bias magnetic field, well overcoming the problems with the FeMn film.

The film structure of all the embodiments explained so far comprises glass/Ta/an NiFe or Co ferromagnetic film/Pt/Mn/Ta. Embodiments wherein the order of stacking the ferromagnetic film and the PtMn film is reversed and the Ta underlayer film is eliminated are explained as follows.

Figure 24:
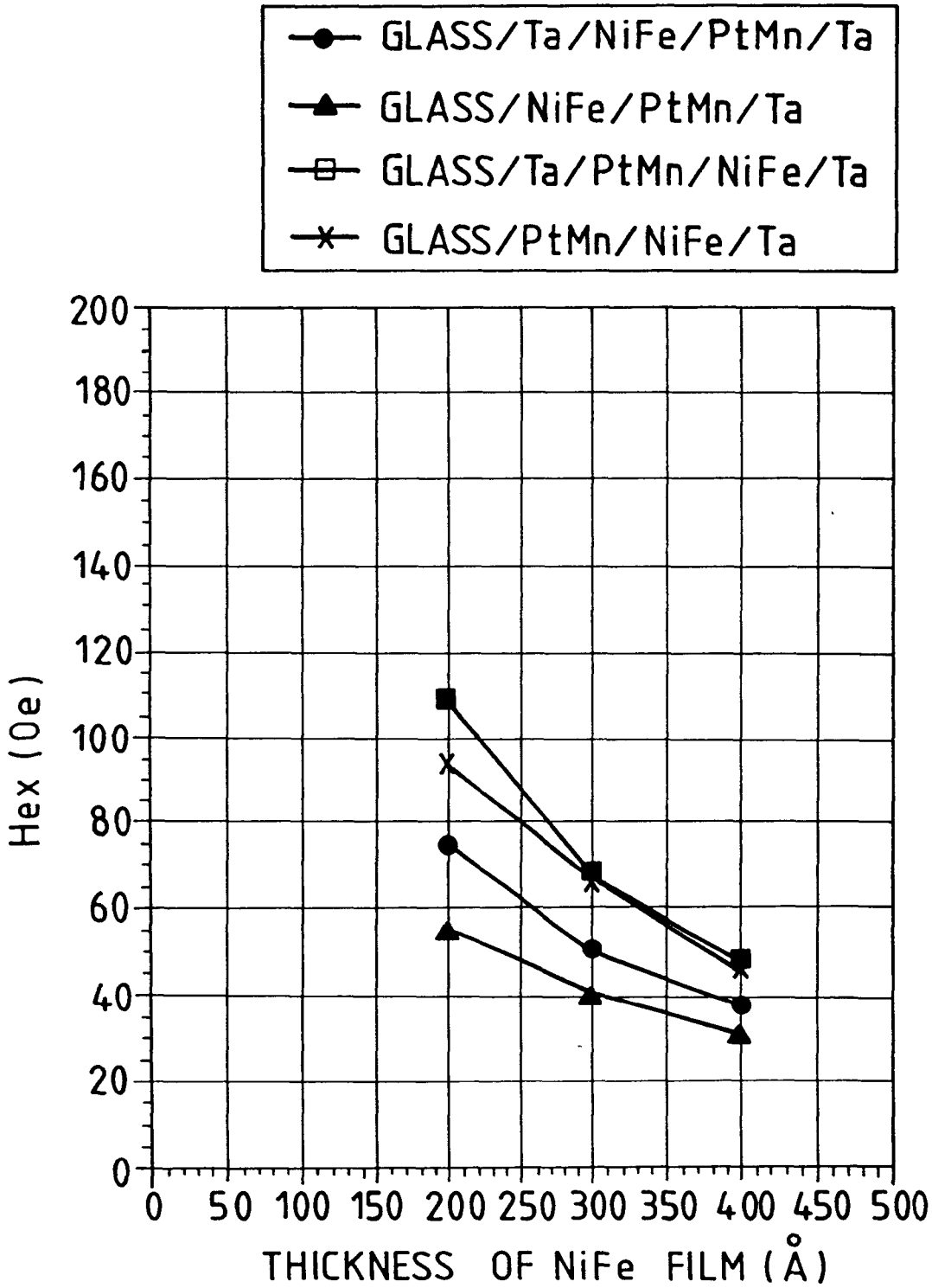
FIG. 24 is a diagram showing comparison of the intensities of exchange anisotropic magnetic fields generated by a PtMn film in structures with different layer stackings and structures with and without an underlayer Ta film.

FIG. 24 shows comparison of Hex of four film structures with each other. The four film structures are glass/Ta/NiFe/

PtMn/Ta, glass/NiFe/PtMn/Ta, glass/Ta/PtMn/NiFe/Ta and glass/PtMn/NiFe/Ta. The uppermost Ta layer which is provided for preventing surface oxidation from occurring during heat treatment does not have an effect on the dependence of Hex on the stacking order. Three values of the thickness of the NiFe film are 200, 300 and 400 Åwhile the thickness of the PtMn film is 300 Å. The PtMn film has a composition ratio of Pt to Mn set at 49/51 in terms of at %. The heat treatment is carried out at a temperature of 270° C. for a holding time of 9 hours. The time to raise the temperature to a heat-treatment temperature and the time to lower the temperature back to the room temperature are each 3 hours.

The value of Hex varies to a certain degree depending upon the stacking order but a good large value of Hex is obtained for all the stacking orders. In the conventional FeMn film, the generation of a γ-FeMn phase, a ferromagnetic phase, results in generation of an exchange anisotropic magnetic field, and the value of Hex changes considerably depending upon whether or not the Ta underlayer film for making the crystal orientations and the crystal phase uniform is present as is generally known. That is to say, in the case of the FeMn film, if a film for adjusting the lattice constant is not provided as an underlayer, Hex is not obtained. In addition, a structure wherein the FeMn film is created before creation of the NiFe film has a restriction in that Hex is not obtained. This restriction, in turn, imposes a restriction on the structure of elements. In the case of the PtMn film, however, there is no such restriction on the generation of Hex. Therefore, the PtMn film is very easy to use. As a result, it is obvious that the PtMn film makes an element structure, which was impossible so far with the conventional film, possible.

Figure 25:
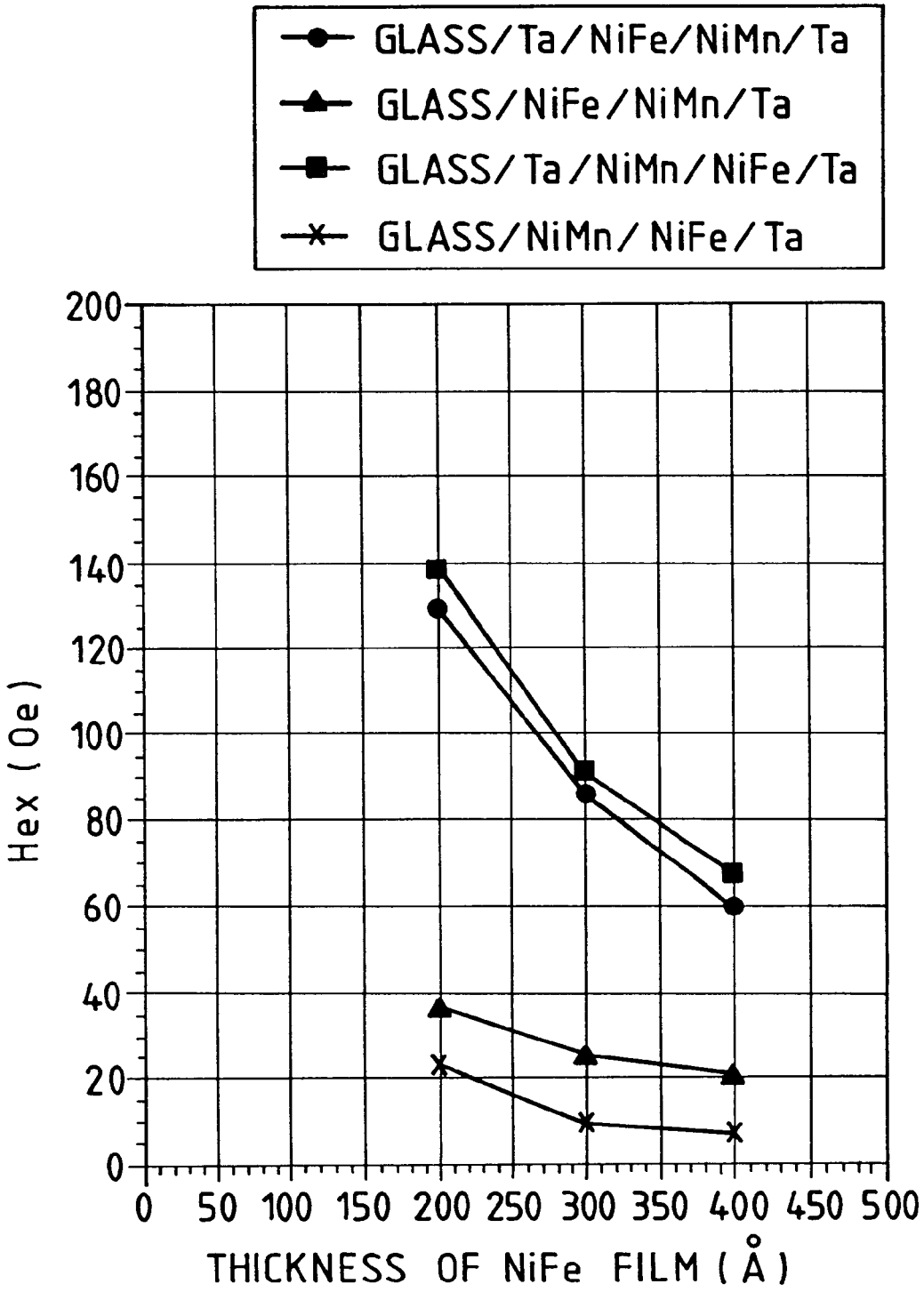
FIG. 25 is a diagram showing comparison of the intensities of anisotropic magnetic fields generated by an NiMn film in structures with different layer stackings and structures with and without an underlayer Ta film.

FIG. 25 shows results of experiments which are carried out under the same conditions with respect to the film structure, the thickness of each film and the heat treatment as the experiments for obtaining the data shown in FIG. 24, except using a film made of an NiMn alloy instead of the PtMn film. The NiMn film has a composition ratio of Ni to Mn set at 49/51 in terms of at %. The NiMn film is characterized in that the dependence of Hex on the stacking order is similar to that of the FeMn film rather than the PtMn film. That is to say, the value of Hex greatly varies depending upon whether or not the Ta underlayer is present. These facts indicate that there is a difference in mechanism for generating an exchange anisotropic magnetic field to a certain degree between the films made of NiMn and PtMn alloys.

Heat treatment is carried out properly for the boundary surface between the PtMn film and the ferromagnetic film in direct contact with the PtMn film. A consideration as to why the intensity of the exchange anisotropic magnetic field greatly varies depending whether or not the heat treatment is carried out is explained along with backing embodiments as follows. As to reasons why the intensity of the exchange anisotropic magnetic field greatly varies, there are some possible factors that can be inferred. One of the possible factors is creation of a PtMn ordered phase (of the CuAu-I type) as described in publications such as "Magnetic Material Handbook." Another factor is a change in state of the boundary surface on which the exchange anisotropic magnetic field works, that is, creation of an interdiffusion layer on the boundary surface between the PtMn film and the ferromagnetic film.

Figure 26:
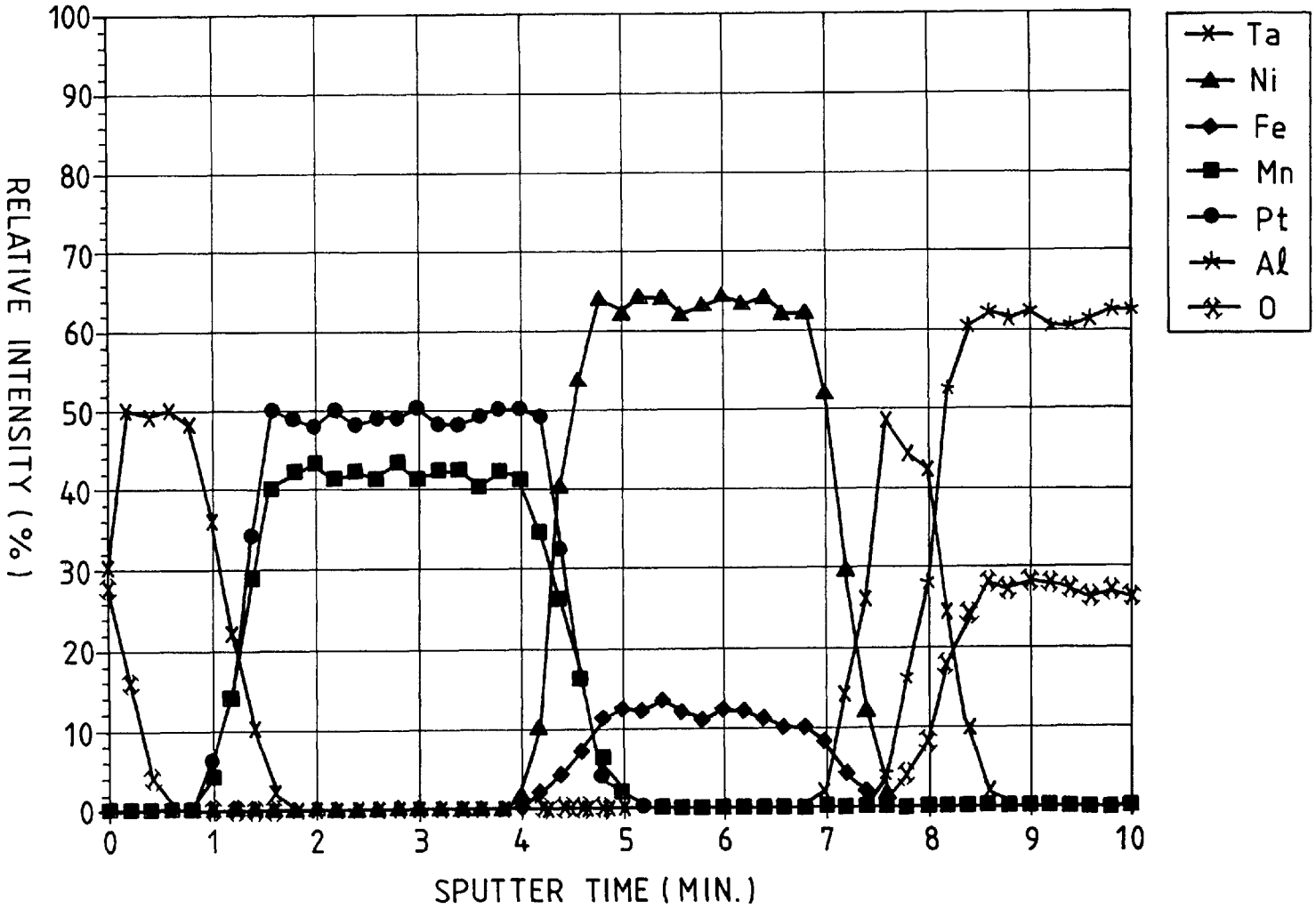
FIG. 26 is a diagram showing a diffusion on a boundary surface in an 'as depo.' state by using a depth profile of an Auger electron spectroscopy.
Figure 27:
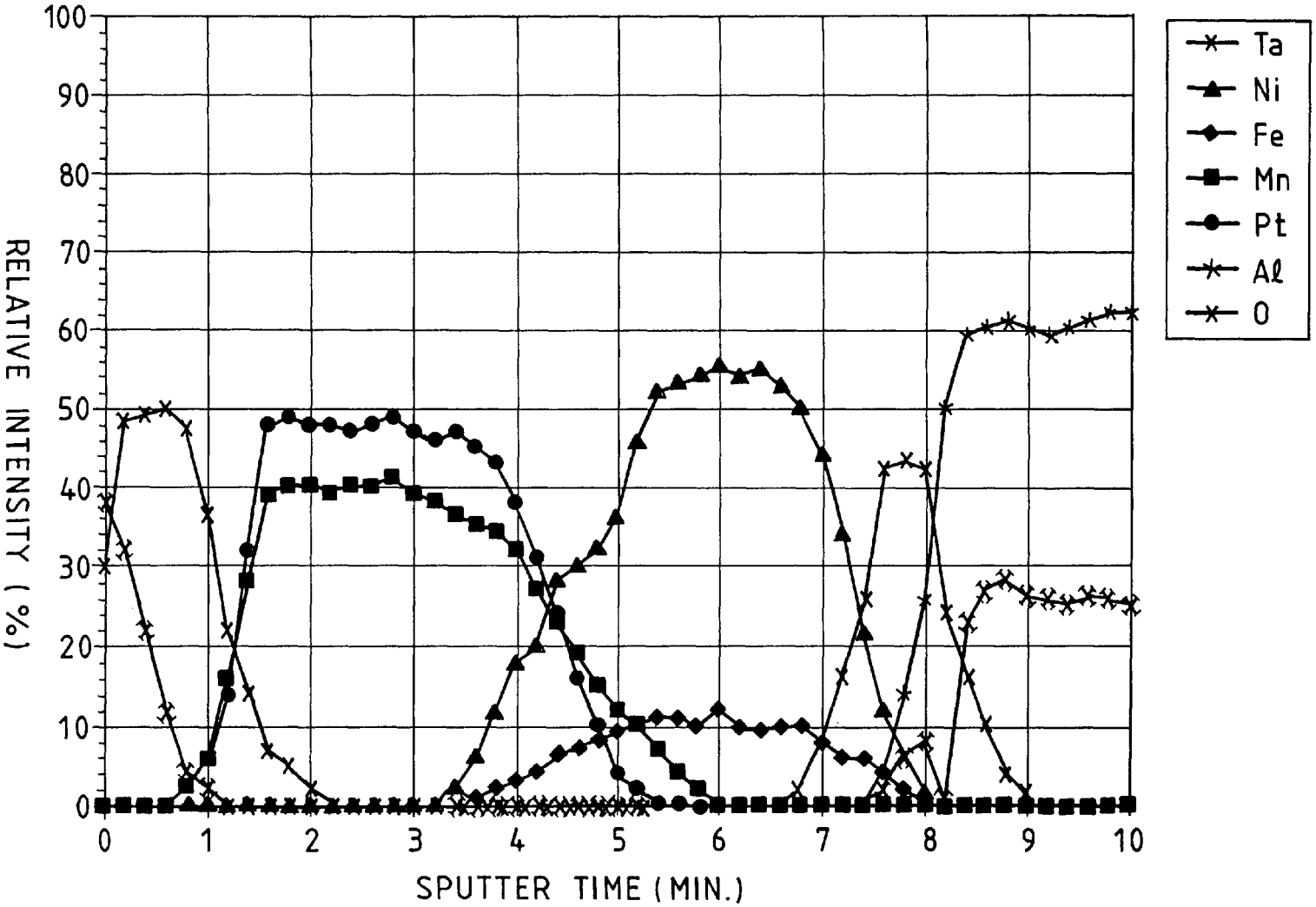
FIG. 27 is a diagram showing diffusion on a boundary surface after heat treatment by using a depth profile of an Auger electron spectroscopy.

FIGS. 26 and 27 show results of examining the state of interdiffusion after heat treatment by using a depth profile of an Auger electron spectroscopy (AES). The 'as depo.' film composition for data shown in FIGS. 26 and 27 comprises glass/$Al_2O_3$ (alumina) with a thickness of 100 Å/Ta with a thickness of 80 Å/NiFe with a thickness of 200 ÅPtMn with a thickness of 200 Å/Ta with a thickness of 80 Å. The PtMn film has a composition ratio of Pt to Mn set at 47/53 in terms of at %. The heat treatment is carried out at a temperature of 290° C. for a holding time of 4 hours. In the case of samples in an 'as depo.' state with data thereof shown in FIG. 26, a clear interdiffusion with a resolution higher than the resolution of the AES is not observed. In the case of samples having data thereof shown in FIG. 27, on the other hand, a clear interdiffusion on the boundary surface between the films made to PtMn and NiFe alloys is observed. That is to say, Pt and Mn of the PtMn film, in particular Mn, diffuses into the NiFe film while Ni and Fe of the NiFe film diffuse into the PtMn film. From the fact that the film thickness is 200 Å, the diffusion distance is inferred to be a little smaller than 100 Å.

Considering the fact that exchange interactions among magnetic atoms of antiferromagnetic and magnetic films on the boundary surface between the films are a physics cause of the exchange anisotropic magnetic field, the interdiffusion layer formed by the heat treatment is no other than a region in which the exchange interactions among magnetic atoms of both the films work and, the exchange anisotropic magnetic field works between the PtMn antiferromagnetic film and the NiFe ferromagnetic film through the interdiffusion layer. By carrying out heat treatment at temperatures in the range 200° to 350° C. on the NiFe film in direct contact with the PtMn film, an exchange anisotropic magnetic field is generated and, in particular, the higher the heat-treatment temperature and the longer the heat-treatment holding time, the stronger the intensity of the exchange anisotropic magnetic field. That is attributed to, among other causes, the fact that, the higher the heat-treatment temperature and the longer the heat-treatment holding time, the easier the creation of the interdiffusion layer.

As the interdiffusion process further develops, however, the films made of PtMn and NiFe alloys mutually diffuse into each other completely, resulting in a PtMnNiFe alloy, a four-element alloy. As is obvious from the mechanism of the exchange interaction, it is certainly impossible to obtain an exchange anisotropic magnetic field. It is thus necessary to create a proper interdiffusion layer between the films made of PtMn and NiFe alloys.

With respect to the development of an exchange anisotropic magnetic field, the crystal structure may possibly change, that is, an ordered phase (of the CuAu-I type) of a PtMn alloy may possibly be created as has been described earlier. For this reason, a change in crystal structure occurring during the heat treatment is examined by X-ray diffraction.

Figure 28:
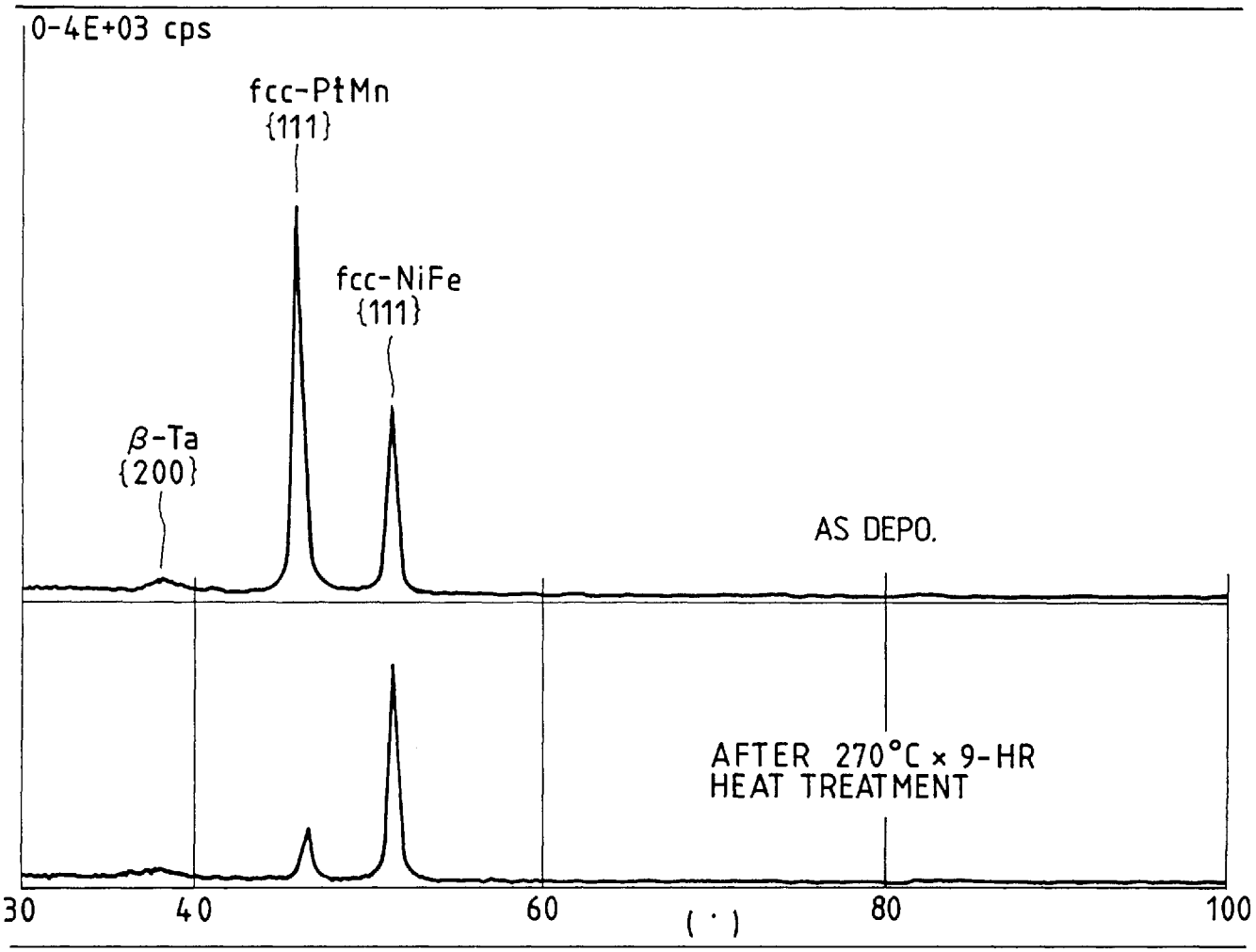
FIG. 28 is a diagram showing results of an analysis of a film structure based on an X-ray diffraction profile.

FIG. 28 is a diagram showing a pattern of X-ray diffraction. The film composition for data shown in FIGS. 28 comprises glass/Ta with a thickness of 100 Å/NiFe with a thickness of 200 Å/PtMn with a thickness of 200 Å/Ta with a thickness of 100 Å. The PtMn film has a composition ratio of Pt to Mn set at 47/53 in terms of at %. The heat treatment is carried out at a temperature of 290° C. for a holding time of 4 hours. The measurement is carried out by means of the θ-20 method on a Co target.

The only differences between the 'as depo.' state and the state after the heat treatment are, much like the PtMn {111} peak of the fcc structure, the intensity of the NiMn {111} peak of the fcc structure and a slight change in peak position accompanying a change in the lattice constant. By examining these results only, the creation of a PtMn ordered phase of the CuAu-I type indicating the fcc structure can not be recognized.

Described next are results of experiments for enhancing the corrosion resistance which is another big object of the present invention.

Figure 30:
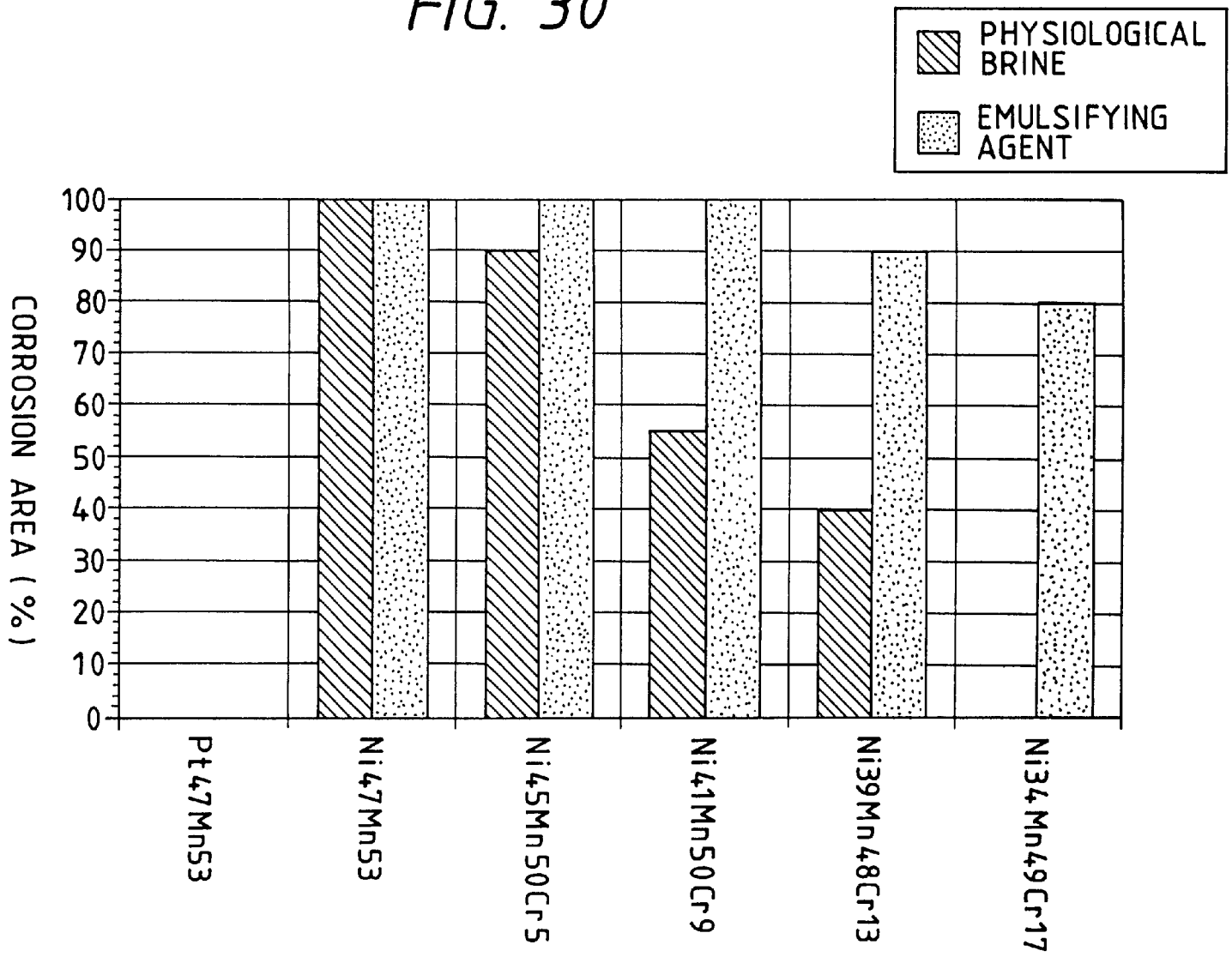
FIG. 30 is a diagram showing comparison of areas of the corrosion resistance of films made of PtMn, NiMn and NiMnCr.

FIG. 30 is a diagram showing comparison of corrosion areas on films for samples comprising PtMn, NiMn and NiMnCr films created on a glass substrate each with a thickness of 300 Å. The samples are soaked in a physiology solution of salt and an emulsifying agent at room temperature for 24 hours. The PtMn film has a composition ratio of Pt to Mn set at 47/53 in terms of at % and the NiMn film has a composition ratio of Ni to Mn set also at 47/53 in terms of at %. The amounts of doped Cr are 5, 9, 13 and 17 at %. The concentration of NaCl in the physiology solution of salt is 0.9%. The emulsifying agent is a solvent containing tripolyphosphate used in a variety of cleaning processes in the fabrication of a magnetic head. The emulsifying agent exhibits a weak-alkaline characteristic. The corrosion area which is expressed in terms of percents (%) is found by measuring the exposed area of the glass substrate with the films dissolved in the solvent by means of an optical microscope. The area of each sample is 4 $cm^2$.

The PtMn film does not experience corrosion caused by the physiology solution of salt and the emulsifying agent at all. On the other hand, the NiMn film does experience such corrosion caused by both the solvents for which the glass substrate is exposed 100%. By doping the NiMn film with Cr, the corrosion of the film in the physiology solution of salt can be certainly reduced. However, such an effect is almost not observed for the emulsifying agent. It is thus obvious that the PtMn film has a corrosion-resistance characteristic much superior to those of the films made of NiMn and NiMnCr alloys. It should be noted that FIG. 16 shows results of examination of the exchange anisotropic magnetic field for the film composition used in the corrosion-resistance experiments.

Figure 29:
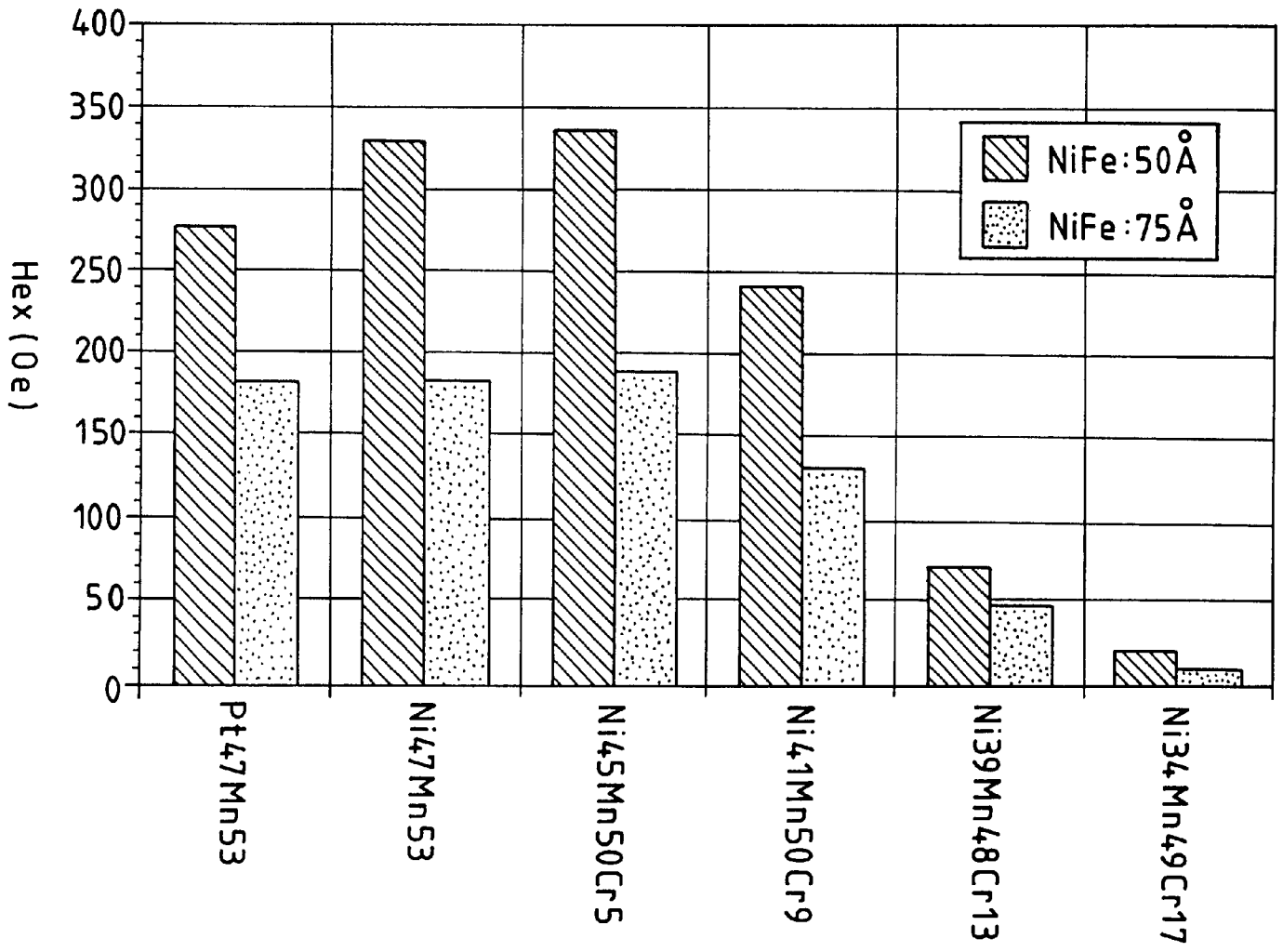
FIG. 29 is a diagram showing comparison of the intensities of anisotropic magnetic fields generated by films made of PtMn, NiMn and NiMnCr.

The film composition for data shown in FIG. 29 comprises glass/Ta with a thickness of 100 Å/NiFe with a thickness of 50 or 75 Å/PtMn, NiMn or NiMnCr with a thickness of 200 Å/Ta with a thickness of 100 Å. The heat treatment is carried out at a temperature of 270° C. for a holding time of 9 hours. It is obvious from the figure that the PtMn film, the NiMn film and the NiMnCr film doped with Cr at a doping ratio of 5 and 9% have good values of Hex. As the doping ratio is increased to 13 and 17%, however, the value of Hex decreases, giving rise to a problem which is anticipated when the magnetoresistive head is put to practical use. It is obvious from the results given above that the PtMn film is excellent as far as the corrosion resistance and the exchange anisotropic magnetic field are concerned.

Finally, the effect of the amount of Pt in the PtMn film on the enhancement of the corrosion resistance is explained.

Figure 31:
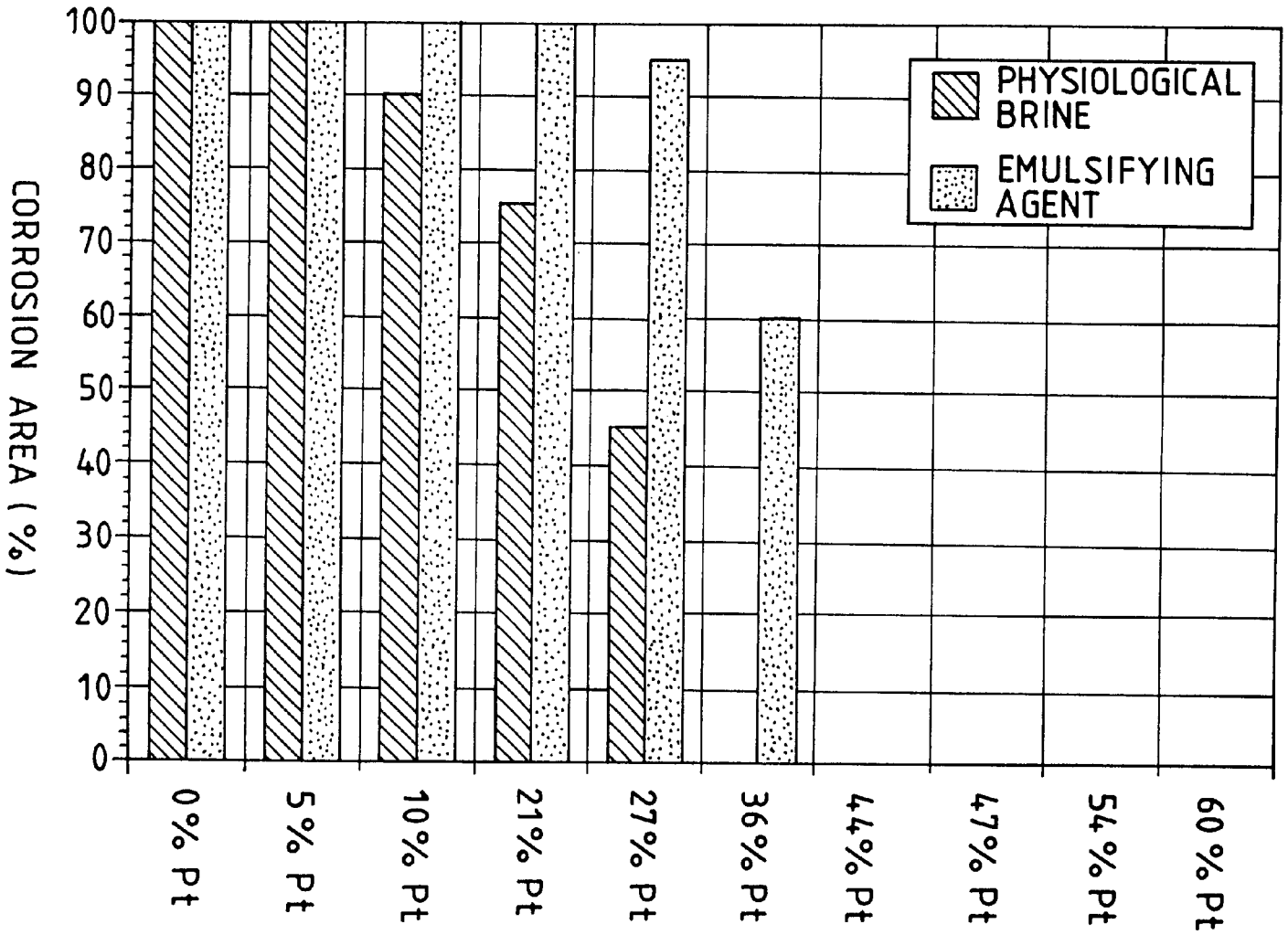
FIG. 31 is a diagram showing a relation between the film composition and the corrosion resistance of a PtMn film.

FIG. 31 is a diagram showing results of similar corrosion-resistance experiments on samples with the same film composition by using the same solvents as those used for obtaining data shown in FIG. 30. The fact that the element of the PtMn film which enhances the corrosion resistance is Pt is easy to understand. It is also obvious that, at a Pt amount of 44 at % in particular, the corrosion resistance is improved extraordinarily.

In most of the description given above, a PtMn alloy is used as [a ferromagnetic] *an antiferromagnetic* substance. It should be noted, however, that an RhMn alloy, an RuMn alloy, an IrMn alloy and a PdMn alloy can also be expected to give the same effect as the PtMn alloy.

According to the present invention, by cutting off ferromagnetic coupling between a magnetoresistive film and a ferromagnetic film exchange-coupled with an antiferromagnetic film by means of a Ta film used as an intermediate layer or by reversion of the stacking order of the ferromagnetic and antiferromagnetic films, an exchange coupling magnetic field having a strong intensity can be generated, allowing a stable bias magnetic field to be applied to the magnetoresistive film.

Further, according to the present invention, a material having an exchange anisotropic magnetic field with a strong intensity, a good thermal characteristic and very excellent corrosion resistance is proposed and, by using the exchange anisotropic magnetic field as a bias magnetic field, it is possible to provide a magnetoresistive head having a magnetoresistive effect with an excellent linear response characteristic and having a much reduced amount of Barkhausen noise.

What is claimed is:

1. A magnetoresistive head comprising:

a magnetoresistive film and a soft magnetic film formed in a read-track region of said magnetoresistive head with a nonmagnetic layer formed therebetween, said magnetoresistive film having opposing ends;

a ferromagnetic film; and an antiferromagnetic film formed on said magnetoresistive film, said ferromagnetic film experiencing an exchange coupling magnetic field due to direct contact with said antiferromagnetic film;

wherein said antiferromagnetic film and said ferromagnetic film have portions located on the opposing ends of said magnetoresistive film outside the read-track region;

wherein said portions of said antiferromagnetic film directly contact said portions of said magnetoresistive film;

wherein said antiferromagnetic film is located between said soft magnetic film and said ferromagnetic film; and wherein bias magnetization is applied to said magnetoresistive film by exchange coupling between said antiferromagnetic film and said ferromagnetic film.

2. A magnetoresistive head according to claim 1, wherein said antiferromagnetic film comprises a PtMn alloy.

3. A magnetoresistive head comprising:

a magnetoresistive film located in a ready-track region of said magnetoresistive head, said magnetoresistive film having opposing ends;

a ferromagnetic film; and an antiferromagnetic film formed on said ferromagnetic film, said ferromagnetic film experiencing an exchange coupling magnetic field due to direct contact with said antiferromagnetic film;

wherein said antiferromagnetic film and said ferromagnetic film are located on the opposing ends of said magnetoresistive film outside the read-track region such that a portion of said ferromagnetic film is located between said magnetoresistive film and said antiferromagnetic film;

wherein a nonmagnetic intermediate film is located between said magnetoresistive film and said ferromagnetic film for preventing ferromagnetic coupling from being developed on a contact boundary surface between said magnetoresistive film and said ferromagnetic film and for making crystal orientations of said antiferromagnetic film and said ferromagnetic film uniform; and wherein bias magnetization is applied to said magnetoresistive film by exchange coupling between said antiferromagnetic film and said ferromagnetic film.

4. A magnetoresistive head according to claim 3, wherein said nonmagnetic intermediate layer comprises one of tantalum, zirconium, titanium, chromium and hafnium.

5. A magnetoresistive head according to claim 4, wherein said antiferromagnetic film comprises a PtMn alloy.

6. A magnetoresistive head comprising:

a magnetoresistive film located in a read-track region of said magnetoresistive head, said magnetoresistive film having opposing ends;

an antiferromagnetic film; and a ferromagnetic film formed on said antiferromagnetic film, said ferromagnetic film experiencing an exchange coupling magnetic field due to direct contact with said antiferromagnetic film;

wherein said antiferromagnetic film and said ferromagnetic film are located on the opposing ends of said magnetoresistive film outside the read-track region such that a portion of said antiferromagnetic film is located between said magnetoresistive film and said ferromagnetic film; and a nonmagnetic intermediate film located between said magnetoresistive film and said antiferromagnetic film for making crystal orientations of said antiferromagnetic film and said ferromagnetic film uniform;

wherein bias magnetization is applied to said magnetoresistive film by exchange coupling between said antiferromagnetic film and said ferromagnetic film.

7. A magnetoresistive head according to claim 6, wherein said nonmagnetic intermediate layer comprises one of tantalum, zirconium, titanium, chromium and hafnium.

8. A magnetoresistive head according to claim 7, wherein said antiferromagnetic film comprises a PtMn alloy.

9. A magnetoresistive head comprising:

a magnetoresistive film located in a read-track region of said magnetoresistive head, said magnetoresistive film having opposing ends;

a ferromagnetic film; and an antiferromagnetic film formed on said ferromagnetic film, said ferromagnetic film experiencing an exchange coupling magnetic field due to direct contact with said antiferromagnetic film;

wherein said antiferromagnetic film and said ferromagnetic film are located on the opposing ends of said magnetoresistive film outside the read-track region such that a portion of said ferromagnetic film is located between said magnetoresistive film and said antiferromagnetic film;

wherein a nonmagnetic intermediate film is located between said magnetoresistive film and said ferromagnetic film for preventing ferromagnetic coupling from being developed on a contact boundary surface between said magnetoresistive film and said ferromagnetic film and for making crystal orientations of said antiferromagnetic film and said ferromagnetic film uniform;

wherein said antiferromagnetic film and said ferromagnetic film are stacked alternately to form a plurality of layers with at least one ferromagnetic-film layer generating exchange coupling on upper and lower surfaces thereof in conjunction with said antiferromagnetic films; and wherein bias magnetization is applied to said magnetoresistive film by exchange coupling between each of said stacked antiferromagnetic films and each of said stacked ferromagnetic films.

10. A magnetoresistive head according to claim 9, wherein said nonmagnetic intermediate layer comprises one of tantalum, zirconium, titanium, chromium and hafnium.

11. A magnetoresistive head according to claim 10, wherein said antiferromagnetic film comprises a PtMn alloy.

12. A magnetoresistive head comprising:

a magnetoresistive film located in a read-track region of said magnetoresistive head, said magnetoresistive film having opposing ends;

an antiferromagnetic film; and a ferromagnetic film formed on said antiferromagnetic film, said ferromagnetic film experiencing an exchange coupling magnetic field due to direct contact with said antiferromagnetic film;

wherein said antiferromagnetic film and said ferromagnetic film are located on the opposing ends of said magnetoresistive film outside the read-track region such that a portion of said antiferromagnetic film is located between said magnetoresistive film and said ferromagnetic film; and a nonmagnetic intermediate film is located between said magnetoresistive film and said antiferromagnetic film for making crystal orientations of said antiferromagnetic film and said ferromagnetic film uniform;

wherein said antiferromagnetic film and said ferromagnetic film are stacked alternately to form a plurality of layers with at least one ferromagnetic-film layer generating exchange coupling on upper and lower surfaces thereof in conjunction with said antiferromagnetic films; and wherein bias magnetization is applied to said magnetoresistive film by exchange coupling between each of said stacked antiferromagnetic films and each of said stacked ferromagnetic films.

13. A magnetoresistive head according to claim 12, wherein said nonmagnetic intermediate layer comprises one of tantalum, zirconium, titanium, chromium and hafnium.

14. A magnetoresistive head according to claim 13, wherein said antiferromagnetic film comprises a PtMn alloy.

15. A magnetoresistive head comprising:

a magnetoresistive film and a soft magnetic film formed in a read-track region of said magnetoresistive head with a nonmagnetic layer formed therebetween, said magnetoresistive film having opposing ends;

a ferromagnetic film; and an antiferromagnetic film formed on said magnetoresistive film, said ferromagnetic film experiencing an exchange coupling magnetic field due to direct contact with said antiferromagnetic film;

wherein said antiferromagnetic film and said ferromagnetic film include portions located on the opposing ends of said magnetoresistive film outside the read-track region;

wherein said portions of said antiferromagnetic film directly contact said magnetoresistive film;

wherein said antiferromagnetic film is located between said soft magnetic film and said ferromgnetic film; and wherein said antiferromagnetic film and said ferromagnetic film are stacked alternately to form a plurality of layers with at least one ferromagnetic-film layer generating exchange coupling on upper and lower surfaces thereof in conjunction with said antiferromagnetic films; and wherein bias magnetization is applied to said magnetoresistive film by exchange coupling between each of said stacked antiferromagnetic films and each of said stacked ferromagnetic films.

16. A magnetoresistive head according to claim 15, wherein said antiferromagnetic film comprises a PtMn alloy.

17. A magnetoresistive head comprising:

a ferromagnetic layer exhibiting a magnetoresistive effect; and an antiferromagnetic layer formed over said ferromagnetic layer with an interdiffusion layer formed therebetween, wherein said antiferromagnetic layer comprises an X—Mn alloy where X is selected from the group consisting of Pt, Rh, Ru, Ir and Pd, and wherein an exchange anisotropic magnetic field is generated in said interdiffusion layer formed between said antiferromagnetic layer and said antiferromagnetic layer.

18. A magnetoresistive head according to claim 17, wherein said X—Mn alloy comprises X in the range 5 to 54 at % and Mn in the range 95 to 46 at %.

19. A magnetoresistive head according to claim 18, wherein a film thickness of said interdiffusion layer is in the range from 20 to 100 Å.

20. A magnetoresistive head according to claim 17, wherein said X—Mn alloy comprises X in the range 5 to 20 at % and Mn in the range 95 to 80 at %.

21. A magnetoresistive head according to claim 20, wherein a film thickness of said interdiffusion layer is in the range from 20 to 100 Å.

22. A magnetoresistive head according to claim 17, wherein said X—Mn alloy comprises X in the range 36 to 54 at % and Mn in the range 64 to 46 at %.

23. A magnetoresistive head according to claim 22, wherein said interdiffusion layer is formed by heat treatment at a temperature in the range from 200° to 350° C.

24. A magnetoresistive head according to claim 22, wherein a film thickness of said antiferromagnetic layer is in the range 100 to 500 Å and a film thickness of said ferromagnetic layer is in the range 50 to 300 Å.

25. A magnetoresistive head according to claim 24, wherein a film thickness of said antiferromagnetic layer is in the range from 300 to 500 Å.

26. A magnetoresistive head according to claim 24, wherein a film thickness of said interdiffusion layer is in the range from 20 to 100 Å.

27. A magnetoresistive head according to claim 24, wherein a film thickness of said ferromagnetic layer is in the range from 50 to 100 Å.

28. A magnetoresistive head according to claim 22, wherein said ferromagnetic layer comprises any one of an NiFe alloy, an NiFeCo alloy and Co.

29. A magnetoresistive head according to claim 28, wherein a film thickness of said antiferromagnetic layer is in the range 100 to 500 Å and a film thickness of said ferromagnetic layer is in the range 50 to 300 Å.

30. A magnetoresistive head according to claim 29, wherein a film thickness of said antiferromagnetic layer is in the range from 300 to 500 Å.

31. A magnetoresistive head according to claim 29, wherein a film thickness of said interdiffusion layer is in the range from 20 to 100 Å.

32. A magnetoresistive head according to claim 29, wherein a film thickness of said ferromagnetic layer is in the range from 50 to 100 Å.

33. A magnetoresistive head according to claim 17, wherein said X—Mn alloy comprises 44 to 54 at % of X and 56 to 46 at % of Mn.

34. A magnetoresistive head according to claim 33, wherein said ferromagnetic layer comprises any one of an NiFe alloy, an NiFeCo alloy and Co.

35. A magnetoresistive head according to claim 34, wherein a film thickness of said antiferromagnetic layer in the range 100 to 500 Å and a film thickness of said ferromagnetic layer is in the range 50 to 300 Å.

36. A magnetoresistive head according to claim 35, wherein a film thickness of said antiferromagnetic layer is in the range from 300 to 500 Å.

37. A magnetoresistive head according to claim 35, wherein a film thickness of said interdiffusion layer is in the range from 20 to 100 Å.

38. A magnetoresistive head according to claim 35, wherein a film thickness of said ferromagnetic layer is in the range from 50 to 100 Å.

39. A magnetoresistive head according to claim 33, wherein a film thickness of said antiferromagnetic layer is in the range 100 and 500 Å and a film thickness of said ferromagnetic layer is in the range 50 to 300 Å.

40. A magnetoresistive head according to claim 39, wherein a film thickness of said antiferromagnetic layer is in the range from 300 to 500 Å.

41. A magnetoresistive head according to claim 39, wherein a film thickness of said interdiffusion layer is in the range from 20 to 100 Å.

42. A magnetoresistive head according to claim 39, wherein a film thickness of said ferromagnetic layer is in the range from 50 to 100 Å.

43. A magnetoresistive head according to claim 33, wherein said interdiffusion layer is formed by heat treatment at a temperature in the range from 200° to 350° C.

44. A magnetoresistive head according to claim 17, wherein a film thickness of said interdiffusion layer is in the range from 20 to 100 Å.

45. A magnetoresistive head comprising:

a ferromagnetic layer having a magnetoresistive effect, and an antiferromagnetic layer formed on said ferromagnetic layer, wherein said antiferromagnetic layer comprises an X—Mn alloy, where X is an element selected from the group consisting of Pt, Rh, Ru, Ir, and Pd, and where said X—Mn alloy comprises 36 to 54 at % of X and 64 to 46 at % of Mn, wherein said antiferromagnetic layer is subjected to a heat-treatment process, and wherein an exchange anisotropic magnetic field is generated between said antiferromagnetic layer and said ferromagnetic layer.

46. A magnetoresistive head according to claim 45, wherein said ferromagnetic layer comprises any one of an NiFe alloy, an NiFeCo alloy and Co.

47. A magnetoresistive head according to claim 46, wherein a film thickness of said antiferromagnetic layer is in the range 100 to 500 Å and a film thickness of said ferromagnetic layer is in the range 50 to 300 Å.

48. A magnetoresistive head according to claim 47, wherein a film thickness of said antiferromagnetic layer is in the range from 300 to 500 Å.

49. A magnetoresistive head according to claim 47, wherein a film thickness of said ferromagnetic layer is in the range from 50 to 100 Å.

50. A magnetoresistive head according to claim 45, wherein a film thickness of said antiferromagnetic layer is in the range 100 to 500 Å and a film thickness of said ferromagnetic layer is in the range 50 to 300 Å.

51. A magnetoresistive head according to claim 50, wherein a film thickness of said antiferromagnetic layer is in the range from 300 to 500 Å.

52. A magnetoresistive head according to claim 50, wherein a film thickness of said ferromagnetic layer is in the range from 50 to 100 Å.

53. A magnetoresistive head comprising:

a ferromagnetic layer having a magnetoresistive effect, and an antiferromagnetic layer formed on said ferromagnetic layer, wherein said antiferromagnetic layer comprises an X—Mn alloy, where X is an element selected from the group consisting of Pt, Rh, Ru, [Tr] *Ir*, and Pd, and where said X—Mn alloy comprises 44 to 54 at % of X and 56 to 46 at % of Mn, wherein said antiferromagnetic layer is subjected to a heat-treatment process, and wherein an exchange anisotropic magnetic field is generated between said antiferromagnetic layer and said ferromagnetic layer.

54. A magnetoresistive head according to claim 53, wherein said ferromagnetic layer comprises any one of an NiFe alloy, an NiFeCo alloy and Co.

55. A magnetoresistive head according to claim 54, wherein a film thickness of said antiferromagnetic layer is in the range 100 to 500 Å and a film thickness of said ferromagnetic layer is in the range 50 to 300 Å.

56. A magnetoresistive head according to claim 55, wherein a film thickness of said antiferromagnetic layer is in the range from 300 to 500 Å.

57. A magnetoresistive head according to claim 55, wherein a film thickness of said ferromagnetic layer is in the range from 50 to 100 Å.

58. A magnetoresistive head according to claim 53, wherein a film thickness of said antiferromagnetic layer is in the range 100 to 500 Å and a film thickness of said ferromagnetic layer is in the range of 50 to 300 Å.

59. A magnetoresistive head according to claim 58, wherein a film thickness of said antiferromagnetic layer is in the range from 300 to 500 Å.

60. A magnetoresistive head according to claim 58, wherein a film thickness of said ferromagnetic layer is in the range from 50 to 100 Å.

61. A magnetoresistive head comprising:

a free magnetic layer, a pinned magnetic layer, a nonmagnetic layer formed between said free magnetic layer and said pinned magnetic layer, a longitudinal bias layer for orienting the magnetization direction of said free magnetic layer along the track direction, and an antiferromagnetic layer formed over said pinned magnetic layer with an interdiffusion layer formed therebetween, said antiferromagnetic layer fixing the magnetization direction of said pinned magnetic layer along a direction crossing the magnetization direction of said free magnetic layer, wherein said antiferromagnetic layer comprises an X—Mn alloy, where X is an element selected from the group consisting of Pt, Rh, Rh, Ir, and Pd, and wherein an exchange anisotropic magnetic field is generated in said interdiffusion layer formed between said pinned magnetic layer and said antiferromagnetic layer.

62. A magnetoresistive head according to claim 61, wherein said X—Mn alloy comprises 5 to 54 at % of X and 95 to 46 at % of Mn.

63. A magnetoresistive head according to claim 62, wherein a film thickness of said interdiffusion layer is in the range from 20 to 100 Å.

64. A magnetoresistive head according to claim 61, wherein said X—Mn alloy comprises 5 to 20 at % of X and 95 to 80 at % of Mn.

65. A magnetoresistive head according to claim 64, wherein a film thickness of said interdiffusion layer is in the range from 20 to 100 Å.

66. A magnetoresistive head according to claim 61, wherein said X—Mn alloy comprises 36 to 54 at % of X and 64 to 46 at % of Mn.

67. A magnetoresistive head according to claim 66, wherein said pinned magnetic layer comprises any one of an NiFe alloy, an NiFeCo alloy and Co.

68. A magnetoresistive head according to claim 67, wherein a film thickness of said antiferromagnetic layer is in the range 100 to 500 Å and a film thickness of said pinned magnetic layer is in the range 50 to 300 Å.

69. A magnetoresistive head according to claim 68, wherein a film thickness of said antiferromagnetic layer is in the range 300 to 500 Å.

70. A magnetoresistive head according to claim 68, wherein a film thickness of said interdiffusion layer is in the range 20 to 100 Å.

71. A magnetoresistive head according to claim 68, wherein a film thickness of said pinned magnetic layer is in the range 50 to 100 Å.

72. A magnetoresistive head according to claim 66, wherein a film thickness of said antiferromagnetic layer is in the range 100 to 500 Å and a film thickness of said pinned magnetic layer is in the range 50 to 300 Å.

73. A magnetoresistive head according to claim 72, wherein a film thickness of said antiferromagnetic layer is in the range 300 to 500 Å.

74. A magnetoresistive head according to claim 72, wherein a film thickness of said interdiffusion layer is in the range 20 to 100 Å.

75. A magnetoresistive head according to claim 72, wherein a film thickness of said pinned magnetic layer is in the range 50 to 100 Å.

76. A magnetoresistive head according to claim 66, wherein said interdiffusion layer is formed by heat treatment at a temperature in the range from 200° to 350° C.

77. A magnetoresistive head according to claim 61, wherein a film thickness of said interdiffusion layer is in the range from 20 to 100 Å.

78. A magnetoresistive head according to claim 61, wherein said X—Mn alloy comprises 44 to 54 at % of X and 56 to 46 at % of Mn.

79. A magnetoresistive head according to claim 78, wherein said pinned magnetic layer comprises any one of an NiFe alloy, an NiFeCo alloy and Co.

80. A magnetoresistive head according to claim 79, wherein a film thickness of said antiferromagnetic layer is in the range 100 to 500 Å and a film thickness of said pinned magnetic layer is in the range 50 to 300 Å.

81. A magnetoresistive head according to claim 80, wherein a film thickness of said antiferromagnetic layer is in the range 300 to 500 Å.

82. A magnetoresistive head according to claim 80, wherein a film thickness of said interdiffusion layer is in the range 20 to 100 Å.

83. A magnetoresistive head according to claim 80, wherein a film thickness of said pinned magnetic layer is in the range 50 to 100 Å.

84. A magnetoresistive head according to claim 78, wherein said interdiffusion layer is formed by heat treatment at a temperature in the range from 200° to 350° C.

85. A magnetoresistive head according to claim 78, wherein a film thickness of said antiferromagnetic layer is in the range 100 to 500 Å and a film thickness of said pinned magnetic layer is in the range 50 to 300 Å.

86. A magnetoresistive head according to claim 85, wherein a film thickness of said antiferromagnetic layer is in the range 300 to 500 Å.

87. A magnetoresistive head according to claim 85, wherein a film thickness of said interdiffusion layer is in the range 20 to 100 Å.

88. A magnetoresistive head according to claim 85, wherein a film thickness of said pinned magnetic layer is in the range 50 to 100 Å.

89. A magnetoresistive head comprising:

a free magnetic layer, a pinned magnetic layer, a nonmagnetic layer formed between said free magnetic layer and said pinned magnetic layer, a longitudinal bias layer for orienting the magnetization direction of said free magnetic layer along the track direction, and an antiferromagnetic layer formed over said pinned magnetic layer with an interdiffusion layer formed therebetween, said antiferromagnetic layer fixing the magnetization direction of said pinned magnetic layer along a direction crossing the magnetization direction of said free magnetic layer, wherein said antiferromagnetic layer comprises an X—Mn alloy, where X is an element selected from the group consisting of Pt, Rh, Ru, Ir, and Pd, said X—Mn alloy comprises 36 to 54 at % of X and 64 to 46 at % of Mn and is subjected to a heat-treatment process to form said interdiffusion layer, and wherein an exchange anisotropic magnetic field is generated between said pinned magnetic layer and said antiferromagnetic layer.

90. A magnetoresistive head according to claim 89, wherein said pinned magnetic layer comprises any one of an NiFe alloy, an NiFeCo alloy and Co.

91. A magnetoresistive head according to claim 90, wherein a film thickness of said antiferromagnetic layer is in the range 100 to 500 Å and a film thickness of said pinned magnetic layer is in the range 50 to 300 Å.

92. A magnetoresistive head according to claim 91, wherein a film thickness of said antiferromagnetic layer is in the range 300 to 500 Å.

93. A magnetoresistive head according to claim 91, wherein a film thickness of said pinned magnetic layer is in the range 50 to 100 Å.

94. A magnetoresistive head according to claim 89, wherein a film thickness of said antiferromagnetic layer is in the range 100 to 500 Å and a film thickness of said pinned magnetic layer is in the range 50 to 300 Å.

95. A magnetoresistive head according to claim 94, wherein a film thickness of said antiferromagnetic layer is in the range 300 to 500 Å.

96. A magnetoresistive head according to claim 94, wherein a film thickness of said pinned magnetic layer is in the range 50 to 100 Å.

97. A magnetoresistive head comprising:

a free magnetic layer, a pinned magnetic layer, a nonmagnetic layer formed between said free magnetic layer and said pinned magnetic layer, a longitudinal bias layer for orienting the magnetization direction of said free magnetic layer along the track direction, and an antiferromagnetic layer formed over said pinned magnetic layer with an interdiffusion layer formed therebetween, said antiferromagnetic layer fixing the magnetization direction of said pinned magnetic layer along a direction crossing the magnetization direction of said free magnetic layer, wherein said antiferromagnetic layer comprises an X—Mn alloy, where X is an element selected from the group consisting of Pt, Rh, Ru, Ir, and Pd, said X—Mn alloy comprises 44 to 54 at % of X and 56 to 46 at % of Mn and is subjected to a heat-treatment process to form said interdiffusion layer, and wherein an exchange anisotropic magnetic field is generated between said pinned magnetic layer and said antiferromagnetic layer.

98. A magnetoresistive head according to claim 97, wherein said pinned magnetic layer comprises any one of an NiFe alloy, an NiFeCo alloy and Co.

99. A magnetoresistive head according to claim 98, wherein a film thickness of said antiferromagnetic layer is in the range 100 to 500 Å and a film thickness of said pinned magnetic layer is in the range 50 to 300 Å.

100. A magnetoresistive head according to claim 99, wherein a film thickness of said antiferromagnetic layer is in the range 300 to 500 Å.

101. A magnetoresistive head according to claim 99, wherein a film thickness of said pinned magnetic layer is in the range 50 to 100 Å.

102. A magnetoresistive head according to claim 97, wherein a film thickness of said antiferromagnetic layer is in the range 100 to 500 Å and a film thickness of said pinned magnetic layer is in the range 50 to 300 Å.

103. A magnetoresistive head according to claim 102, wherein a film thickness of said antiferromagnetic layer is in the range 300 to 500 Å.

104. A magnetoresistive head according to claim 102, wherein a film thickness of said pinned magnetic layer is in the range 50 to 100 Å.

*105. A magnetoresistive head comprising:*

*a free magnetic layer;*

*a pinned magnetic layer;*

*a nonmagnetic layer interposed between said free magnetic layer and said pinned magnetic layer;*

*a longitudinal bias layer for orienting the magnetization direction of said free magnetic layer along a track direction;*

*an antiferromagnetic layer;*

*said pinned magnetic layer interposed between said antiferromagnetic layer and said free magnetic layer, said antiferromagnetic layer fixing the magnetization direction of said pinned magnetic layer along a direction crossing the magnetization direction of said free magnetic layer; and*

*an interdiffusion layer formed between said antiferromagnetic layer and said pinned magnetic layer;*

*wherein said antiferromagnetic layer comprises a X—Mn alloy where X comprises an element selected from the group consisting of Pt, Rh, Ru, Ir, and Pd.*

*106. A magnetoresistive head according to claim 105, wherein said interdiffusion layer includes an X element.*

*107. A magnetoresistive head according to claim 105, wherein said interdiffusion layer includes Mn.*

*108. A magnetoresistive head according to claim 105, wherein a film thickness of said interdiffusion layer is in the range of about 20 to 100 Å.*

*109. A magnetoresistive head according to claim 105, wherein said X—Mn alloy comprises about 5 to 54 at % of X and about 95 to 46 at % of Mn.*

*110. A magnetoresistive head according to claim 109, wherein said pinned magnetic layer comprises one of an NiFe alloy, an NiFeCo alloy and Co.*

*111. A magnetoresistive head according to claim 109, wherein a film thickness of said antiferromagnetic layer is in the range of about 100 to 500 Å and a film thickness of said pinned magnetic layer is in the range of about 50 to 300 Å.*

*112. A magnetoresistive head according to claim 109, wherein said interdiffusion layer is formed by heat treatment at a temperature in the range of about 200° C. to 350° C.*

*113. A magnetoresistive head according to claim 111, wherein a film thickness of said antiferromagnetic layer is in the range of about 100 to 300 Å.*

*114. A magnetoresistive head according to claim 111, wherein a film thickness of said interdiffusion layer is in the range of about 20 to 100 Å.*

*115. A magnetoresistive head according to claim 111, wherein a film thickness of said pinned magnetic layer is in the range of about 50 to 100 Å.*

*116. A magnetoresistive head according to claim 105, wherein said X—Mn alloy comprises about 5 to 20 at % of X and about 95 to 80 at % of Mn.*

*117. A magnetoresistive head according to claim 116, wherein said pinned magnetic layer comprises one of an NiFe alloy, an NiFeCo alloy and Co.*

*118. A magnetoresistive head according to claim 116, wherein a film thickness of said antiferromagnetic layer is in the range of about 100 to 500 Å and a film thickness of said pinned magnetic layer is in the range of about 50 to 300 Å.*

*119. A magnetoresistive head according to claim 116, wherein said interdiffusion layer is formed by heat treatment at a temperature in the range of about 200° C. to 350° C.*

*120. A magnetoresistive head according to claim 118, wherein a film thickness of said antiferromagnetic layer is in the range of about 100 to 300 Å.*

*121. A magnetoresistive head according to claim 118, wherein a film thickness of said interdiffusion layer is in the range of about 20 to 100 Å.*

*122. A magnetoresistive head according to claim 118, wherein a film thickness of said pinned magnetic layer is in the range of about 50 to 100 Å.*

*123. A magnetoresistive head according to claim 105, wherein said X—Mn alloy comprises about 36 to 54 at % of X and about 64 to 46 at % of Mn.*

*124. A magnetoresistive head according to claim 123, wherein said pinned magnetic layer comprises one of an NiFe alloy, an NiFeCo alloy and Co.*

*125. A magnetoresistive head according to claim 123, wherein a film thickness of said antiferromagnetic layer is in the range of about 100 to 500 Å and a film thickness of said pinned magnetic layer is in the range of about 50 to 300 Å.*

*126. A magnetoresistive head according to claim 123, wherein said interdiffusion layer is formed by heat treatment at a temperature in the range of about 200° C. to 350° C.*

*127. A magnetoresistive head according to claim 125, wherein a film thickness of said antiferromagnetic layer is in the range of about 100 to 300 Å.*

*128. A magnetoresistive head according to claim 125, wherein a film thickness of said interdiffusion layer is in the range of about 20 to 100 Å.*

*129. A magnetoresistive head according to claim 125, wherein a film thickness of said pinned magnetic layer is in the range of about 50 to 100 Å.*

*130. A magnetoresistive head according to claim 105, wherein said X—Mn alloy comprises about 44 to 54 at % of X and about 56 to 46 at % of Mn.*

*131. A magnetoresistive head according to claim 130, wherein said pinned magnetic layer comprises one of an NiFe alloy, an NiFeCo alloy and Co.*

*132. A magnetoresistive head according to claim 130, wherein a film thickness of said antiferromagnetic layer is in the range of about 100 to 500 Å and a film thickness of said pinned magnetic layer is in the range of about 50 to 300 Å.*

*133. A magnetoresistive head according to claim 130, wherein said interdiffusion layer is formed by heat treatment at a temperature in the range of about 200° C. to 350° C.*

*134. A magnetoresistive head according to claim 132, wherein a film thickness of said antiferromagnetic layer is in the range of about 100 to 300 Å.*

*135. A magnetoresistive head according to claim 132, wherein a film thickness of said interdiffusion layer is in the range of about 20 to 100 Å.*

*136. A magnetoresistive head according to claim 132, wherein a film thickness of said pinned magnetic layer is in the range of about 50 to 100 Å.*

*137. A magnetoresistive head according to claim 105, wherein said longitudinal bias layer is disposed adjacent said free magnetic layer; and said longitudinal bias layer comprises an antiferromagnetic X—Mn alloy where X comprises an element selected from the group consisting of Pt, Rh, Ru, Ir, and Pd.*

*138. A magnetoresistive head according to claim 105, wherein said interdiffusion layer is formed by heat treatment at a temperature in the range of about 200° C. to 350° C.*

*139. A magnetoresistive head comprising:*

*a free magnetic layer;*

*a pinned magnetic layer;*

*a nonmagnetic layer interposed between said free magnetic layer and said pinned magnetic layer;*

*a longitudinal bias layer for orienting the magnetization direction of said free magnetic layer along a track direction;*

*an antiferromagnetic layer;*

*said pinned magnetic layer interposed between said antiferromagnetic layer and said free magnetic layer, said antiferromagnetic layer fixing the magnetization direction of said pinned magnetic layer along a direction crossing the magnetization direction of said free magnetic layer; and*

*an interdiffusion layer formed between said antiferromagnetic layer and said pinned magnetic layer; said interdiffusion layer comprises an element selected from the group consisting of Pt, Rh, Ru, Ir, and Pd, and said interdiffusion layer generates an exchange anisotropic magnetic field therein.*

*140. A magnetoresistive head according to claim 139, wherein said interdiffusion layer includes Mn.*

*141. A magnetoresistive head according to claim 139, wherein a film thickness of said interdiffusion layer is in the range of about 20 to 100 Å.*

*142. A magnetoresistive head according to claim 139, wherein said antiferromagnetic layer comprises a X—Mn alloy where X comprises an element selected from the group consisting of Pt, Rh, Ru, Ir and Pd; and said X—Mn alloy comprises about 5 to 54 at % of X and about 95 to 46 at % of Mn.*

*143. A magnetoresistive head according to claim 142, wherein said pinned magnetic layer comprises one of an NiFe alloy, an NiFeCo alloy and Co.*

*144. A magnetoresistive head according to claim 142, wherein a film thickness of said antiferromagnetic layer is in the range of about 100 to 500 Å and a film thickness of said pinned magnetic layer is in the range of about 50 to 300 Å.*

*145. A magnetoresistive head according to claim 142, wherein said interdiffusion layer is formed by heat treatment at a temperature in the range of about 200° C. to 350° C.*

*146. A magnetoresistive head according to claim 144, wherein a film thickness of said antiferromagnetic layer is in the range of about 100 to 300 Å.*

*147. A magnetoresistive head according to claim 144, wherein a film thickness of said interdiffusion layer is in the range of about 20 to 100 Å.*

*148. A magnetoresistive head according to claim 144, wherein a film thickness of said pinned magnetic layer is in the range of about 50 to 100 Å.*

*149. A magnetoresistive head according to claim 139, wherein said antiferromagnetic layer comprises a X—Mn alloy where X comprises an element selected from the group consisting of Pt, Rh, Ru, Ir and Pd; and said X—Mn alloy comprises about 5 to 20 at % of X and about 95 to 80 at % of Mn.*

*150. A magnetoresistive head according to claim 149, wherein said pinned magnetic layer comprises one of an NiFe alloy, an NiFeCo alloy and Co.*

*151. A magnetoresistive head according to claim 149, wherein a film thickness of said antiferromagnetic layer is in the range of about 100 to 500 Å and a film thickness of said pinned magnetic layer is in the range of about 50 to 300 Å.*

*152. A magnetoresistive head according to claim 149, wherein said interdiffusion layer is formed by heat treatment at a temperature in range of about 200° C. to 350° C.*

*153. A magnetoresistive head according to claim 151, wherein a film thickness of said antiferromagnetic layer is in the range of about 100 to 300 Å.*

*154. A magnetoresistive head according to claim 151, wherein a film thickness of said interdiffusion layer is in the range of about 20 to 100 Å.*

*155. A magnetoresistive head according to claim 151, wherein a film thickness of said pinned magnetic layer is in the range of about 50 to 100 Å.*

*156. A magnetoresistive head according to claim 139, wherein said antiferromagnetic layer comprises a X—Mn alloy where X comprises an element selected from the group consisting of Pt, Rh, Ru, Ir and Pd; and said X—Mn alloy comprises about 36 to 54 at % of X and about 64 to 46 at % of Mn.*

*157. A magnetoresistive head according to claim 156, wherein said pinned magnetic layer comprises one of an NiFe alloy, an NiFeCo alloy and Co.*

*158. A magnetoresistive head according to claim 156, wherein a film thickness of said antiferromagnetic layer is in the range of about 100 to 500 Å and a film thickness of said pinned magnetic layer is in the range of about 50 to 300 Å.*

*159. A magnetoresistive head according to claim 156, wherein said interdiffusion layer is formed by heat treatment at a temperature in the range of about 200° C. to 350° C.*

*160. A magnetoresistive head according to claim 158, wherein a film thickness of said antiferromagnetic layer is in the range of about 100 to 300 Å.*

*161. A magnetoresistive head according to claim 158, wherein a film thickness of said interdiffusion layer is in the range of about 20 to 100 Å.*

*162. A magnetoresistive head according to claim 158, wherein a film thickness of said pinned magnetic layer is in the range of about 50 to 100 Å.*

*163. A magnetoresistive head according to claim 139, wherein said antiferromagnetic layer comprises a X—Mn alloy where X comprises an element selected from the group consisting of Pt, Rh, Ru, Ir and Pd; and said X—Mn alloy comprises about 44 to 54 at % of X and about 56 to 46 at % of Mn.*

*164. A magnetoresistive head according to claim 163, wherein said pinned magnetic layer comprises one of an NiFe alloy, an NiFeCo alloy and Co.*

*165. A magnetoresistive head according to claim 163, wherein a film thickness of said antiferromagnetic layer is in the range of about 100 to 500 Å and a film thickness of said pinned magnetic layer is in the range of about 50 to 300 Å.*

*166. A magnetoresistive head according to claim 163, wherein said interdiffusion layer is formed by heat treatment at a temperature in the range of about 200° C. to 350° C.*

*167. A magnetoresistive head according to claim 165, wherein a film thickness of said antiferromagnetic layer is in the range of about 100 to 300 Å.*

*168. A magnetoresistive head according to claim 165, wherein a film thickness of said interdiffusion layer is in the range of about 20 to 100 Å.*

*169. A magnetoresistive head according to claim 165, wherein a film thickness of said pinned magnetic layer is in the range of about 50 to 100 Å.*

*170. A magnetoresistive head according to claim 139, wherein said longitudinal bias layer is disposed adjacent said free magnetic layer; and said longitudinal bias layer comprises an antiferromagnetic X—Mn alloy where X comprises an element selected from the group consisting of Pt, Rh, Ru, Ir, and Pd.*

*171. A magnetoresistive head according to claim 139, wherein said interdiffusion layer is formed by heat treatment at a temperature in the range of about 200° C. to 350° C.*

*172. A magnetoresistive head according to claim 139, wherein said antiferromagnetic layer comprises a X—Mn alloy where X comprises an element selected from the group consisting of Pt, Rh, Ru, Ir, and Pd.*

*173. A magnetoresistive head according to claim 172, wherein said pinned magnetic layer comprises one of an NiFe alloy, an NiFeCo alloy and Co.*

*174. A magnetoresistive head according to claim 172, wherein a film thickness of said antiferromagnetic layer is in the range of about 100 to 500 Å and a film thickness of said pinned magnetic layer is in the range of about 50 to 300 Å.*

*175. A magnetoresistive head according to claim 172, wherein said interdiffusion layer is formed by heat treatment at a temperature in the range of about from 200° C. to 350° C.*

*176. A magnetoresistive head according to claim 174, wherein a film thickness of said antiferromagnetic layer is in the range of about 100 to 300 Å.*

*177. A magnetoresistive head according to claim 174, wherein a film thickness of said interdiffusion layer is in the range of about 20 to 100 Å.*

*178. A magnetoresistive head according to claim 174, wherein a film thickness of said pinned magnetic layer is in the range of about 50 to 100 Å.*

*179. A magnetoresistive head comprising:*

*a free magnetic layer;*

*a pinned magnetic layer;*

*a nonmagnetic layer interposed between said free magnetic layer and said pinned magnetic layer;*

*a longitudinal bias layer for orienting the magnetization direction of said free magnetic layer along a track direction;*

*an antiferromagnetic layer, wherein said antiferromagnetic layer comprises a X—Mn alloy where X comprises an element selected from the group consisting of Pt, Rh, Ru, Ir, and Pd, and wherein said X—Mn alloy comprises about 36 to 54 at % of X and about 64 to 46 at % of Mn;*

*said pinned magnetic layer interposed between said antiferromagnetic layer and said free magnetic layer, said antiferromagnetic layer fixing the magnetization direction of said pinned magnetic layer along a direction crossing the magnetization direction of said free magnetic layer; and*

*an interdiffusion layer formed between said antiferromagnetic layer and said pinned magnetic layer.*

*180. A magnetoresistive head according to claim 179, wherein a film thickness of said antiferromagnetic layer is in the range of about 100 to 500 Å and a film thickness of said pinned magnetic layer is in the range of about 50 to 300 Å.*

*181. A magnetoresistive head according to claim 180, wherein a film thickness of said antiferromagnetic layer is in the range of about 100 to 300 Å.*

*182. A magnetoresistive head according to claim 180, wherein a film thickness of said interdiffusion layer is in the range of about 20 to 100 Å.*

*183. A magnetoresistive head according to claim 180, wherein a film thickness of said pinned magnetic layer is in the range of about 50 to 100 Å.*

*184. A magnetoresistive head according to claim 179, wherein said interdiffusion layer includes an X element.*

*185. A magnetoresistive head according to claim 179, wherein said interdiffusion layer includes Mn.*

*186. A magnetoresistive head according to claim 179, wherein a film thickness of said interdiffusion layer is in the range of about 20 to 100 Å.*

*187. A magnetoresistive head according to claim 179, wherein said pinned magnetic layer comprises one of an NiFe alloy, an NiFeCo alloy and Co.*

*188. A magnetoresistive head according to claim 179, wherein said longitudinal bias layer is disposed adjacent said free magnetic layer; and said longitudinal bias layer comprises an antiferromagnetic X—Mn alloy where X comprises an element selected from the group consisting of Pt, Rh, Ru, Ir, and Pd.*

*189. A magnetoresistive head according to claim 179, wherein said interdiffusion layer is formed by heat treatment at a temperature in the range of about 200° C. to 350° C.*

*190. A magnetoresistive head comprising:*

*a free magnetic layer;*

*a pinned magnetic layer;*

*a nonmagnetic layer interposed between said free magnetic layer and said pinned magnetic layer;*

*a longitudinal bias layer for orienting the magnetization direction of said free magnetic layer along a track direction;*

*an antiferromagnetic layer, wherein said antiferromagnetic layer comprises a X—Mn alloy where X comprises an element selected from the group consisting of Pt, Rh, Ru, Ir, and Pd, and wherein said X—Mn alloy comprises about 44 to 54 at % of X and about 56 to 46 at % of Mn;*

*said pinned magnetic layer interposed between said antiferromagnetic layer and said free magnetic layer, said antiferromagnetic layer fixing the magnetization direction of said pinned magnetic layer along a direction crossing the magnetization direction of said free magnetic layer; and*

*an interdiffusion layer formed between said antiferromagnetic layer and said pinned magnetic layer.*

*191. A magnetoresistive head according to claim 190, wherein said pinned magnetic layer comprises one of an NiFe alloy, an NiFeCo alloy and Co.*

*192. A magnetoresistive head according to claim 190, wherein a film thickness of said antiferromagnetic layer is in the range of about 100 to 500 Å and a film thickness of said pinned magnetic layer is in the range of about 50 to 300 Å.*

*193. A magnetoresistive head according to claim 192, wherein a film thickness of said antiferromagnetic layer is in the range of about 100 to 300 Å.*

*194. A magnetoresistive head according to claim 192, wherein a film thickness of said interdiffusion layer is in the range of about 20 to 100 Å.*

*195. A magnetoresistive head according to claim 192, wherein a film thickness of said pinned magnetic layer is in the range of about 50 to 100 Å.*

*196. A magnetoresistive head according to claim 190, wherein said interdiffusion layer includes an element X.*

*197. A magnetoresistive head according to claim 190, wherein said interdiffusion layer includes Mn.*

*198. A magnetoresistive head according to claim 190, wherein a film thickness of said interdiffusion layer is in the range of about 20 to 100 Å.*

*199. A magnetoresistive head according to claim 190, wherein said longitudinal bias layer is disposed adjacent said free magnetic layer; and said longitudinal bias layer comprises an antiferromagnetic X—Mn alloy where X comprises an element selected from the group consisting of Pt, Rh, Ru, Ir, and Pd.*

*200. A magnetoresistive head according to claim 190, wherein said interdiffusion layer is formed by heat treatment at a temperature in the range of about 200° C. to 350° C.*

*201. A magnetoresistive head comprising:*

*a ferromagnetic layer,*

*an antiferromagnetic layer disposed adjacent said ferromagnetic layer;*

*wherein said antiferromagnetic layer comprises an X—Mn alloy where X comprises an element selected from the group consisting of Pt, Rh, Ru, Ir, and Pd; and*

*an interdiffusion layer formed between said ferromagnetic layer and said antiferromagnetic layer.*

*202. A magnetoresistive head according to claim 201, wherein said interdiffusion layer includes an X element.*

*203. A magnetoresistive head according to claim 201, wherein said interdiffusion layer includes Mn.*

*204. A magnetoresistive head according to claim 201, wherein a film thickness of said interdiffusion layer is in the range of about 20 to 100 Å.*

*205. A magnetoresistive head according to claim 201, wherein said X—Mn alloy comprises about 5 to 54 at % of X and about 95 to 46 at % of Mn.*

*206. A magnetoresistive head according to claim 201, wherein said ferromagnetic layer comprises one of an NiFe alloy, an NiFeCo alloy and Co.*

*207. A magnetoresistive head according to claim 201, wherein a film thickness of said antiferromagnetic layer is in the range of about 100 to 500 Å and a film thickness of said ferromagnetic layer is in the range of about 50 to 300 Å.*

*208. A magnetoresistive head according to claim 201, wherein said interdiffusion layer is formed by heat treatment at a temperature in the range of about 200° C. to 350° C.*

*209. A magnetoresistive head according to claim 207, wherein a film thickness of said antiferromagnetic layer is in the range of about 100 to 300 Å.*

*210. A magnetoresistive head according to claim 207, wherein a film thickness of said interdiffusion layer is in the range of about 20 to 100 Å.*

*211. A magnetoresistive head according to claim 207, wherein a film thickness of said ferromagnetic layer is in the range of about 50 to 100 Å.*

*212. A magnetoresistive head according to claim 201, wherein said X—Mn alloy comprises about 5 to 20 at % of X and about 95 to 80 at % of Mn.*

*213. A magnetoresistive head according to claim 212, wherein said ferromagnetic layer comprises one of an NiFe alloy, an NiFeCo alloy and Co.*

*214. A magnetoresistive head according to claim 212, wherein a film thickness of said antiferromagnetic layer is in the range of about 100 to 500 Å and a film thickness of said ferromagnetic layer is in the range of about 50 to 300 Å.*

*215. A magnetoresistive head according to claim 212, wherein said interdiffusion layer is formed by heat treatment at a temperature in the range of about 200° C. to 350° C.*

*216. A magnetoresistive head according to claim 214, wherein a film thickness of said antiferromagnetic layer is in the range of about 100 to 300 Å.*

*217. A magnetoresistive head according to claim 214, wherein a film thickness of said interdiffusion layer is in the range of about 20 to 100 Å.*

*218. A magnetoresistive head according to claim 214, wherein a film thickness of said ferromagnetic layer is in the range of about 50 to 100 Å.*

*219. A magnetoresistive head according to claim 201, wherein said X—Mn alloy comprises about 36 to 54 at % of X and about 64 to 46 at % of Mn.*

*220. A magnetoresistive head according to claim 219, wherein said ferromagnetic layer comprises one of an NiFe alloy, an NiFeCo alloy and Co.*

*221. A magnetoresistive head according to claim 219, wherein a film thickness of said antiferromagnetic layer is in the range of about 100 to 500 Å and a film thickness of said ferromagnetic layer is in the range of about 50 to 300 Å.*

*222. A magnetoresistive head according to claim 219, wherein said interdiffusion layer is formed by heat treatment at a temperature in the range of about 200° C. to 350° C.*

*223. A magnetoresistive head according to claim 221, wherein a film thickness of said antiferromagnetic layer is in the range of about 100 to 300 Å.*

*224. A magnetoresistive head according to claim 221, wherein a film thickness of said interdiffusion layer is in the range of about 20 to 100 Å.*

*225. A magnetoresistive head according to claim 221, wherein a film thickness of said ferromagnetic layer is in the range of about 50 to 100 Å.*

*226. A magnetoresistive head according to claim 201, wherein said X—Mn alloy comprises about 44 to 54 at % of X and about 56 to 46 at % of Mn.*

*227. A magnetoresistive head according to claim 226, wherein said ferromagnetic layer comprises one of an NiFe alloy, an NiFeCo alloy and Co.*

*228. A magnetoresistive head according to claim 226, wherein a film thickness of said antiferromagnetic layer is in the range of about 100 to 500 Å and a film thickness of said ferromagnetic layer is in the range of about 50 to 300 Å.*

*229. A magnetoresistive head according to claim 226, wherein said interdiffusion layer is formed by heat treatment at a temperature in the range of about from 200° C. to 350° C.*

*230. A magnetoresistive head according to claim 228, wherein a film thickness of said antiferromagnetic layer is in the range of about 100 to 300 Å.*

*231. A magnetoresistive head according to claim 228, wherein a film thickness of said interdiffusion layer is in the range of about 20 to 100 Å.*

*232. A magnetoresistive head according to claim 228, wherein a film thickness of said ferromagnetic layer is in the range of about 50 to 100 Å.*

*233. A magnetoresistive head according to claim 201, wherein said interdiffusion layer is formed by heat treatment at a temperature in the range of about 200° C. to 350° C.*

*234. A magnetoresistive head according to claim 201, wherein said ferromagnetic layer exhibits a magnetoresistive effect; and said an exchange anisotropic magnetic field is generated in said interdiffusion layer.*

*235. A magnetoresistive head according to claim 234, wherein said interdiffusion layer includes an X element.*

*236. A magnetoresistive head according to claim 234, wherein said interdiffusion layer includes Mn.*

*237. A magnetoresistive head according to claim 234, wherein a film thickness of said interdiffusion layer is in the range of about 20 to 100 Å.*

*238. A magnetoresistive head according to claim 234, wherein said X—Mn alloy comprises about 5 to 54 at % of X and about 95 to 46 at % of Mn.*

*239. A magnetoresistive head according to claim 234, wherein said X—Mn alloy comprises about 5 to 20 at % of X and about 95 to 80 at % of Mn.*

*240. A magnetoresistive head according to claim 234, wherein said X—Mn alloy comprises about 36 to 54 at % of X and about 64 to 46 at % of Mn.*

*241. A magnetoresistive head according to claim 234, wherein said X—Mn alloy comprises about 44 to 54 at % of X and about 56 to 46 at % of Mn.*

*242. A magnetoresistive head according to claim 234, wherein said interdiffusion layer is formed by heat treatment at a temperature in the range of about 200° C. to 350° C.*

*243. A magnetoresistive head comprising:*

*a free magnetic layer;*

*a pinned magnetic layer;*

*a nonmagnetic layer interposed between said free magnetic layer and said pinned magnetic layer;*

*a longitudinal bias layer for orienting the magnetization direction of said free magnetic layer along a track direction, said longitudinal bias layer disposed adjacent said free magnetic layer, wherein said longitudinal bias layer comprises an antiferromagnetic X—Mn alloy where X comprises an element selected from the group consisting of Pt, Rh, Ru, Ir, and Pd;*

*an antiferromagnetic layer;*

*said pinned magnetic layer interposed between said antiferromagnetic layer and said free magnetic layer, said antiferromagnetic layer fixing the magnetization direction of said pinned magnetic layer along a direction crossing the magnetization direction of said free magnetic layer; and*

*an interdiffusion layer formed between said free magnetic layer and said longitudinal bias layer.*

*244. A magnetoresistive head according to claim 243, wherein said free magnetic layer includes a read-track region and said longitudinal bias layer is disposed adjacent to and outside of said read-track region of said free magnetic layer.*

*245. A magnetoresistive head according to claim 243, wherein said interdiffusion layer includes an X element.*

*246. A magnetoresistive head according to claim 243, wherein said interdiffusion layer includes Mn.*

*247. A magnetoresistive head according to claim 243, wherein a film thickness of said interdiffusion layer is in the range of about 20 to 100 Å.*

*248. A magnetoresistive head according to claim 243, wherein said antiferromagnetic X—Mn alloy comprises about 5 to 54 at % of X and about 95 to 46 at % of Mn.*

*249. A magnetoresistive head according to claim 248, wherein said free magnetic layer comprises one of an NiFe alloy, an NiFeCo alloy and Co.*

*250. A magnetoresistive head according to claim 248, wherein a film thickness of said longitudinal bias layer is in*

*the range of about 100 to 500 Å and a film thickness of said free magnetic layer is in the range of about 50 to 300 Å.*

*251. A magnetoresistive head according to claim 248, wherein said interdiffusion layer is formed by heat treatment at a temperature in the range of about 200° C. to 350° C.*

*252. A magnetoresistive head according to claim 250, wherein a film thickness of said longitudinal bias layer is in the range of about 100 to 300 Å.*

*253. A magnetoresistive head according to claim 250, wherein a film thickness of said interdiffusion layer is in the range of about 20 to 100 Å.*

*254. A magnetoresistive head according to claim 250, wherein a film thickness of said free magnetic layer is in the range of about 50 to 100 Å.*

*255. A magnetoresistive head according to claim 243, wherein said antiferromagnetic X—Mn alloy comprises about 5 to 20 at % of X and about 95 to 80 at % of Mn.*

*256. A magnetoresistive head according to claim 255, wherein said free magnetic layer comprises any one of an NiFe alloy, an NiFeCo alloy and Co.*

*257. A magnetoresistive head according to claim 255, wherein a film thickness of said longitudinal bias layer is in the range of about 100 to 500 Å and a film thickness of said free magnetic layer is in the range of about 50 to 300 Å.*

*258. A magnetoresistive head according to claim 255, wherein said interdiffusion layer is formed by heat treatment at a temperature in the range of about 200° C. to 350° C.*

*259. A magnetoresistive head according to claim 257, wherein a film thickness of said longitudinal bias layer is in the range of about 100 to 300 Å.*

*260. A magnetoresistive head according to claim 257, wherein a film thickness of said interdiffusion layer is in the range of about 20 to 100 Å.*

*261. A magnetoresistive head according to claim 257, wherein a film thickness of said free magnetic layer is in the range of about 50 to 100 Å.*

*262. A magnetoresistive head according to claim 243, wherein said antiferromagnetic X—Mn alloy comprises about 36 to 54 at % of X and about 64 to 46 at % of Mn.*

*263. A magnetoresistive head according to claim 262, wherein said free magnetic layer comprises one of an NiFe alloy, an NiFeCo alloy and Co.*

*264. A magnetoresistive head according to claim 262, wherein a film thickness of said antiferromagnetic layer is in the range of about 100 to 500 Å and a film thickness of said free magnetic layer is in the range of about 50 to 300 Å.*

*265. A magnetoresistive head according to claim 262, wherein said interdiffusion layer is formed by heat treatment at a temperature in the range of about 200° C. to 350° C.*

*266. A magnetoresistive head according to claim 264, wherein a film thickness of said antiferromagnetic layer is in the range of about 100 to 300 Å.*

*267. A magnetoresistive head according to claim 264, wherein a film thickness of said interdiffusion layer is in the range of about 20 to 100 Å.*

*268. A magnetoresistive head according to claim 264, wherein a film thickness of said free magnetic layer is in the range of about 50 to 100 Å.*

*269. A magnetoresistive head according to claim 243, wherein said antiferromagnetic X—Mn alloy comprises about 44 to 54 at % of X and about 56 to 46 at % of Mn.*

*270. A magnetoresistive head according to claim 269, wherein said free magnetic layer comprises one of an NiFe alloy, an NiFeCo alloy and Co.*

*271. A magnetoresistive head according to claim 269, wherein a film thickness of said longitudinal bias layer is in the range of about 100 to 500 Å and a film thickness of said free magnetic layer is in the range of about 50 to 300 Å.*

*272. A magnetoresistive head according to claim 269, wherein said interdiffusion layer is formed by heat treatment at a temperature in the range of about 200° C. to 350° C.*

*273. A magnetoresistive head according to claim 271, wherein a film thickness of said longitudinal bias layer is in the range of about 100 to 300 Å.*

*274. A magnetoresistive head according to claim 271, wherein a film thickness of said interdiffusion layer is in the range of about 20 to 100 Å.*

*275. A magnetoresistive head according to claim 271, wherein a film thickness of said free magnetic layer is in the range of about 50 to 100 Å.*

*276. A magnetoresistive head according to claim 243, wherein said interdiffusion layer is formed by heat treatment at a temperature in the range of about 200° C. to 350° C.*

*277. A magnetoresistive head comprising:*

*a magnetoresistive effect structure exhibiting a magnetoresistive effect, said magnetoresistive effect structure disposed on a read-track region of said magnetoresistive head, said magnetoresistive effect structure having opposing ends;*

*a bias magnetization structure including a first part disposed on one of said opposing ends of said magnetoresistive effect structure and a second part disposed at the other one of said opposing ends of said magnetoresistive effect structure,*

*said first and second parts including a plurality of layers of an antiferromagnetic film and a plurality of layers of a ferromagnetic film, said layers of said antiferromagnetic film and said layers of ferromagnetic film stacked alternately to form a plurality of layers with at least one ferromagnetic film layer generating exchange coupling on upper and lower surfaces thereof in conjunction with said antiferromagnetic film layers; and*

*wherein bias magnetization is applied to said magnetoresistive effect structure by said magnetization structure.*

*278. A magnetoresistive head according to claim 277, wherein an interdiffusion layer is formed between said magnetoresistive effect structure and said bias magnetization structure.*

*279. A magnetoresistive head according to claim 277, wherein an interdiffusion layer is formed between said ferromagnetic film and antiferromagnetic film; and said interdiffusion layer comprises an element selected from the group consisting of Pt, Rh, Ru, Ir, and Pd.*

*280. A magnetoresistive head according to claim 277, wherein an interdiffusion layer is formed between said ferromagnetic film and antiferromagnetic film; and said interdiffusion layer includes Mn.*

*281. A magnetoresistive head according to claim 277, wherein an interdiffusion layer is formed between said ferromagnetic film and antiferromagnetic film; and a film thickness of said interdiffusion layer is in the range of about 20 to 100 Å.*

*282. A magnetoresistive head according to claim 277, wherein said antiferromagnetic film comprises a X—Mn alloy where X comprises an element selected from the group consisting of Pt, Rh, Ru, Ir, and Pd.*

*283. A magnetoresistive head according to claim 282, wherein said ferromagnetic film comprises one of an NiFe alloy, an NiFeCo alloy and Co.*

*284. A magnetoresistive head according to claim 282, wherein a film thickness of said antiferromagnetic film is in the range of about 100 to 500 Å and a film thickness of said ferromagnetic film is in the range of about 50 to 300 Å.*

285. A magnetoresistive head according to claim 282, wherein an interdiffusion layer if formed between said ferromagnetic film and antiferromagnetic film; and said interdiffusion layer is formed by heat treatment at a temperature in the range of about 200° C. to 350° C.

286. A magnetoresistive bead according to claim 284, wherein a film thickness of said antiferromagnetic film is in the range of about 100 to 300 Å.

287. A magnetoresistive head according to claim 284, wherein an interdiffusion layer is formed between said ferromagnetic film and antiferromagnetic film; and a film thickness of said interdiffusion layer is in the range of about 20 to 100 Å.

288. A magnetoresistive head according to claim 284, wherein a film thickness of said ferromagnetic film is in the range of about 50 to 100 Å.

289. A magnetoresistive head according to claim 282, wherein said X—Mn alloy comprises about 5 to 54 at % of X and about 95 to 46 at % of Mn.

290. A magnetoresistive head according to claim 289, wherein said ferromagnetic film comprises one of an NiFe alloy, an NiFeCo alloy and Co.

291. A magnetoresistive head according to claim 289, wherein a film thickness of said antiferromagnetic film is in the range of about 100 to 500 Å and a film thickness of said ferromagnetic film is in the range of about 50 to 300 Å.

292. A magnetoresistive head according to claim 289, wherein an interdiffusion layer is formed between said ferromagnetic film and antiferromagnetic film; and said interdiffusion layer is formed by heat treatment at a temperature in the range of about 200° C. to 350° C.

293. A magnetoresistive head according to claim 291, wherein a film thickness of said antiferromagnetic film is in the range of about 100 to 300 Å.

294. A magnetoresistive head according to claim 291, wherein an interdiffusion layer is formed between said ferromagnetic film and antiferromagnetic film; and a film thickness of said interdiffusion layer is in the range of about 20 to 100 Å.

295. A magnetoresistive head according to claim 291, wherein a film thickness of said ferromagnetic film is in the range of about 50 to 100 Å.

296. A magnetoresistive head according to claim 282, wherein said X—Mn alloy comprises about 5 to 20 at % of X and about 95 to 80 at % of Mn.

297. A magnetoresistive head according to claim 296, wherein said ferromagnetic film comprises one of an NiFe alloy, an NiFeCo alloy and Co.

298. A magnetoresistive head according to claim 296, wherein a film thickness of said antiferromagnetic film is in the range of about 100 to 500 Å and a film thickness of said ferromagnetic films is in the range of about 50 to 300 Å.

299. A magnetoresistive head according to claim 296, wherein an interdiffusion layer is formed between said ferromagnetic film and antiferromagnetic film; and said interdiffusion layer is formed by heat treatment at a temperature in the range of about 200° C. to 350° C.

300. A magnetoresistive head according to claim 298, wherein a film thickness of said antiferromagnetic film is in the range of about 100 to 300 Å.

301. A magnetoresistive head according to claim 298, wherein an interdiffusion layer is formed between said ferromagnetic film and antiferromagnetic film; and a film thickness of said interdiffusion layer is in the range of about 20 to 100 Å.

302. A magnetoresistive head according to claim 298, wherein a film thickness of said ferromagnetic films is in the range of about 50 to 100 Å.

303. A magnetoresistive head according to claim 282, wherein said X—Mn alloy comprises about 36 to 54 at % of X and about 64 to 46 at % of Mn.

304. A magnetoresistive head according to claim 303, wherein said ferromagnetic film comprises one of an NiFe alloy, an NiFeCo alloy and Co.

305. A magnetoresistive head according to claim 303, wherein a film thickness of said antiferromagnetic film is in the range of about 100 to 500 Å and a film thickness of said ferromagnetic film is in the range of about 50 to 300 Å.

306. A magnetoresistive head according to claim 303, wherein an interdiffusion layer is formed between said ferromagnetic film and antiferromagnetic film; and said interdiffusion layer is formed by heat treatment at a temperature in the range of about 200° C. to 350° C.

307. A magnetoresistive head according to claim 305, wherein a film thickness of said antiferromagnetic film is in the range of about 100 to 300 Å.

308. A magnetoresistive head according to claim 305, wherein an interdiffusion layer is formed between said ferromagnetic film and antiferromagnetic film; and a film thickness of said interdiffusion layer is in the range of about 20 to 100 Å.

309. A magnetoresistive head according to claim 305, wherein a film thickness of said ferromagnetic film is in the range of about 50 to 100 Å.

310. A magnetoresistive head according to claim 282, wherein said X—Mn alloy comprises about 44 to 54 at % of X and about 56 to 46 at % of Mn.

311. A magnetoresistive head according to claim 310, wherein said ferromagnetic film comprises one of an NiFe alloy, an NiFeCo alloy and Co.

312. A magnetoresistive head according to claim 310, wherein a film thickness of said antiferromagnetic film is in the range of about 100 to 500 Å and a film thickness of said ferromagnetic film is in the range of about 50 to 300 Å.

313. A magnetoresistive head according to claim 310, wherein an interdiffusion layer is formed between said ferromagnetic film and antiferromagnetic film; and said interdiffusion layer is formed by heat treatment at a temperature in the range of about 200° C. to 350° C.

314. A magnetoresistive bead according to claim 312, wherein a film thickness of said antiferromagnetic film is in the range of about 100 to 300 Å.

315. A magnetoresistive head according to claim 312, wherein a film thickness of said interdiffusion layer is in the range of about 20 to 100 Å.

316. A magnetoresistive head according to claim 312, wherein an interdiffusion layer is formed between said ferromagnetic film and antiferromagnetic film; and a film thickness of said ferromagnetic film is in the range of about 50 to 100 Å.

317. A magnetoresistive head according to claim 277, wherein an interdiffusion layer is formed between said ferromagnetic film and antiferromagnetic film; and said interdiffusion layer is formed by heat treatment at a temperature in the range of about 200° C. to 350° C.

318. A magnetoresistive head according to claim 277, wherein an nonmagnetic intermediate film is disposed between said bias magnetization structure and said magnetoresistive effect structure.

319. A magnetoresistive head according to claim 318, wherein said nonmagnetic intermediate film comprises at least one element selected from the group consisting of tantalum, zirconium, titanium, chromium, and hafnium.

320. A magnetoresistive head comprising:

a magnetoresistive effect structure exhibiting a magnetoresistive effect, said magnetoresistive effect structure

*disposed on a read-track region of said magnetoresistive head, said magnetoresistive effect structure having opposing ends;*

*a bias magnetization structure including a first part disposed on one of said opposing ends of said magnetoresistive effect structure and a second part disposed at the other one of said opposing ends of said magnetoresistive effect structure,*

*said first and second parts including an antiferromagnetic film and a ferromagnetic film, said antiferromagnetic film and said ferromagnetic film stacked alternately to form a plurality of layers; and*

*an interdiffusion layer formed between said antiferromagnetic film and said ferromagnetic film;*

*wherein bias magnetization is applied to said magnetoresistive effect structure by said magnetization structure; and*

*wherein said antiferromagnetic film comprises a X—Mn alloy, where X is an element selected from the group consisting of Pt, Rh, Ru, Ir, and Pd.*

*321. A magnetoresistive head according to claim 320, wherein an interdiffusion layer is formed between said magnetoresistive effect structure and said bias magnetization structure.*

*322. A magnetoresistive head according to claim 320, wherein said bias magnetization structure includes at least one ferromagnetic film which is disposed between antiferromagnetic films with interdiffusion layers formed between the surfaces of said ferromagnetic film and said antiferromagnetic films.*

*323. A magnetoresistive head according to claim 320, wherein said bias magnetization structure includes at least one antiferromagnetic film which is disposed between ferromagnetic films with interdiffusion layers formed between the surfaces of said antiferromagnetic film and said ferromagnetic films.*

*324. A magnetoresistive head according to claim 320, wherein said interdiffusion layer includes an X element.*

*325. A magnetoresistive head according to claim 320, wherein said interdiffusion layer includes Mn.*

*326. A magnetoresistive head according to claim 320, wherein a film thickness of said interdiffusion layer is in the range of about 20 to 100 Å.*

*327. A magnetoresistive head according to claim 320, wherein said X—Mn alloy comprises about 5 to 54 at % of X and about 95 to 46 at % of Mn.*

*328. A magnetoresistive head according to claim 327, wherein said ferromagnetic film comprises one of an NiFe alloy, an NiFeCo alloy and Co.*

*329. A magnetoresistive head according to claim 327, wherein a film thickness of said antiferromagnetic film is in the range of about 100 to 500 Å and a film thickness of said ferromagnetic film is in the range of about 50 to 300 Å.*

*330. A magnetoresistive head according to claim 320, wherein said interdiffusion layer is formed by heat treatment at a temperature in the range of about 200° C. to 350° C.*

*331. A magnetoresistive head according to claim 329, wherein a film thickness of said antiferromagnetic film is in the range of about 100 to 300 Å.*

*332. A magnetoresistive head according to claim 329, wherein a film thickness of said interdiffusion layer is in the range of about 20 to 100 Å.*

*333. A magnetoresistive head according to claim 329, wherein a film thickness of said ferromagnetic film is in the range of about 50 to 100 Å.*

*334. A magnetoresistive head according to claim 320, wherein said X—Mn alloy comprises about 5 to 20 at % of X and about 95 to 80 at % of Mn.*

*335. A magnetoresistive head according to claim 334, wherein said ferromagnetic film comprises one of an NiFe alloy, an NiFeCo alloy and Co.*

*336. A magnetoresistive head according to claim 334, wherein a film thickness of said antiferromagnetic film is in the range of about 100 to 500 Å and a film thickness of said ferromagnetic film is in the range of about 50 to 300 Å.*

*337. A magnetoresistive head according to claim 334, wherein said interdiffusion layer is formed by heat treatment at a temperature in the range of about 220° C. to 350° C.*

*338. A magnetoresistive head according to claim 336, wherein a film thickness of said antiferromagnetic film is in the range of about 100 to 300 Å.*

*339. A magnetoresistive head according to claim 336, wherein a film thickness of said interdiffusion layer is in the range of about 20 to 100 Å.*

*340. A magnetoresistive head according to claim 336, wherein a film thickness of said ferromagnetic film is in the range of about 50 to 100 Å.*

*341. A magnetoresistive head according to claim 320, wherein said X—Mn alloy comprises about 36 to 54 at % of X and about 64 to 46 at % of Mn.*

*342. A magnetoresistive head according to claim 341, wherein said ferromagnetic film comprises one of an NiFe alloy, an NiFeCo alloy and Co.*

*343. A magnetoresistive head according to claim 341, wherein a film thickness of said antiferromagnetic film is in the range of about 100 to 500 Å and a film thickness of said ferromagnetic film is in the range of about 50 to 300 Å.*

*344. A magnetoresistive head according to claim 341, wherein said interdiffusion layer is formed by heat treatment at a temperature in the range of about 200° C. to 350° C.*

*345. A magnetoresistive head according to claim 343, wherein a film thickness of said antiferromagnetic film is in the range of about 100 to 300 Å.*

*346. A magnetoresistive head according to claim 343, wherein a film thickness of said interdiffusion layer is in the range of about 20 to 100 Å.*

*347. A magnetoresistive head according to claim 343, wherein a film thickness of said ferromagnetic film is in the range of about 50 to 100 Å.*

*348. A magnetoresistive head according to claim 320, wherein said X—Mn alloy comprises about 44 to 54 at % of X and about 56 to 46 at % of Mn.*

*349. A magnetoresistive head according to claim 348, wherein said ferromagnetic film comprises one of an NiFe alloy, an NiFeCo alloy and Co.*

*350. A magnetoresistive head according to claim 348, wherein a film thickness of said antiferromagnetic film is in the range of about 100 to 500 Å and a film thickness of said ferromagnetic film is in the range of about 50 to 300 Å.*

*351. A magnetoresistive head according to claim 348, wherein said interdiffusion layer is formed by heat treatment at a temperature in the range of about 200° C. to 350° C.*

*352. A magnetoresistive head according to claim 350, wherein a film thickness of said antiferromagnetic film is in the range of about 100 to 300 Å.*

*353. A magnetoresistive head according to claim 350, wherein a film thickness of said interdiffusion layer is in the range of about 20 to 100 Å.*

*354. A magnetoresistive head according to claim 350, wherein a film thickness of said ferromagnetic film is in the range of about 50 to 100 Å.*

*355. A magnetoresistive head according to claim 354, wherein said interdiffusion layer is formed by heat treatment at a temperature in the range of about 200° C. to 350° C.*

*356. A magnetoresistive head according to claim 320, wherein an nonmagnetic intermediate film is disposed between said magnetization structure and said magnetoresistive effect structure.*

*357. A magnetoresistive head according to claim 356, wherein said nonmagnetic intermediate film comprises at least one element selected from the group consisting of tantalum, zirconium, titanium, chromium, and hafnium.*

*358. A magnetoresistive head according to claim 320, wherein said bias magnetization structure includes a plurality of ferromagnetic films and a plurality of antiferromagnetic films and a plurality of interdiffusion layers formed between the surfaces of said ferromagnetic films and said antiferromagnetic films.*

* * * * *

UNITED STATES PATENT AND TRADEMARK OFFICE

CERTIFICATE OF CORRECTION

PATENT NO. : RE 37,992 E
DATED : February 18, 2003
INVENTOR(S) : Masamichi Saito et al.

It is certified that error appears in the above-identified patent and that said Letters Patent is hereby corrected as shown below:

Column 22,
Line 41, delete "ready-track" and substitute -- read-track -- in its place.

Column 25,
Line 16, delete "antiferromagnetic" and substitute -- ferromagnetic -- in its place.

Column 27,
Line 14, delete "[Tr]".
Line 61, delete "Rh," (second occurrence) and substitute -- Ru, -- in its place.

Column 41,
Line 56, delete "*films*" and substitute -- *film* -- in its place.
Line 66, delete "*films*" and substitute -- *film* -- in its place.

Column 42,
Line 41, delete "*bead*" and substitute -- *head* -- in its place.

Column 43,
Lines 12-14, delete "*and an interdiffusion layer formed between said antiferromagnetic film and said ferromagnetic film;*".

Column 44,
Line 16, delete "220°" and substitute -- 200° -- in its place.

Signed and Sealed this

Twenty-fourth Day of June, 2003

JAMES E. ROGAN
*Director of the United States Patent and Trademark Office*